(12) United States Patent
Lundberg

(10) Patent No.: US 9,778,464 B2
(45) Date of Patent: Oct. 3, 2017

(54) SHAPE RECOGNITION DEVICE, SHAPE RECOGNITION PROGRAM, AND SHAPE RECOGNITION METHOD

(71) Applicant: MIRAMA SERVICE INC., New Castle, DE (US)

(72) Inventor: Johannes Lundberg, Tokyo (JP)

(73) Assignee: MIRAMA SERVICE INC., New Castle, DE (US)

( * ) Notice: Subject to any disclaimer, the term of this patent is extended or adjusted under 35 U.S.C. 154(b) by 0 days.

(21) Appl. No.: 14/768,484

(22) PCT Filed: Jul. 23, 2013

(86) PCT No.: PCT/JP2013/004485
§ 371 (c)(1),
(2) Date: Aug. 18, 2015

(87) PCT Pub. No.: WO2014/128788
PCT Pub. Date: Aug. 28, 2014

(65) Prior Publication Data
US 2016/0004907 A1    Jan. 7, 2016

(30) Foreign Application Priority Data

Feb. 19, 2013  (WO) .................. PCT/JP2013/000909
Apr. 12, 2013  (WO) .................. PCT/JP2013/002524

(51) Int. Cl.
*G06K 9/00* (2006.01)
*G06F 3/03* (2006.01)
(Continued)

(52) U.S. Cl.
CPC ............ *G02B 27/017* (2013.01); *G06F 3/011* (2013.01); *G06F 3/017* (2013.01); *G06F 3/03* (2013.01);
(Continued)

(58) Field of Classification Search
CPC .......... G06F 3/017; G06F 3/011; G06F 3/005; G06F 3/0346; G06F 3/0425;
(Continued)

(56) References Cited

U.S. PATENT DOCUMENTS 5,995,663 A * 11/1999 Itsuzaki .................. G06K 9/48
382/203
6,346,929 B1 * 2/2002 Fukushima ............. G06F 3/017
345/156
(Continued)

FOREIGN PATENT DOCUMENTS

JP     08-6708     1/1996
JP     08-31140    3/1996
(Continued)

OTHER PUBLICATIONS

International Preliminary Report on Patentability for International Patent Application No. PCT/JP2013/004485 dated Aug. 25, 2015, 6 pages.
(Continued)

*Primary Examiner* — Edward Park
*Assistant Examiner* — Michael Vanchy, Jr.
(74) *Attorney, Agent, or Firm* — Amin, Turocy & Watson LLP

(57) ABSTRACT

Provided are a shape recognition device, a shape recognition program, and a shape recognition method capable of obtaining more accurate information for recognizing an outer shape of a target object. A shape recognition device according to the present invention includes: an outer shape detection unit that detects an outer shape of a hand; a reference point extraction unit that extracts a central point of a maximum inscribed circle of the detected outer shape as a reference point; a distance measurement unit that measures a distance between the reference point and each of a plurality
(Continued)

of outer shape points on the outer shape; and a feature recognition unit that determines a feature part of the outer shape from the plurality of outer shape points on the basis of the distance.

9 Claims, 46 Drawing Sheets

(51) Int. Cl.
      *G06F 3/048*     (2013.01)
      *H04N 13/04*     (2006.01)
      *G06T 7/60*     (2017.01)
      *G06T 7/20*     (2017.01)
      *G06T 7/00*     (2017.01)
      *G02B 27/01*     (2006.01)
      *G06F 3/01*     (2006.01)
      *G06K 9/48*     (2006.01)
      *G06K 9/46*     (2006.01)
      *G06F 3/0484*     (2013.01)
      *G06T 19/00*     (2011.01)
      *G06F 3/0482*     (2013.01)

(52) U.S. Cl.
      CPC ............ *G06F 3/0304* (2013.01); *G06F 3/048* (2013.01); *G06F 3/0482* (2013.01); *G06F 3/04842* (2013.01); *G06F 3/04845* (2013.01); *G06K 9/00355* (2013.01); *G06K 9/00375* (2013.01); *G06K 9/00382* (2013.01); *G06K 9/00389* (2013.01); *G06K 9/4609* (2013.01); *G06K 9/48* (2013.01); *G06T 7/20* (2013.01); *G06T 19/006* (2013.01); *H04N 13/0495* (2013.01); *G02B 2027/0178* (2013.01); *G06T 2200/04* (2013.01); *G06T 2207/10004* (2013.01); *G06T 2207/20228* (2013.01); *G06T 2207/30196* (2013.01); *G06T 2210/56* (2013.01); *H04N 13/0429* (2013.01)

(58) Field of Classification Search
      CPC .......... G06K 9/00355; G06K 9/00375; G06K 9/00382; G06K 9/00389; G06K 9/4609; G06K 9/48; G06K 9/00087; G06K 9/00214; G06T 2207/30196; G06T 2200/04; H04N 13/0022; H04N 13/0246; H04N 13/0275; H04N 13/0425
      See application file for complete search history.

(56) References Cited

U.S. PATENT DOCUMENTS

| | | | |
|---|---|---|---|
| 2004/0066555 A1 | 4/2004 | Nomura | |
| 2012/0206584 A1* | 8/2012 | Serizawa | G06F 3/0416 348/77 |
| 2013/0057469 A1 | 3/2013 | Ajika | |

FOREIGN PATENT DOCUMENTS

| | | | |
|---|---|---|---|
| JP | 2004-126902 | 4/2004 | |
| JP | 2005-050284 | 2/2005 | |
| JP | WO 2011142317 A1 * | 11/2011 | ............ G06F 3/017 |
| JP | 2012-106005 | 6/2012 | |
| JP | 2012-168595 | 9/2012 | |
| JP | 2012-521039 | 9/2012 | |
| JP | 2012-528405 | 11/2012 | |
| JP | 2012-533120 | 12/2012 | |
| WO | 2010-107577 | 9/2010 | |
| WO | 2010-138743 | 12/2010 | |
| WO | 2011-005784 | 1/2011 | |
| WO | 2011-142317 | 11/2011 | |

OTHER PUBLICATIONS

Inoue, Kai, "A Study on Finger Character Recognition using Kinect," The Institute of Electronics, Information and Communication Engineers, IEICE Technical Report, Jan. 18, 2013, vol. 112, No. 417, pp. 45-50.

International Search Report for International Patent Application No. PCT/JP2013/004485 dated Oct. 1, 2013, 4 pages.

\* cited by examiner

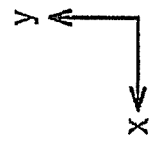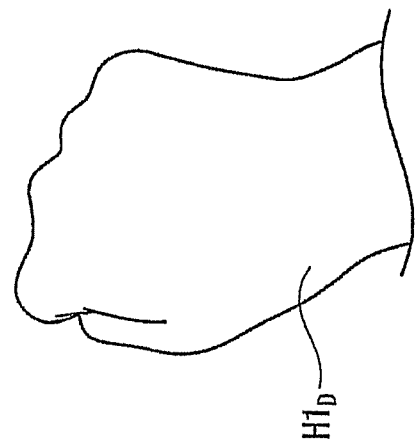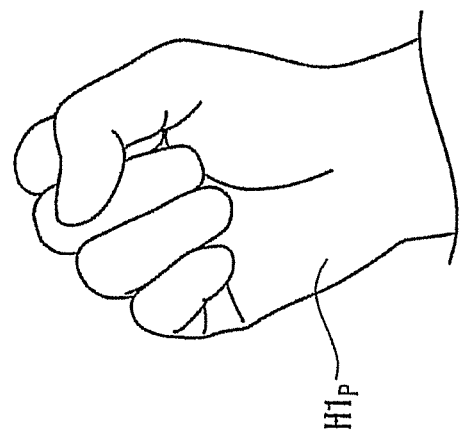
FIG. 22

FIG. 25
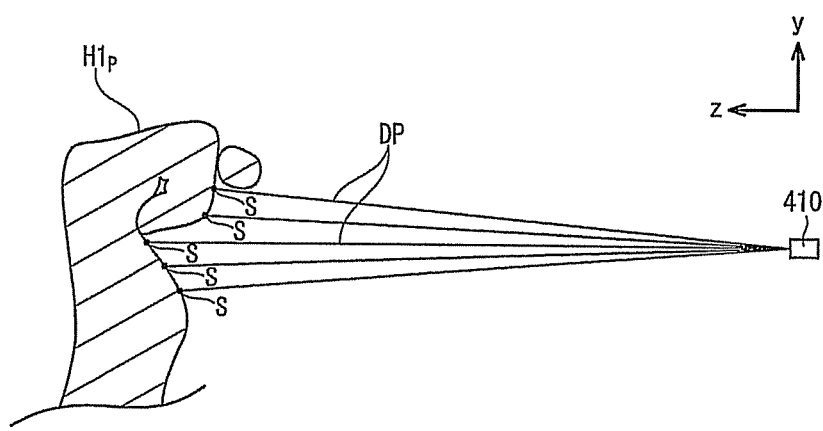
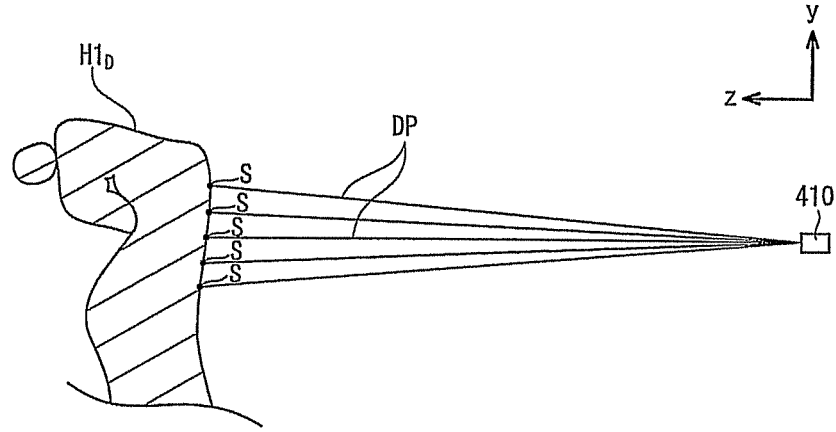

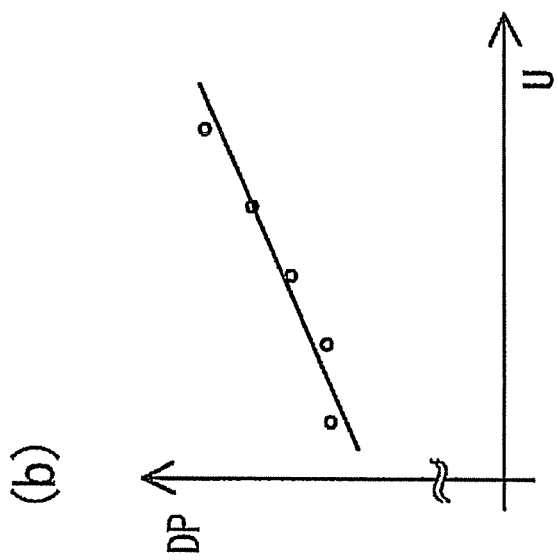
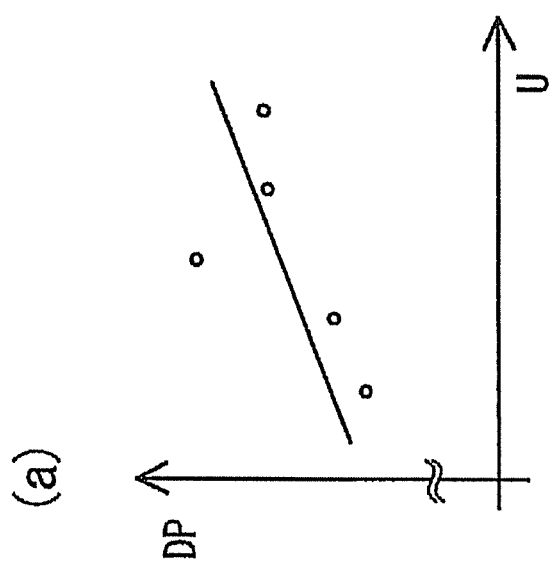
FIG. 28

SHAPE RECOGNITION DEVICE, SHAPE RECOGNITION PROGRAM, AND SHAPE RECOGNITION METHOD

TECHNICAL FIELD

The present invention relates to a shape recognition device, a shape recognition program, and a shape recognition method. In particular, the present invention relates to a shape recognition device, a shape recognition program, and a shape recognition method for recognizing the palm or the dorsum of a hand.

BACKGROUND ART

Japanese Patent Publication No. 8-31140 (Patent Literature 1) discloses computer graphics, that is, a high-speed image generation/display method in which a vivid and realistic image is displayed on a screen at a high speed.

The high-speed image generation/display method according to Patent Literature 1 is a high-speed image generation/display method in which a target having a three-dimensional structure is projected and displayed on a two-dimensional screen. In this method, a constituent surface of the target is hierarchically described with the region size being defined as at least one element, in a target coordinate system. Then, when the constituent surface of the target taken from an arbitrary point of view is projected on the two-dimensional screen, the hierarchy level is set with the distance from the origin of a display reference coordinate system or the point of view to an arbitrary point of the target represented in the target coordinate system being defined as at least one parameter.

Japanese Patent Laid-Open No. 2004-126902 (Patent Literature 2) discloses a stereoscopic image generation method and a stereoscopic image generation device that efficiently generate a stereoscopic image with no load on an observer.

In the stereoscopic image generation method according to Patent Literature 2, object data to be planarly displayed, of objects each formed by a polygon having three-dimensional coordinates, is converted into reference camera coordinate system data whose origin is a reference camera, and object data to be stereoscopically displayed, of the objects, is converted into pieces of right-eye and left-eye parallax camera coordinate system data whose origins are respectively right-eye and left-eye parallax cameras having a predetermined parallactic angle therebetween. Then, the object data in the reference camera coordinate system and the object data in the right-eye parallax camera coordinate system are drawn as right-eye image data in a video memory, and the object data in the reference camera coordinate system and the object data in the left-eye parallax camera coordinate system are drawn as left-eye image data in the video memory. Then, the right-eye image data and the left-eye image data drawn in the video memory are composited with each other, and an image mixedly including the stereoscopic object and the planar object is displayed on a stereoscopic display device.

National Publication of International Patent Application No. 2012-533120 (Patent Literature 3) discloses a method using face recognition and gesture/body posture recognition techniques.

The method according to Patent Literature 3 is a method for applying attributes indicative of a user's temperament to a visual representation, the method including: rendering the visual representation of a user; receiving data of a physical space, the data being representative of the user in the physical space; analyzing at least one detectable characteristic to deduct the user's temperament; and applying the attributes indicative of the user's temperament to the visual representation.

National Publication of International Patent Application No. 2012-528405 (Patent Literature 4) discloses a system and a method for supplying multi-mode input to a space or gesture calculation system.

The system according to Patent Literature 4 is a system including: an input device; and a detector that is coupled to a processor and detects an orientation of the input device. The input device has a plurality of mode orientations corresponding to the orientation. The plurality of mode orientations correspond to a plurality of input modes of a gesture control system. The detector is coupled to the gesture control system, and automatically controls selection of an input mode of the plurality of input modes in response to the orientation.

National Publication of International Patent Application No. 2012-521039 (Patent Literature 5) discloses a system, a method, and a computer-readable medium for manipulating a virtual object. The method according to Patent Literature 5 is a method for manipulating a virtual object in a virtual space, including: determining at least one controller that a user utilizes to manipulate the virtual object; mapping the controller to a cursor in the virtual space; determining controller input indicative of the user manipulating the virtual object with the cursor; and displaying a result of the manipulation.

Japanese Patent Laid-Open No. 2012-106005 (Patent Literature 6) discloses an image display device, a game method, and a game control method that enables an observer of the image display device to feel as if the observer could directly manipulate an actually non-existing stereoscopic image. The image display device according to Patent Literature 6 includes: image display means for displaying a parallax image on a display screen; first coordinate calculation means for calculating virtual space coordinates of a stereoscopic image that the observer of the parallax image recognizes between the display screen and the observer; second coordinate calculation means for calculating space coordinates of a manipulation object as a manipulation target of the observer; and event generation means for generating a predetermined event that changes at least one of the parallax image and an image on the display screen other than the parallax image, when a distance between the space coordinates of at least one point of the stereoscopic image calculated by the first coordinate calculation means and the space coordinates of at least one point of the manipulation object calculated by the second coordinate calculation means is equal to or less than a predetermined threshold.

CITATION LIST

Patent Literature

Patent Literature 1: Japanese Patent Publication No. 8-31140
Patent Literature 2: Japanese Patent Laid-Open No. 2004-126902
Patent Literature 3: National Publication of International Patent Application No. 2012-533120
Patent Literature 4: National Publication of International Patent Application No. 2012-528405
Patent Literature 5: National Publication of International Patent Application No. 2012-521039

Patent Literature 6: Japanese Patent Laid-Open No. 2012-106005

SUMMARY OF INVENTION

Technical Problem

The present invention has an object to provide a shape recognition device, a shape recognition program, and a shape recognition method capable of obtaining more accurate information for recognizing an outer shape of a target object.

Solution to Problem (1)

A shape recognition device according to one aspect includes an outer shape detection unit, a reference point extraction unit, a distance measurement unit, and a feature recognition unit. The outer shape detection unit detects an outer shape of a hand. The reference point extraction unit extracts a central point of a maximum inscribed circle of the detected outer shape as a reference point. The distance measurement unit measures a distance between the reference point and each of a plurality of outer shape points on the outer shape. The feature recognition unit determines a feature part of the outer shape from the plurality of outer shape points on the basis of the measured distance.

Consequently, in the case where at least any of the fingers of the hand that is a detection target is stretched, the distance between the reference point and each outer shape point becomes larger with the decreasing distance from the tip of the stretched finger, and becomes smaller with the decreasing distance from between the fingers. On the basis of this fact, at least any of a feature point of a finger tip portion and a feature point of an interdigital portion can be determined. Accordingly, a feature point on the outer shape of the hand can be easily obtained. Note that, in the case where all the fingers are bent, fluctuations in the distance between the reference point and each outer shape point are smaller than in the case where at least any of the fingers is stretched. On the basis of this fact, it can also be determined that all the fingers are bent.

Further, in the case of determining a feature point of a finger tip portion, unlike the case of determining an overlap between the outer shape of the hand and a convex hull of the hand as the finger tip portion, even in the case where a short finger or a bent finger exists inside of the convex hull, the finger can be accurately determined.

(2)

In a shape recognition device according to a second invention, the plurality of points on the outer shape are set at predetermined intervals along the outer shape.

Consequently, the plurality of outer shape points are scanned in one direction along the outer shape of the hand, and the measured distance can be obtained as an amount corresponding to the scanning point count or the scanning distance of each outer shape point.

Accordingly, the outer shape point corresponding to the scanning point count or the scanning distance in the case where the measured distance exhibits an extremum can be determined as a feature point on the outer shape of the hand.

In this regard, in the case where the extremum is a maximum, a feature point of a finger tip portion can be determined. In the case where the extremum is a minimum, a feature point of an interdigital portion can be determined.

(3)

In a shape recognition device according to a third invention, the plurality of outer shape points on the outer shape are each obtained as an intersection point between a half line and the outer shape, the half line being drawn through a rotation for each predetermined angle about the reference point as a rotation center.

Consequently, the plurality of outer shape points are scanned in one direction along the outer shape of the hand, and the measured distance can be obtained as an amount corresponding to the rotation angle of the half line.

Accordingly, the intersection point between the half line and the outer shape can be determined as a feature point on the outer shape of the hand, the half line corresponding to the rotation angle in the case where the measured distance exhibits an extremum.

In this regard, in the case where the extremum is a maximum, a feature point of a finger tip portion can be determined. In the case where the extremum is a minimum, a feature point of an interdigital portion can be determined.

(4)

In a shape recognition device according to a fourth invention, the outer shape detection unit of the shape recognition device according to any of the one aspect to the third invention is a depth level sensor or an image sensor:

In this case, the outer shape of the hand can be accurately detected using an imaging result or image processing on a target image based on a distance to the hand.

(5)

In a shape recognition device according to a fifth invention, the shape recognition device according to any of the one aspect to the fourth invention may further include a display device capable of displaying a stereoscopic image. In this case, the outer shape detection unit may include a depth level sensor that measures a distance to the hand, and may detect the outer shape of the hand in a common region in which a stereoscopic region of the stereoscopic image generated by the display device and a depth level detection region overlap with each other.

In this case, the visual recognition of the stereoscopic image in the common region and the shape recognition of the hand existing in the field of view of the stereoscopic image can be performed at the same time. That is, the shape recognition of the hand can be performed while the stereoscopic image is displayed.

(6)

A head-mounted display device according to another aspect includes the shape recognition device according to any of the one aspect to the fifth invention.

In this case, because the shape recognition device is provided to the head-mounted display device, the shape recognition of the hand can be performed in the state where the device is attached to the body of a user.

Moreover, because the device is attached to the head of the user, the detected outer shape of the hand is substantially the same as the outer shape of the hand visually recognizable by the user. Hence, in the case of manipulating a view object, the case of registering a gesture, and other such cases, the hand can be detected with an awareness of a mode easily detectable by the shape recognition device.

(7)

A shape recognition program according to still another aspect includes an outer shape detection process, a reference point extraction process, a distance measurement process, and a feature recognition process. In the outer shape detection process, an outer shape of a hand is detected. In the reference point extraction process, a central point of a maximum inscribed circle of the detected outer shape is extracted as a reference point. In the distance measurement process, a distance between the reference point and each of a plurality of outer shape points on the outer shape is measured. In the feature recognition process, a feature part of the outer shape is determined from the plurality of outer shape points on the basis of the measured distance.

Consequently, in the case where at least any of the fingers of the hand that is a detection target is stretched, the distance between the reference point and each outer shape point becomes larger with the decreasing distance from the tip of the stretched finger, and becomes smaller with the decreasing distance from between the fingers. On the basis of this fact, at least any of a feature point of a finger tip portion and a feature point of an interdigital portion can be determined. Accordingly, a feature point on the outer shape of the hand can be easily obtained. Note that, in the case where all the fingers are bent, fluctuations in the distance between the reference point and each outer shape point are smaller than in the case where at least any of the fingers is stretched. On the basis of this fact, it can also be determined that all the fingers are bent.

Further, in the case of determining a feature point of a finger tip portion, unlike the case of determining an overlap between the outer shape of the hand and a convex hull of the hand as the finger tip portion, even in the case where a short finger or a bent finger exists inside of the convex hull, the finger can be accurately determined.

(8)

In a shape recognition program according to an eighth invention, the plurality of points on the outer shape are set at predetermined intervals along the outer shape.

Consequently, the plurality of outer shape points are scanned in one direction along the outer shape of the hand, and the measured distance can be obtained as an amount corresponding to the scanning point count or the scanning distance of each outer shape point.

Accordingly, the outer shape point corresponding to the scanning point count or the scanning distance in the case where the measured distance exhibits an extremum can be determined as a feature point on the outer shape of the hand.

In this regard, in the case where the extremum is a maximum, a feature point of a finger tip portion can be determined. In the case where the extremum is a minimum, a feature point of an interdigital portion can be determined.

(9)

In a shape recognition program according to a ninth invention, the plurality of outer shape points on the outer shape are each obtained as an intersection point between a half line and the outer shape, the half line being drawn through a rotation for each predetermined angle about the reference point as a rotation center.

Consequently, the plurality of outer shape points are scanned in one direction along the outer shape of the hand, and the measured distance can be obtained as an amount corresponding to the rotation angle of the half line.

Accordingly, the intersection point between the half line and the outer shape can be determined as a feature point on the outer shape of the hand, the half line corresponding to the rotation angle in the case where the measured distance exhibits an extremum.

In this regard, in the case where the extremum is a maximum, a feature point of a finger tip portion can be determined. In the case where the extremum is a minimum, a feature point of an interdigital portion can be determined.

(10)

A shape recognition method according to still another aspect includes an outer shape detection step, a reference point extraction step, a distance measurement step, and a feature recognition step. In the outer shape detection step, an outer shape of a hand is detected. In the reference point extraction step, a central point of a maximum inscribed circle of the detected outer shape is extracted as a reference point. In the distance measurement step, a distance between the reference point and each of a plurality of outer shape points on the outer shape is measured. In the feature recognition step, a feature part of the outer shape is determined from the plurality of outer shape points on the basis of the measured distance.

Consequently, in the case where at least any of the fingers of the hand that is a detection target is stretched, the distance between the reference point and each outer shape point becomes larger with the decreasing distance from the tip of the stretched finger, and becomes smaller with the decreasing distance from between the fingers. On the basis of this fact, at least any of a feature point of a finger tip portion and a feature point of an interdigital portion can be determined. Accordingly, a feature point on the outer shape of the hand can be easily obtained. Note that, in the case where all the fingers are bent, fluctuations in the distance between the reference point and each outer shape point are smaller than in the case where at least any of the fingers is stretched. On the basis of this fact, it can also be determined that all the fingers are bent.

Further, in the case of determining a feature point of a finger tip portion, unlike the case of determining an overlap between the outer shape of the hand and a convex hull of the hand as the finger tip portion, even in the case where a short finger or a bent finger exists inside of the convex hull, the finger can be accurately determined.

(11)

In a shape recognition method according to an eleventh invention, the plurality of outer shape points on the outer shape are set at predetermined intervals along the outer shape.

Consequently, the plurality of outer shape points are scanned in one direction along the outer shape of the hand, and the measured distance can be obtained as an amount corresponding to the scanning point count or the scanning distance of each outer shape point.

Accordingly, the outer shape point corresponding to the scanning point count or the scanning distance in the case where the measured distance exhibits an extremum can be determined as a feature point on the outer shape of the hand.

In this regard, in the case where the extremum is a maximum, a feature point of a finger tip portion can be determined. In the case where the extremum is a minimum, a feature point of an interdigital portion can be determined.

(12)

In a shape recognition method according to a twelfth invention, the plurality of outer shape points on the outer shape are each obtained as an intersection point between a half line and the outer shape, the half line being drawn through a rotation for each predetermined angle about the reference point as a rotation center.

Consequently, the plurality of outer shape points are scanned in one direction along the outer shape of the hand, and the measured distance can be obtained as an amount corresponding to the rotation angle of the half line.

Accordingly, the intersection point between the half line and the outer shape can be determined as a feature point on the outer shape of the hand, the half line corresponding to the rotation angle in the case where the measured distance exhibits an extremum.

In this regard, in the case where the extremum is a maximum, a feature point of a finger tip portion can be determined. In the case where the extremum is a minimum, a feature point of an interdigital portion can be determined.

Note that, herein, the side close to the finger tip is referred to as the distal side, the side close to the body trunk is referred to as the proximal side, the palm side of the hand is referred to as the palmar side, the dorsum side of the hand is referred to as the dorsal side, the thumb side is referred to as the radial side, and the little finger side is referred to as the ulnar side.

Advantageous Effect of Invention

According to the present invention, it is possible to provide a shape recognition device, a shape recognition program, and a shape recognition method capable of obtaining more accurate information for recognizing an outer shape of a target object.

BRIEF DESCRIPTION OF DRAWINGS

FIG. 22 are schematic external views in the case where a hand in the form of a first that is a recognition target is visually recognized on each of a palmar side (a) and a dorsal side (b).

FIG. 24 are schematic diagrams in which FIG. 23(a) and FIG. 23(b) are respectively superimposed on FIG. 22(a) and FIG. 22(b).

FIG. 25 are schematic diagrams respectively illustrating cross-sections of a hand $H1_P$ and a hand $H1_D$ that are taken along a plane parallel to a y-z plane including a chord $C_v$ in FIG. 24(a) and FIG. 24(b).

FIG. 28 are graphs respectively illustrating relations between respective depth levels to target points S illustrated in FIG. 26(a) and FIG. 26(b) and positions thereof in a direction connecting an ulnar side and a radial side of the hand.

REFERENCE SIGNS LIST 100 glasses display device
220 semi-transmissive display
2203D virtual image display region (common region)
410 infrared ray detection unit
4103D three-dimensional space detection region
450 control unit
OF outer shape
C maximum inscribed circle
C0 reference point
$a_n$, $a_i$, $a_k$ vertex (outer shape point)
$b_n$, $b_j$, $b_k$ outer shape point
HL half line
d distance

DESCRIPTION OF EMBODIMENT

Hereinafter, an embodiment of the present invention is described with reference to the drawings. In the following description, the same reference signs are given to the same components. The names and functions thereof are the same. Accordingly, detailed description thereof is not repeated.

Moreover, the present invention is not limitatively applied to the following glasses display device, and can also be applied to other wearable appliances, other I/O devices, display devices, televisions, monitors, projectors, and the like.

(Configuration Outline of Glasses Display Device)

Figure 1:
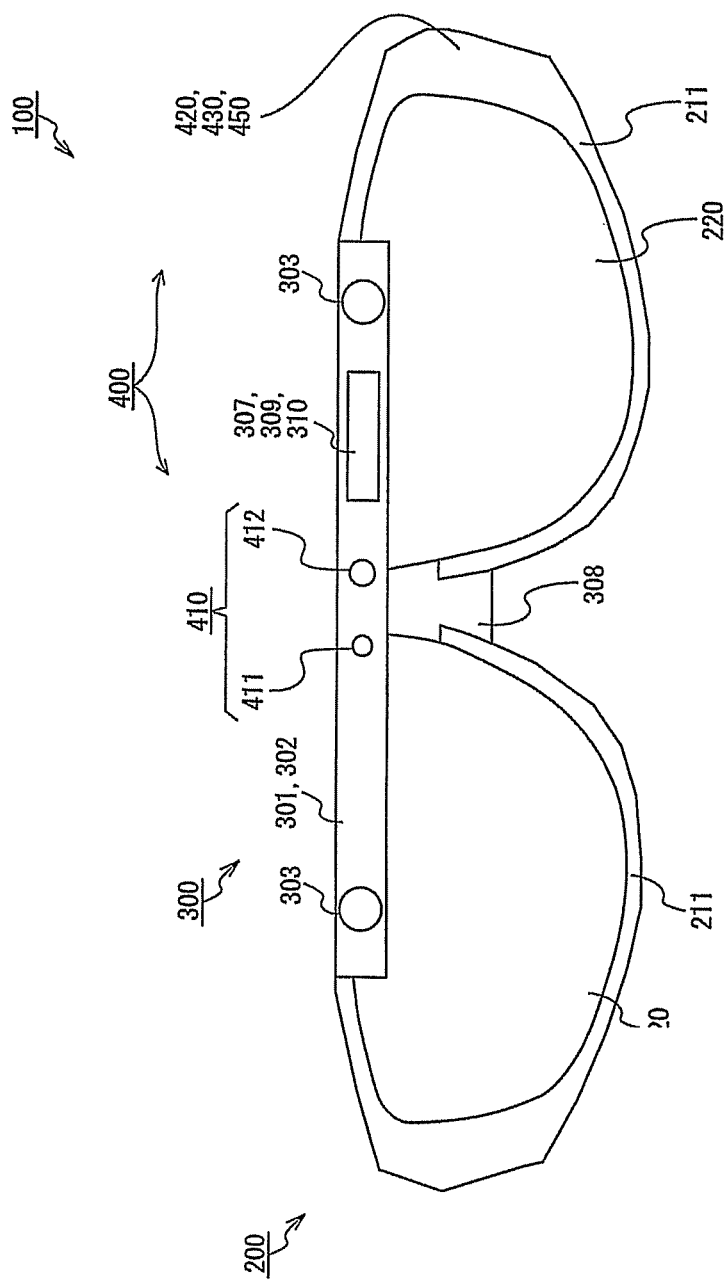
FIG. 1 is a schematic external front view illustrating an example of a basic configuration of a glasses display device 100.
Figure 2:
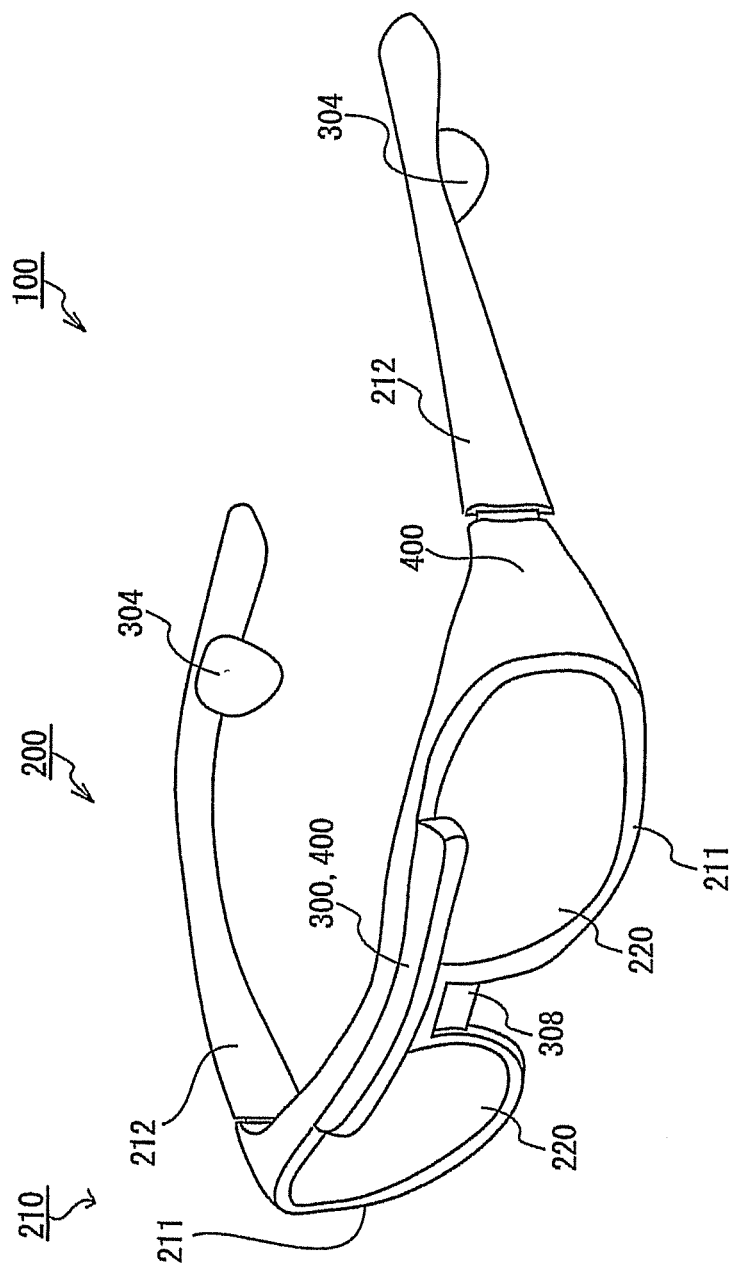
FIG. 2 is a schematic external perspective view illustrating an example of the glasses display device 100.

FIG. 1 is a schematic external front view illustrating an example of a basic configuration of a glasses display device 100 according to an embodiment, and FIG. 2 is a schematic external perspective view illustrating an example of the glasses display device 100.

As illustrated in FIG. 1 or FIG. 2, the glasses display device 100 is a glasses-shaped display device. As described later, the glasses display device 100 is used while being attached to the face of a user.

As illustrated in FIG. 1 and FIG. 2, the glasses display device 100 mainly includes a glasses unit 200, a communication system 300, and an operation system 400.

(Glasses Unit 200)

As illustrated in FIG. 1 and FIG. 2, the glasses unit 200 includes a glasses frame 210 and a pair of semi-transmissive displays 220. The glasses frame 210 mainly includes a rim unit 211 and a temple unit 212.

The pair of semi-transmissive displays 220 is supported by the rim unit 211 of the glasses frame 210.

In the present embodiment, the rim unit 211 of the glasses display device 100 is provided with the pair of semi-transmissive displays 220. Not limited thereto, the rim unit 211 of the glasses display device 100 may be provided with lenses such as normal sunglasses lenses, ultraviolet protection lenses, or glasses lenses, and one semi-transmissive display 220 or the pair of semi-transmissive displays 220 may be separately provided.

Alternatively, the semi-transmissive display(s) 220 may be provided so as to be embedded in part of the lenses.

Further, the present embodiment is not limited to such a glasses type, and can be applied to a hat type and other arbitrary head-mounted display devices as long as the device can be attached to the body of a person and can be arranged within the field of view of the person.

(Communication System 300)

Next, the communication system 300 is described. The communication system 300 includes a battery unit 301, an antenna module 302, a camera unit 303, a speaker unit 304, a global positioning system (GPS) unit 307, a microphone unit 308, a subscriber identity module card (SIM) unit 309, and a main unit 310.

Note that the camera unit may be provided with a CCD sensor. The speaker unit 304 may be normal earphones, and may be bone-conduction earphones. The SIM unit 309 includes a near field communication (NFC) unit, another contact-type IC card unit, and a contactless IC card unit.

As described above, the communication system 300 according to the present embodiment at least has any of the functions of a mobile phone, a smartphone, and a tablet terminal. Specifically, the communication system 300 has a phone function, an Internet function, a browser function, an e-mail function, an image taking function, and the like.

Accordingly, with the use of the glasses display device 100, the user can use a phone call function similar to that of a mobile phone by means of the communication device, the speaker, and the microphone. Moreover, because the glasses display device 100 is glasses-shaped, the user can make a phone call without using both his/her hands.

(Operation System 400)

Next, the operation system 400 includes an infrared ray detection unit 410, a gyroscope unit 420, an acceleration detection unit 430, and a control unit 450. The infrared ray detection unit 410 mainly includes an infrared ray emission element 411 and an infrared ray detection camera 412.

Figure 3:
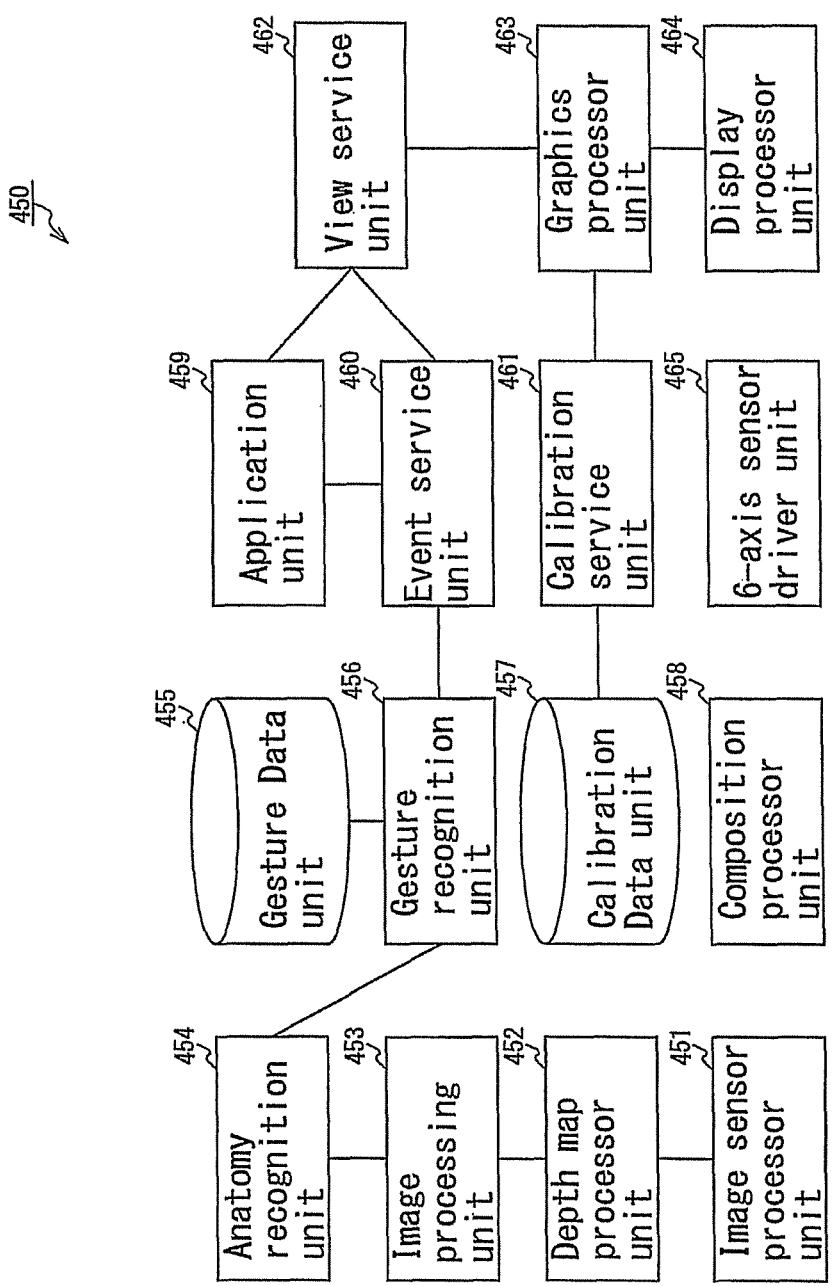
FIG. 3 is a schematic diagram illustrating an example of a configuration of a control unit 450 of an operation system 400.

Next, a configuration, a processing flow, and a concept of the operation system 400 are described. FIG. 3 is a schematic diagram illustrating an example of a configuration of the control unit 450 of the operation system 400.

As illustrated in FIG. 3, the control unit 450 includes an image sensor processor unit 451, a depth map processor unit 452, an image processing unit 453, an anatomy recognition unit 454, a gesture data unit 455, a gesture recognition unit 456, a calibration data unit 457, a composition processor unit 458, an application unit 459, an event service unit 460, a calibration service unit 461, a view service unit 462, a graphics processor unit 463, a display processor unit 464, and a 6-axis sensor driver unit 465.

Note that the control unit 450 does not need to include all the above-mentioned units, and may include one or more necessary units as appropriate. For example, the gesture data unit 455 and the calibration data unit 457 may be arranged on a cloud service, and the composition processor unit 458 may not be particularly provided.

Figure 4:
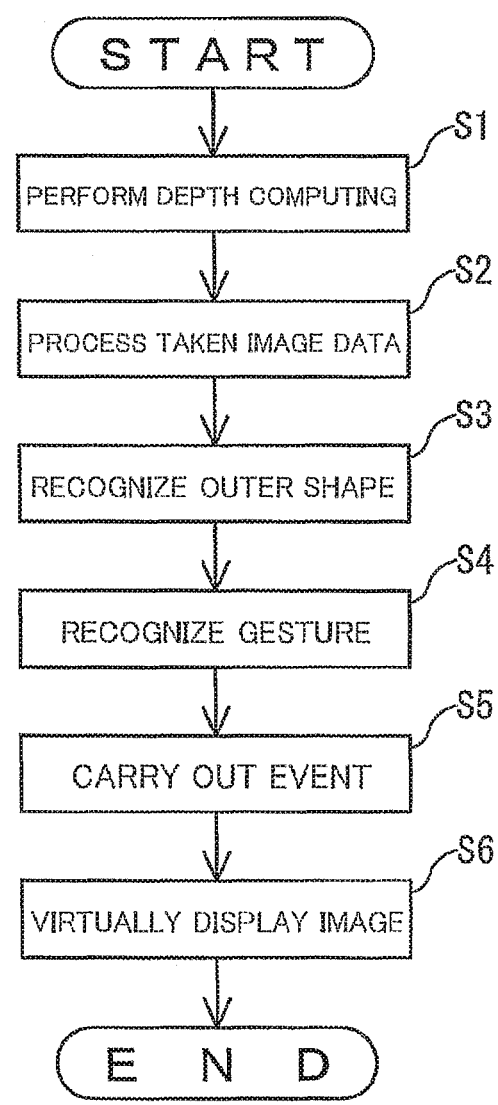
FIG. 4 is a flowchart illustrating a processing flow in the operation system 400.
Figure 5:
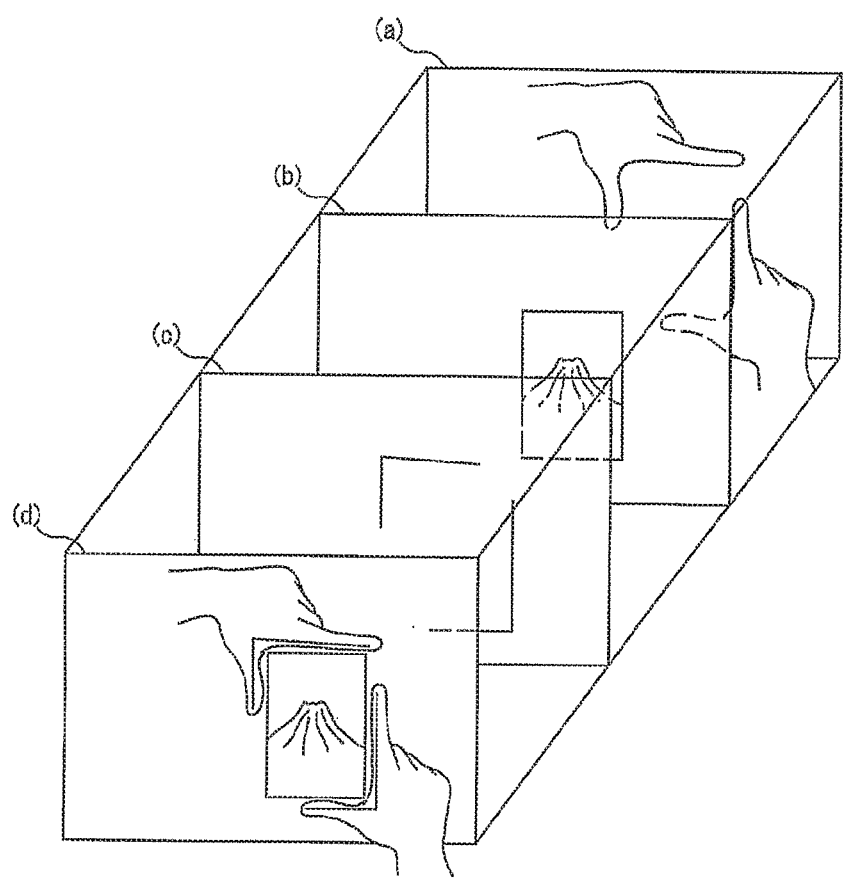
FIG. 5 is a schematic diagram illustrating a concept corresponding to the flowchart of FIG. 4.

Next, FIG. 4 is a flowchart illustrating a processing flow in the operation system 400, and FIG. 5 is a schematic diagram illustrating a concept according to the flowchart of FIG. 4.

First, as illustrated in FIG. 4, target data is acquired from the infrared ray detection unit 410, and depth computing is performed by the depth map processor unit 452 (Step S1). Then, outer shape image data is processed by the image processing unit 453 (Step S2).

Subsequently, on the basis of the structure of a standard human body, an anatomic feature is recognized from the outer shape image data processed in Step S2, by the anatomy recognition unit 454. As a result, an outer shape is recognized (Step S3).

Further, on the basis of the anatomic feature obtained in Step S3, a gesture is recognized by the gesture recognition unit 456 (Step S4).

The gesture recognition unit 456 refers to gesture data recorded in the gesture data unit 455, and recognizes the gesture from the outer shape whose anatomic feature has been recognized. Note that, although it is assumed that the gesture recognition unit 456 refers to the gesture data recorded in the gesture data unit 455, not limited thereto, the gesture recognition unit 456 may refer to other arbitrary data, and may perform processing without any reference.

In such a manner as described above, a gesture of hands is recognized as illustrated in FIG. 5(a).

Subsequently, the application unit 459 and the event service unit 460 carry out a predetermined event in accordance with the gesture recognized by the gesture recognition unit 456 (Step S5).

As a result, as illustrated in FIG. 5(b), for example, an image is displayed by a picture application. On this occasion, taken image data from the camera unit 303 may be displayed on this screen.

Lastly, the view service unit 462, the calibration service unit 461, the graphics processor unit 463, the display processor unit 464, and the composition processor unit 458 display or virtually display an image on the semi-transmissive displays 220 (Step S6). As a result, skeletons of the hands indicating the gesture are displayed as illustrated in FIG. 5(c), and a composite image that is formed such that the shape and size of a picture coincide with the shape and size of the skeletons is displayed as illustrated in FIG. 5(d).

Note that the 6-axis sensor driver unit 465 always detects signals from the gyroscope unit 420 and the acceleration detection unit 430, and transmits a posture condition to the display processor unit 464.

In the case where the user to whom the glasses display device 100 is attached inclines the glasses display device 100, the 6-axis sensor driver unit 465 always receives signals from the gyroscope unit 420 and the acceleration detection unit 430, and controls image display. In this control, the displayed image may be kept horizontal, and may be adjusted in accordance with the inclination.

(One Example of Detection Region and Virtual Display Region)

Next, a relation between a detection region of the infrared ray detection unit 410 of the operation system 400 and a virtual display region of the pair of semi-transmissive displays 220 is described.

Figure 6:
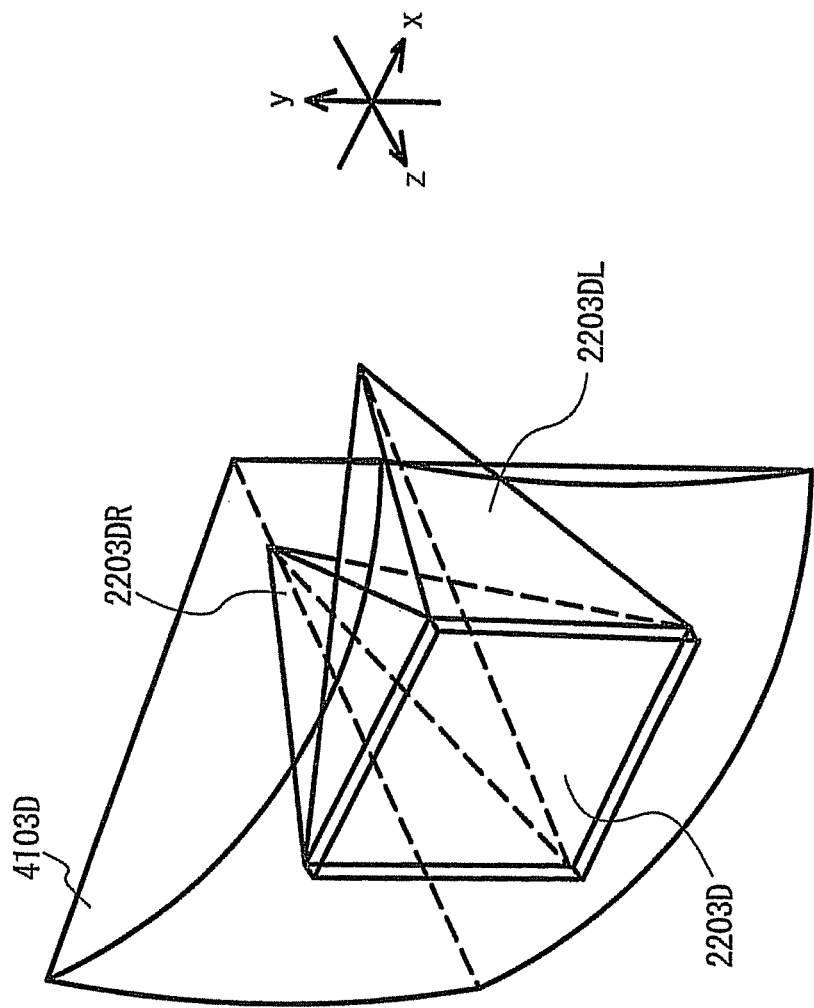
FIG. 6 is a schematic perspective view for describing a detection region of an infrared ray detection unit 410 and a virtual display region of a pair of semi-transmissive displays 220.
Figure 7:
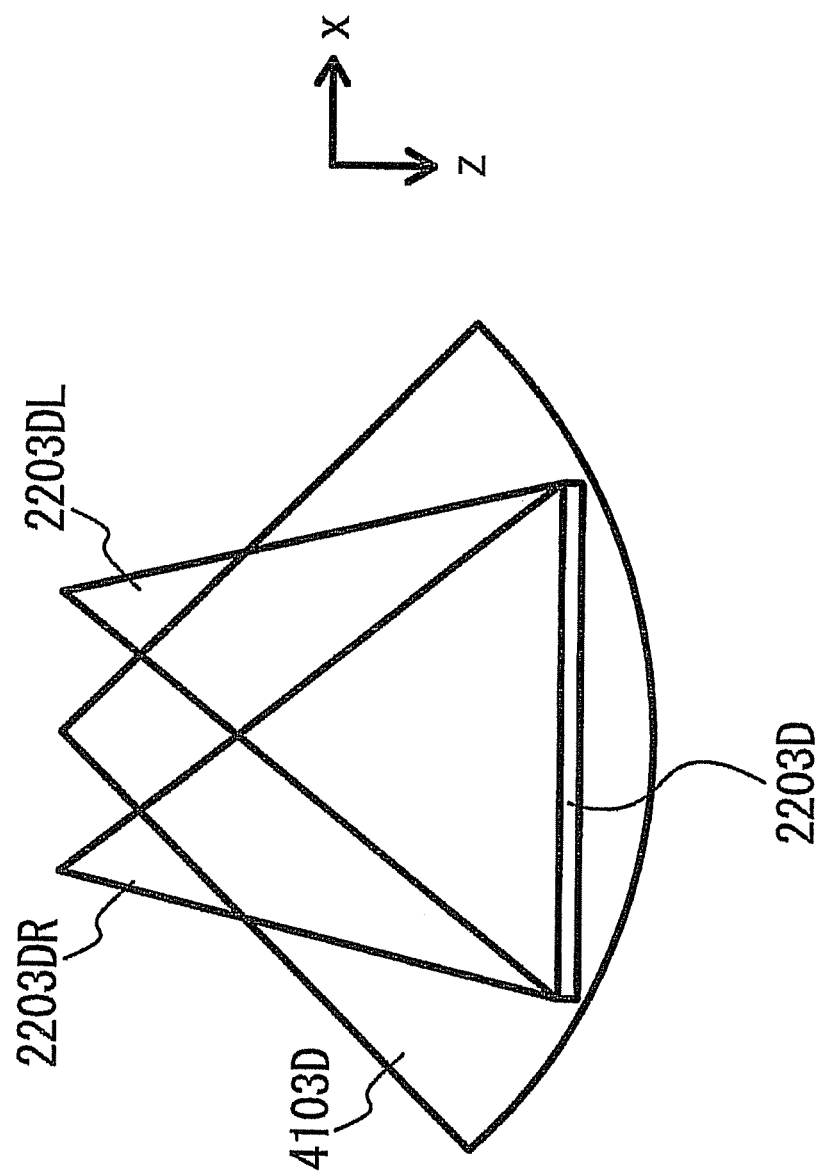
FIG. 7 is a top view of FIG. 6.
Figure 8:
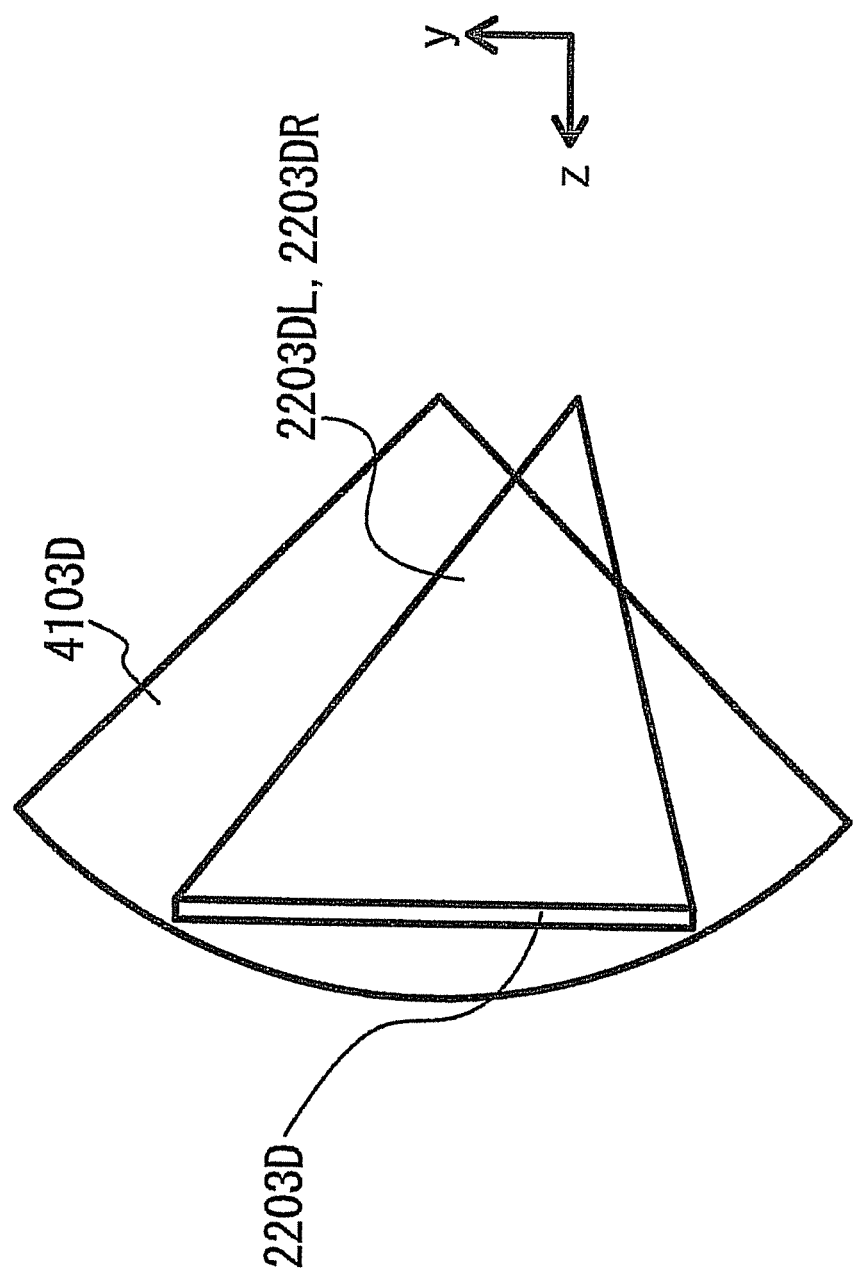
FIG. 8 is a side view of FIG. 6.

FIG. 6 is a schematic perspective view for describing the detection region of the infrared ray detection unit 410 and the virtual display region of the pair of semi-transmissive displays 220, FIG. 7 is a top view of FIG. 6, and FIG. 8 is a side view of FIG. 6.

In the following, for convenience of description, a three-dimensional orthogonal coordinate system formed by an x-axis, a y-axis, and a z-axis is defined as illustrated in FIG. 6. In the following drawings, an x-axis arrow indicates the horizontal direction. A y-axis arrow indicates the vertical direction or the long axis direction of the user's body. A z-axis arrow indicates the depth level direction. The z-axis positive direction indicates the direction of a higher depth level. The direction of each arrow is the same in the other drawings.

As illustrated in FIG. 6 to FIG. 8, a three-dimensional space detection region (3D space) 4103D in which detection by the infrared ray detection unit 410 of the operation system 400 is possible is provided.

The three-dimensional space detection region 4103D is formed by a conical or pyramidal three-dimensional space extending from the infrared ray detection unit 410.

That is, infrared rays emitted from the infrared ray emission element 411 can be detected by the infrared ray detection camera 412, and hence the infrared ray detection unit 410 can recognize a gesture in the three-dimensional space detection region 4103D.

Moreover, although one infrared ray detection unit 410 is provided in the present embodiment, not limited thereto, a plurality of the infrared ray detection units 410 may be provided, and one infrared ray emission element 411 and a plurality of the infrared ray detection cameras 412 may be provided.

Subsequently, as illustrated in FIG. 6 to FIG. 8, the pair of semi-transmissive displays 220 is visually recognized by the user as a virtual display with a depth in not an actual place of the glasses display device 100 but a virtual image display region 2203D that is a place apart from the glasses display device 100. The depth corresponds to the thickness in the depth level direction (z-axis direction) of a virtual stereoscopic shape of the virtual image display region 2203D. Accordingly, the depth is provided in accordance with the thickness in the depth level direction (z-axis direction) of the virtual stereoscopic shape.

That is, although images are respectively displayed on the semi-transmissive displays 220 of the glasses display device 100 in actuality, a right-eye image is transmitted through the semi-transmissive display 220 on the right-eye side to be recognized by the user in a three-dimensional space region 2203DR, and a left-eye image is transmitted through the semi-transmissive display 220 on the left-eye side to be recognized by the user in a three-dimensional space region 2203DL. As a result, the two recognized images are composited with each other in the brain of the user, whereby the user can recognize the two images as a virtual image in the virtual image display region 2203D.

Moreover, the virtual image display region 2203D is displayed using any of a frame sequential method, a polarization method, a linear polarization method, a circular polarization method, a top-and-bottom method, a side-by-side method, an anaglyph method, a lenticular method, a parallax barrier method, a liquid crystal parallax barrier method, a two-parallax method, and a multi-parallax method using three or more parallaxes.

Moreover, in the present embodiment, the virtual image display region 2203D includes a space region common to the three-dimensional space detection region 4103D. In particular, as illustrated in FIG. 6 and FIG. 7, the virtual image display region 2203D exists inside of the three-dimensional space detection region 4103D, and hence the virtual image display region 2203D corresponds to the common region.

Note that the shape and size of the virtual image display region 2203D can be arbitrarily adjusted by a display method on the pair of semi-transmissive displays 220.

Moreover, as illustrated in FIG. 8, description is given above of the case where the infrared ray detection unit 410 is arranged above (y-axis positive direction) the pair of semi-transmissive displays 220. Even if the arrangement position in the vertical direction (y-axis direction), of the infrared ray detection unit 410 is below (y-axis negative direction) the semi-transmissive displays 220 or the same as the position of the semi-transmissive displays 220, the virtual image display region 2203D similarly includes a space region common to the three-dimensional space detection region 4103D.

(Other Examples of Detection Region and Virtual Display Region)

Figure 9:
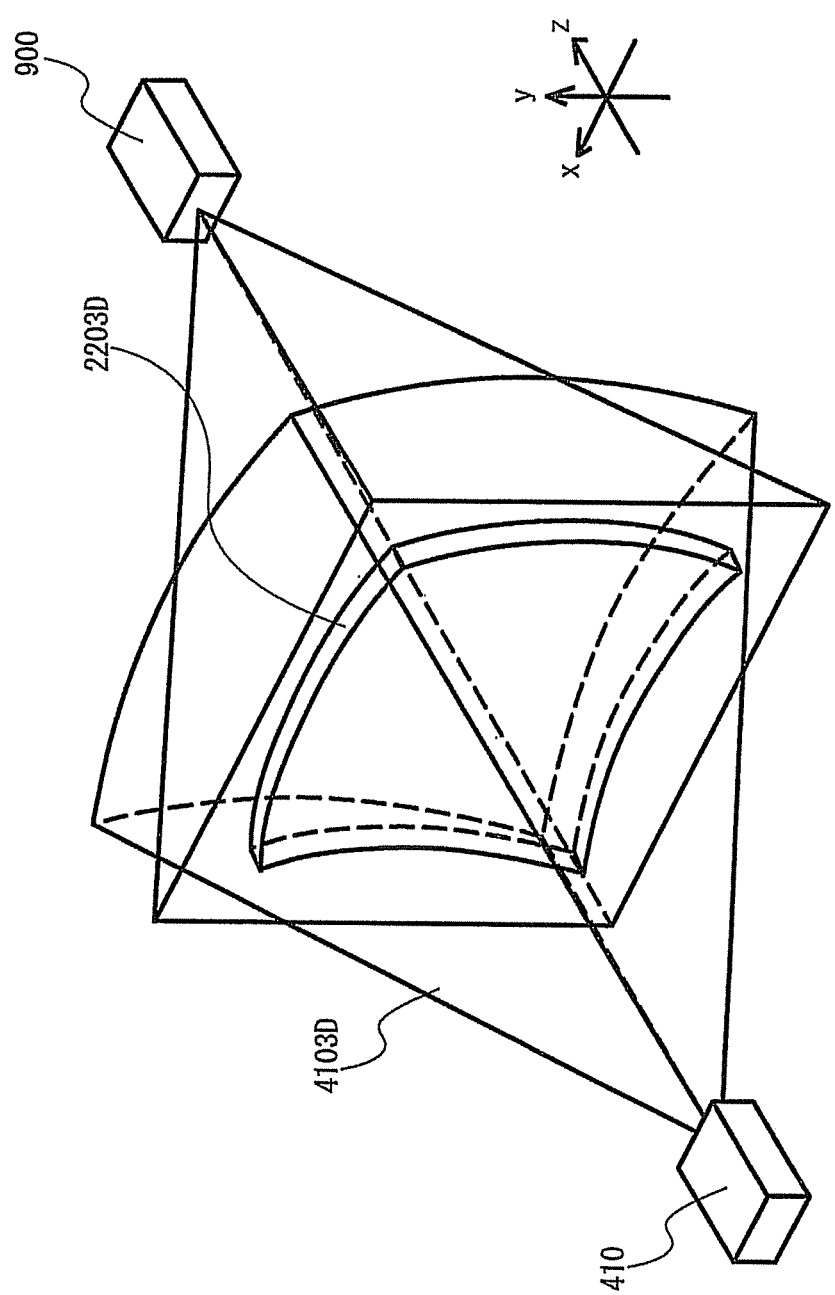
FIG. 9 is a schematic diagram illustrating another example of the detection region and the virtual display region.
Figure 10:
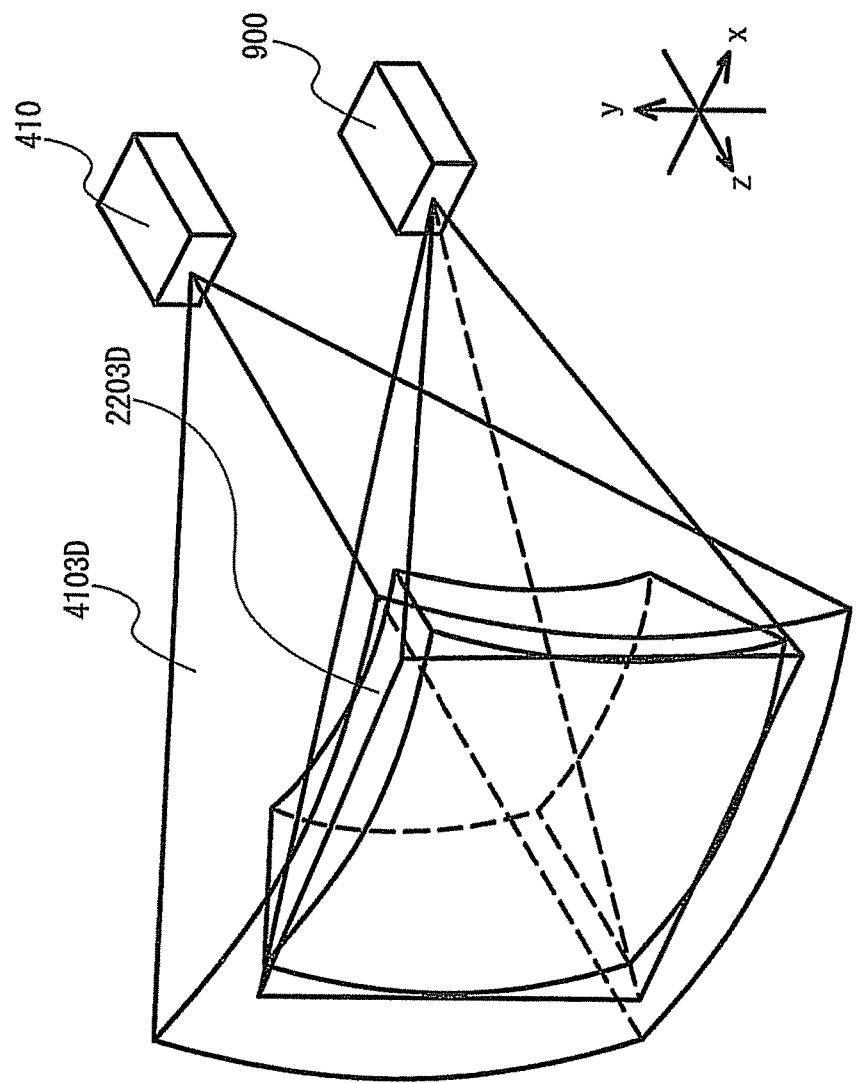
FIG. 10 is a schematic diagram illustrating another example of the detection region and the virtual display region.
Figure 11:
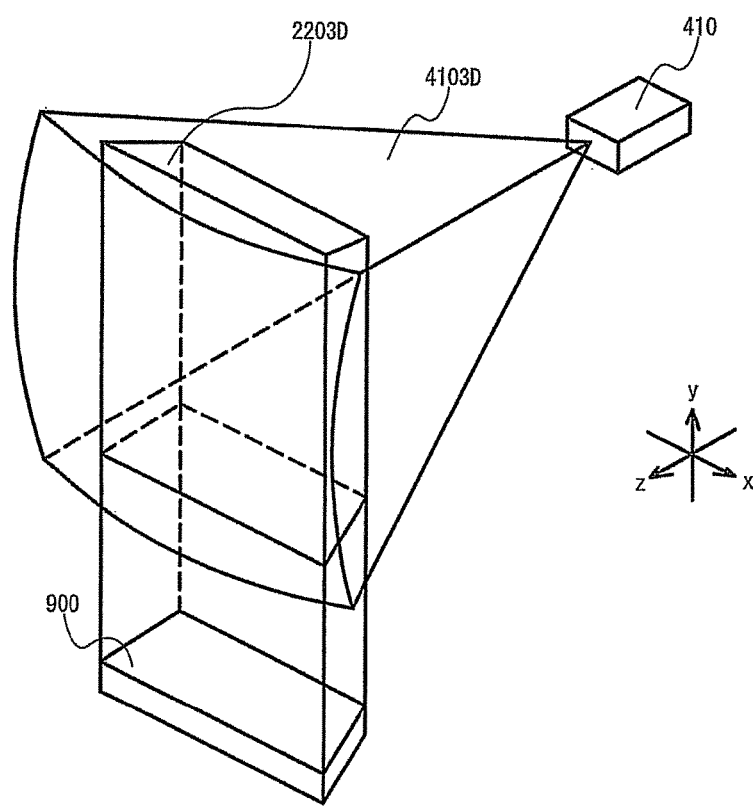
FIG. 11 is a schematic diagram illustrating another example of the detection region and the virtual display region.

Next, FIG. 9 to FIG. 11 are schematic diagrams respectively illustrating other examples of the detection region and the virtual display region illustrated in FIG. 6 to FIG. 8.

For example, as illustrated in FIG. 9 to FIG. 11, other I/O devices, display devices, televisions, monitors, and the like may be used instead of the semi-transmissive displays 220 of the glasses display device 100. Hereinafter, other I/O devices, display devices, televisions, monitors, and projectors are collectively referred to as an I/O device 900.

As illustrated in FIG. 9, the virtual image display region 2203D may be outputted in the z-axis negative direction from the I/O device 900, and the three-dimensional space detection region 4103D may be formed in the z-axis positive direction from the infrared ray detection unit 410 that is positioned so as to be opposed to the I/O device 900 in the z-axis direction.

In this case, the virtual image display region 2203D outputted by the I/O device 900 is generated as a space region common to the three-dimensional space detection region 4103D.

Moreover, as illustrated in FIG. 10, the virtual image display region 2203D may be outputted from the I/O device 900, and the three-dimensional space detection region 4103D of the infrared ray detection unit 410 may be formed in the same direction as that of the I/O device 900 (both in the z-axis positive direction with respect to the x-y plane).

Also in this case, the virtual image display region 2203D outputted by the I/O device 900 is generated as a space region common to the three-dimensional space detection region 4103D.

Then, as illustrated in FIG. 11, the virtual image display region 2203D may be outputted in the vertical upward direction (y-axis positive direction) from the I/O device 900. Also in FIG. 11, similarly to FIG. 9 and FIG. 10, the virtual image display region 2203D outputted by the I/O device 900 is generated as a space region common to the three-dimensional space detection region 4103D.

Moreover, although not illustrated, the I/O device 900 may be arranged on the upper side (y-axis positive direction side) of the three-dimensional space detection region 4103D, and the virtual image display region 2203D may be outputted in the vertical downward direction (y-axis negative direction). The virtual image display region 2203D may be outputted in the horizontal direction (x-axis direction). Like a projector or a movie theater, the virtual image display region 2203D may be outputted from the upper back side (the z-axis positive direction and the y-axis positive direction).

(Manipulation Region and Gesture Region)

Figure 12:
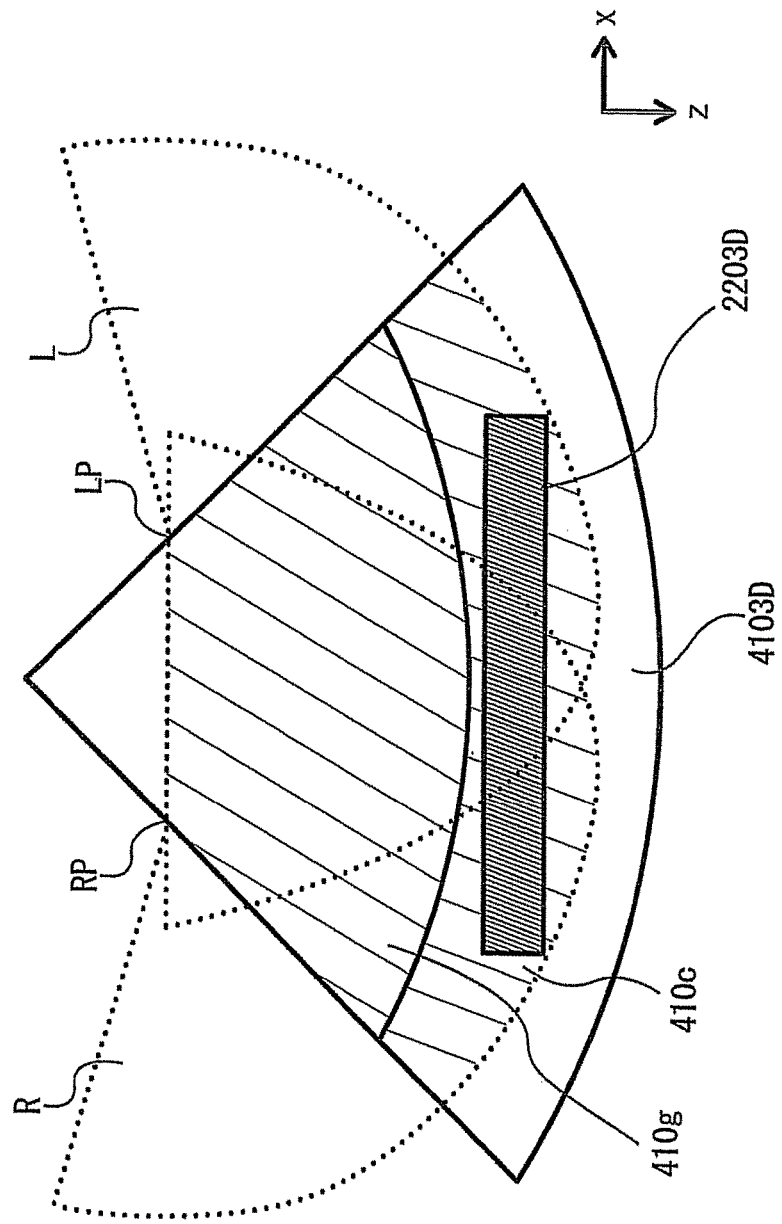
FIG. 12 is a schematic diagram illustrating an example of a manipulation region and a gesture region in the detection region.
Figure 13:
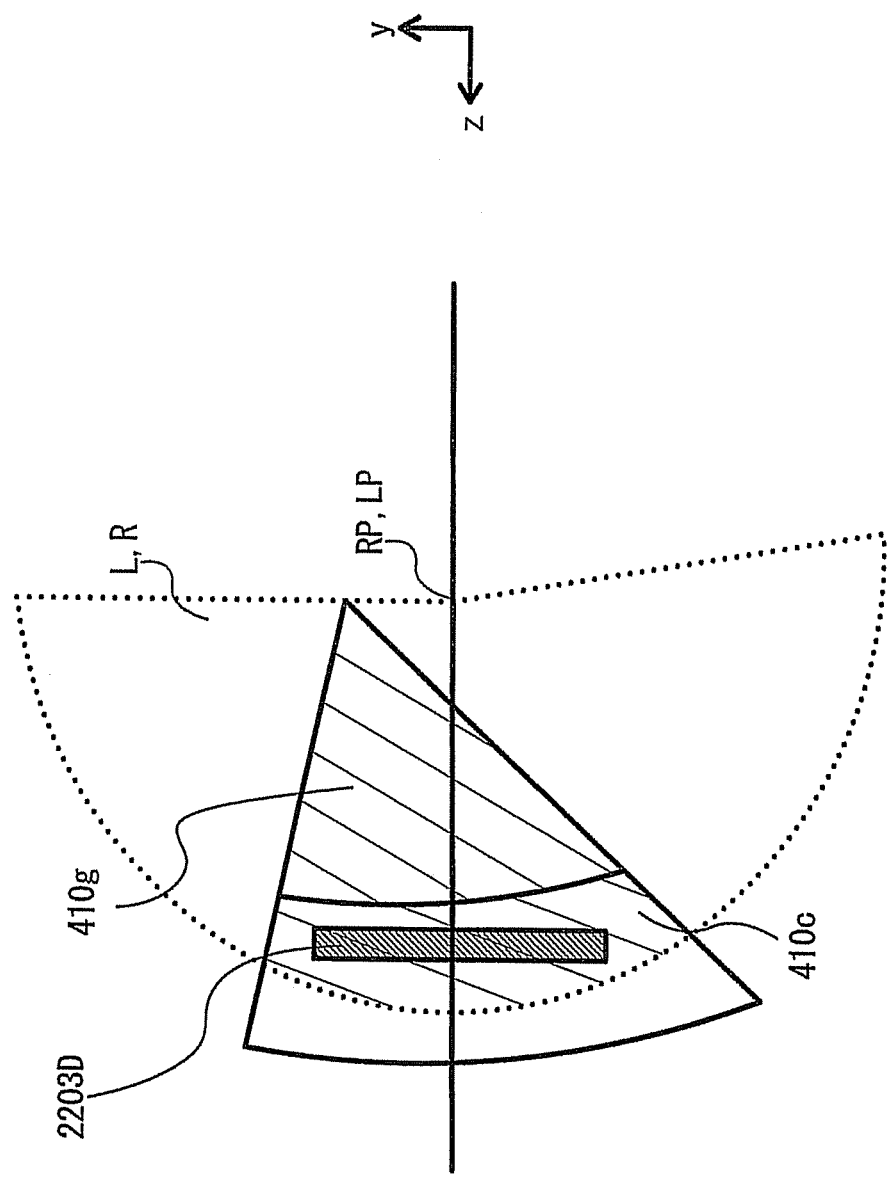
FIG. 13 is a schematic diagram illustrating an example of the manipulation region and the gesture region in the detection region.

Next, a manipulation region and a gesture region in the detection region are described. FIG. 12 and FIG. 13 are schematic diagrams illustrating an example of the manipulation region and the gesture region in the detection region.

First, as illustrated in FIG. 12, in general, the user horizontally moves both his/her hands about both his/her shoulder joints (a right shoulder joint RP and a left shoulder joint LP) as the respective centers of rotation, and hence both his/her hands can respectively move within a movement region L and a movement region R surrounded by dotted lines.

Moreover, as illustrated in FIG. 13, in general, the user vertically moves both his/her hands about both his/her shoulder joints (the right shoulder joint RP and the left shoulder joint LP) as the respective centers of rotation, and hence both his/her hands can respectively move within the movement region L and the movement region R surrounded by dotted lines.

That is, as illustrated in FIG. 12 and FIG. 13, the user can move both his/her hands about the right shoulder joint RP and the left shoulder joint LP as the respective centers of rotation, in a three-dimensional space having an imperfect spherical shape (having an arch-like curved surface that is convex in the depth level direction).

Then, an overlapping space region of all of: the three-dimensional space detection region 4103D of the infrared ray detection unit 410; a region in which a virtual image display region can exist (in FIG. 12, the virtual image display region 2203D is illustrated as an example); and a region obtained by integrating the arm movement region L and the arm movement region R is set as a manipulation region 410c.

Moreover, a portion other than the manipulation region 410c in the three-dimensional space detection region 4103D is set as a gesture region 410g, the portion overlapping with the region obtained by integrating the arm movement region L and the arm movement region R.

Here, the manipulation region 410c has a stereoscopic shape whose farthest surface in the depth level direction is an arch-like curved surface that is convex in the depth level direction (z-axis positive direction), whereas the virtual image display region 2203D has a stereoscopic shape whose farthest surface in the depth level direction is a planar surface. Due to such a difference in the shape of the farthest surface between the two regions, the user physically feels a sense of discomfort during the manipulation. In order to solve the sense of discomfort, adjustment is performed in a calibration process. Moreover, the details of the calibration process are described below.

(Description of Calibration)

Figure 14:
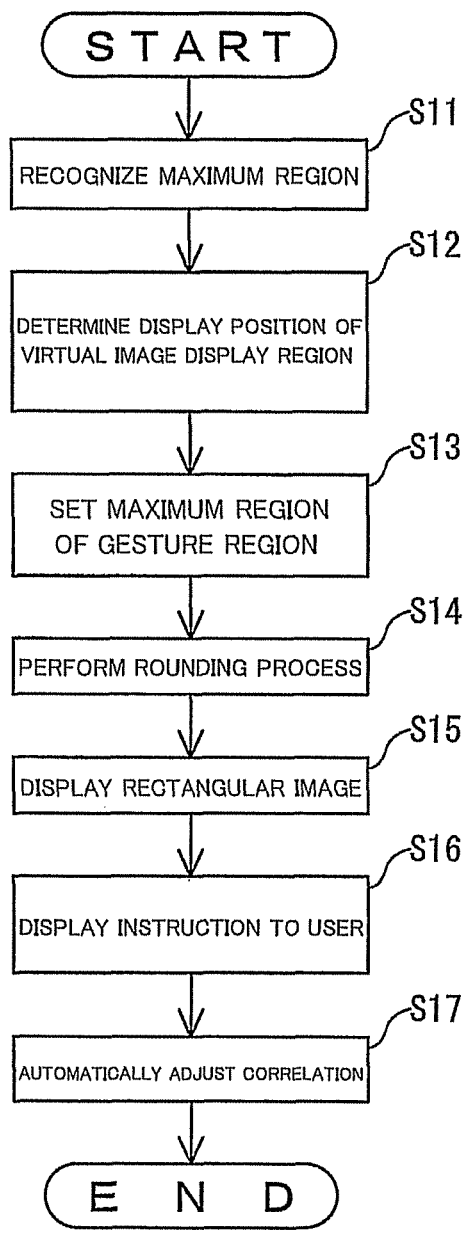
FIG. 14 is a flowchart for describing a calibration process.

Next, the calibration process is described. FIG. 14 is a flowchart for describing the calibration process.

As illustrated in FIG. 12 and FIG. 13, when the user tries to move his/her hand(s) along the virtual image display region 2203D, the user needs to move his/her hand(s) along a plane without any guide. Accordingly, the calibration process is performed to facilitate the manipulation in the virtual image display region 2203D through a reorganization process to be described below.

Moreover, in the calibration process, the finger length, the hand length, and the arm length, which are different for each user, are also adjusted.

Hereinafter, description is given with reference to FIG. 14. First, the glasses display device 100 is attached to the user, and the user maximally stretches both his/her arms. As a result, the infrared ray detection unit 410 recognizes the maximum region of the manipulation region 410c (Step S11).

That is, because the finger length, the hand length, and the arm length are different for each user, the manipulation region 410c is adjusted to suit each user.

Then, in the glasses display device 100, a display position of the virtual image display region 2203D is determined (Step S12). That is, if the virtual image display region 2203D is arranged outside of the manipulation region 410c, a user's manipulation becomes impossible, and hence the virtual image display region 2203D is arranged inside of the manipulation region 410c.

Subsequently, the maximum region of the gesture region 410g is set within the three-dimensional space detection region 4103D of the infrared ray detection unit 410 of the glasses display device 100 so as not to overlap with the display position of the virtual image display region 2203D (Step S13).

Note that it is preferable that the gesture region 410g be arranged so as not to overlap with the virtual image display region 2203D and be provided with a thickness in the depth direction (z-axis positive direction).

In the present embodiment, the manipulation region 410c, the virtual image display region 2203D, and the gesture region 410g are set in such a manner as described above.

Next, calibration of the virtual image display region 2203D in the manipulation region 410c is described.

In the case where it is determined that the finger(s), the hand(s), or the arm(s) of the user exist around the outside of the virtual image display region 2203D in the manipulation region 410c, such rounding as if the finger(s), the hand(s), or the arm(s) of the user existed inside of the virtual image display region 2203D is performed (Step S14).

As illustrated in FIG. 12 and FIG. 13, in a region near a central part of an image virtually displayed by the semi-transmissive displays 220, if the user maximally stretches both his/her arms, the tips of both his/her hands do not stay within the virtual image display region 2203D and go out thereof in the depth direction (z-axis positive direction). Meanwhile, in an end part of the virtually displayed image, unless the user maximally stretches both his/her arms, it is not determined that the tips of both his/her hands exist within the virtual image display region 2203D.

Hence, if a signal from the infrared ray detection unit 410 is used without being processed, even if the tips of his/her hands go out of the virtual image display region 2203D, the user has difficulty in physically feeling such a state.

Accordingly, in the process of Step S14 in the present embodiment, the signal from the infrared ray detection unit 410 is processed such that the tips of his/her hands that protrude to the outside of the virtual image display region 2203D are corrected to exist within the virtual image display region 2203D.

As a result, in the state where the user maximally stretches or slightly bends both his/her arms, a manipulation from the central part to the end part in the planar virtual image display region 2203D with a depth is possible.

Note that, although the virtual image display region 2203D is formed by a three-dimensional space region whose farthest surface in the depth level direction is a planar surface in the present embodiment, not limited thereto, the virtual image display region 2203D may be formed by a three-dimensional space region that is a curved surface having a shape along the farthest surfaces in the depth level direction of the farthest surface regions L and R in the depth level direction. As a result, in the state where the user maximally stretches or slightly bends both his/her arms, a manipulation from the central part to the end part in the planar virtual image display region 2203D with a depth is possible.

Further, the semi-transmissive displays 220 display a rectangular image in the virtual image display region 2203D. For example, as illustrated in FIG. 5(b), the semi-transmissive displays 220 display a rectangular image (Step S15).

Subsequently, an instruction to the effect that "please surround the displayed image with your fingers" is displayed on the semi-transmissive displays 220 (Step S16). Here, a finger-shaped image may be softly displayed in the vicinity of the image, and a vocal instruction from the speaker may be given to the user instead of such display on the semi-transmissive displays 220.

According to the instruction, the user places his/her fingers on a portion of the image as illustrated in FIG. 5(d). Then, a correlation between the display region of the virtual image display region 2203D and the infrared ray detection unit 410 is automatically adjusted (Step S17).

Note that, in the above example, the user defines a rectangular with his/her fingers, and places the rectangular thus defined on the rectangular of the outer edge of the image. For this reason, the visual recognition size and position of the rectangular defined by his/her fingers is made coincident with the visual recognition size and position of the rectangular of the outer edge of the image. However, the method of defining a shape with fingers is not limited thereto, and may be other arbitrary methods such as a method of tracing the outer edge of the displayed image with a finger and a method of pointing to a plurality of points on the outer edge of the displayed image with a finger. Moreover, these methods may be applied to images having a plurality of sizes.

Note that, although only the case of the glasses display device 100 is taken in the above description of the calibration process, in the case of the I/O device 900, an image may be displayed in the process of Step S11, and a correlation between the displayed image and the infrared ray detection unit 410 may be adjusted in the process of Step S17.

(Shape Recognition)

Figure 15:
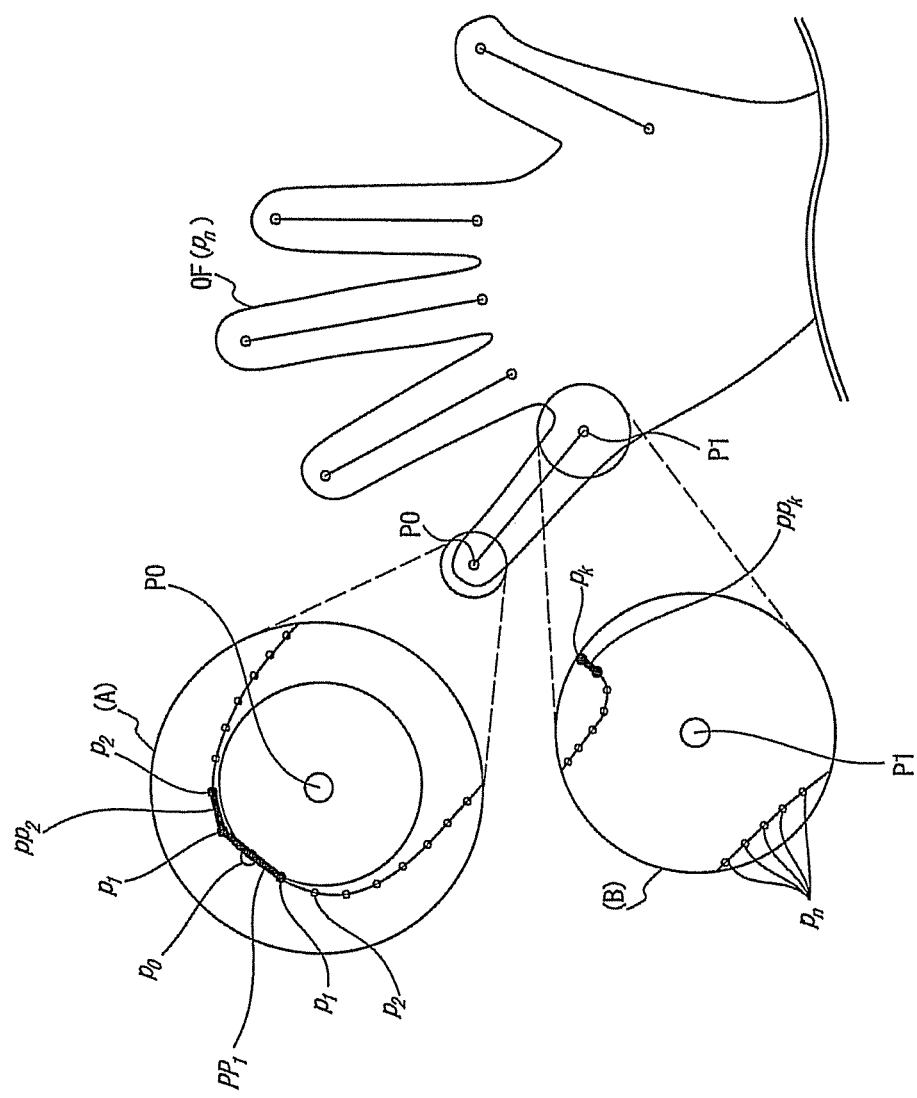
FIG. 15 is a schematic diagram illustrating an example of finger recognition.
Figure 16:
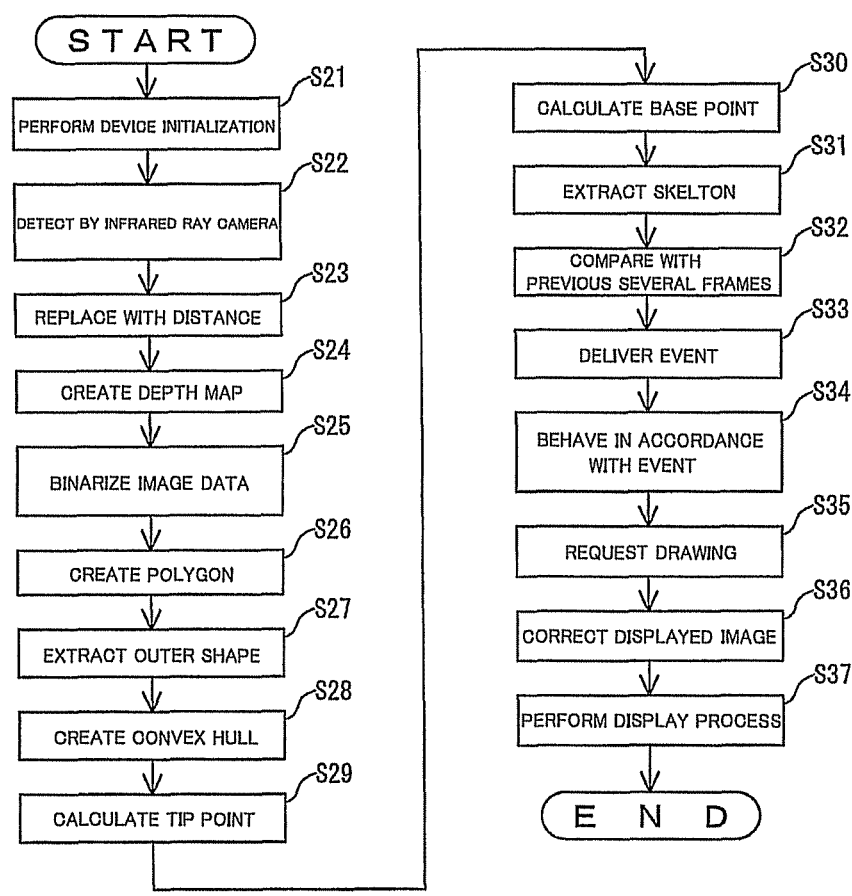
FIG. 16 is a flowchart illustrating an example of a finger recognition process.

Next, finger recognition is described, followed by description of palm recognition and arm recognition in the stated order. FIG. 15 is a schematic diagram illustrating an example of the finger recognition. In FIG. 15, (A) is an enlarged view of the vicinity of the tip of a finger, and (B) is an enlarged view of the vicinity of the base of the finger. FIG. 16 is a flowchart illustrating an example of the finger recognition process.

As illustrated in FIG. 16, in the present embodiment, device initialization is performed (Step S21). Then, an infrared ray that has been emitted from the infrared ray emission element 411 and has been reflected on a hand is detected by the infrared ray detection camera 412 (Step S22).

Then, image data is replaced with a distance on a pixel basis by the infrared ray detection unit 410 (Step S23). In this case, the luminance of the infrared ray is inversely proportional to the cube of the distance. A depth map is created using this fact (Step S24).

Subsequently, an appropriate threshold is set to the created depth map. Then, the image data is binarized (Step S25). That is, noise is removed from the depth map.

Subsequently, a polygon having about 100 vertexes is created from the binarized image data (Step S26). Then, a new polygon having a larger number of vertexes $p_n$ is created using a low-pass filter (LPF) such that the vertexes become smoother, whereby an outer shape OF of the hand illustrated in FIG. 15 is extracted (Step S27).

Note that, although the number of vertexes that are extracted from the data binarized in Step S26 in order to create a polygon is about 100 in the present embodiment, not limited thereto, the number of vertexes may be 1,000 or other arbitrary numbers.

(Finger Recognition)

A convex hull is extracted using Convex Hull from the set of the vertexes $p_n$ of the new polygon created in Step S27 (Step S28).

After that, a vertex $p_0$ common between the new polygon created in Step S27 and the convex hull created in Step S28 is extracted (Step S29). The common vertex $p_0$ itself thus extracted can be used as a tip point of the finger.

Further, another point calculated on the basis of the position of the vertex $p_0$ may be used as the tip point of the finger. For example, as illustrated in FIG. 15(A), the center of an inscribed circle of the outer shape OF at the vertex $p_0$ may also be calculated as a tip point P0.

Then, as illustrated in FIG. 15, a vector of a reference line segment $PP_1$ that passes through a pair of right and left vertexes $p_1$ adjacent to the vertex $p_0$ is calculated. After that, a side $pp_2$ connecting each vertex $p_1$ and a vertex $p_2$ adjacent thereto is selected, and a vector of the side $pp_2$ is calculated. Similarly, with the use of the vertexes $p_n$ forming the outer shape OF, such a process of obtaining a vector of each side is repeated along the outer periphery of the outer shape OF. The direction of each side and the direction of the reference line segment $PP_1$ calculated in the process of Step S30 are compared with each other, and a side $pp_k$ that is close to parallel to the reference line segment $PP_1$ is determined to exist at the position of a valley between fingers. Then, a base point P1 of the finger is calculated on the basis of the position of the side $pp_k$ (Step S30). A skeleton of the finger can be obtained by connecting the tip point P0 of the finger and the base point P1 of the finger using a straight line (Step S31). If the skeleton of the finger are obtained, the extending direction of the finger can be recognized.

A similar process is performed on all the fingers, whereby the skeletons of all the fingers are obtained. As a result, the pose of the hand can be recognized. That is, it can be recognized which of the thumb, the index finger, the middle finger, the ring finger, and the little finger is stretched and which thereof is bent.

Subsequently, a difference in the pose of the hand is detected in comparison with image data of several frames taken immediately before (Step S32). That is, movement of the hand can be recognized through the comparison with the image data of the several frames taken immediately before.

Subsequently, the recognized shape of the hand is event-delivered as gesture data to the event service unit 460 (Step S33).

Subsequently, a behavior according to the event is carried out by the application unit 459 (Step S34).

Subsequently, drawing in a three-dimensional space is requested by the view service unit 462 (Step S35).

The graphics processor unit 463 refers to the calibration data unit 457 using the calibration service unit 461, and corrects the displayed image (Step S36).

Lastly, the resultant image is displayed on the semi-transmissive displays 220 by the display processor unit 464 (Step S37).

Note that, although the base point of each finger is detected through the process of Step S30 and the process of Step S31 in the present embodiment, the method of detecting the base point is not limited thereto. For example, first, the length of the reference line segment $PP_1$ is calculated, the reference line segment $PP_1$ connecting the pair of vertexes $p_1$ that are adjacent to the vertex $p_0$ on one side and another side of the vertex $p_0$, respectively. Then, the length of a line segment connecting the pair of vertexes $p_2$ on the one side and the another side is calculated. Similarly, the length of each line segment connecting a pair of vertexes on the one side and the another side is calculated in order from vertexes positioned closer to the vertex $p_0$ to vertexes positioned farther therefrom. Such line segments do not intersect with one another inside of the outer shape OF, and are substantially parallel to one another. In the case where the vertexes at both the ends of such a line segment are in the portion of the finger, the length of the line segment corresponds to the width of the finger, and hence the amount of change thereof is small. Meanwhile, in the case where at least any of the vertexes at both the ends of such a line segment reaches the portion of the valley between the fingers, the amount of change of the length becomes larger. Accordingly, a line segment that has the length whose amount of change does not exceed a predetermined amount and is the farthest from the vertex $p_0$ is detected, and one point on the detected line segment is extracted, whereby the base point can be determined.

(Another Example of Finger Recognition)

Figure 17:
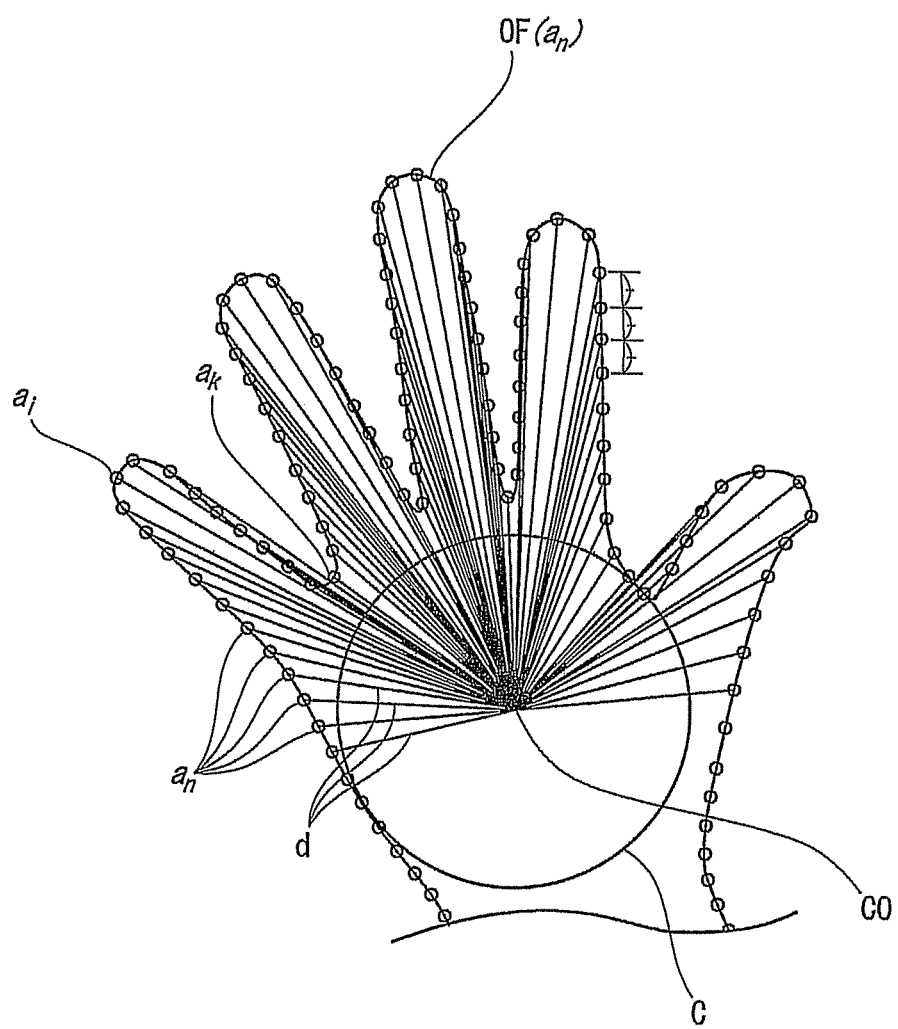
FIG. 17 is a schematic diagram illustrating another example of the finger recognition.
Figure 18:
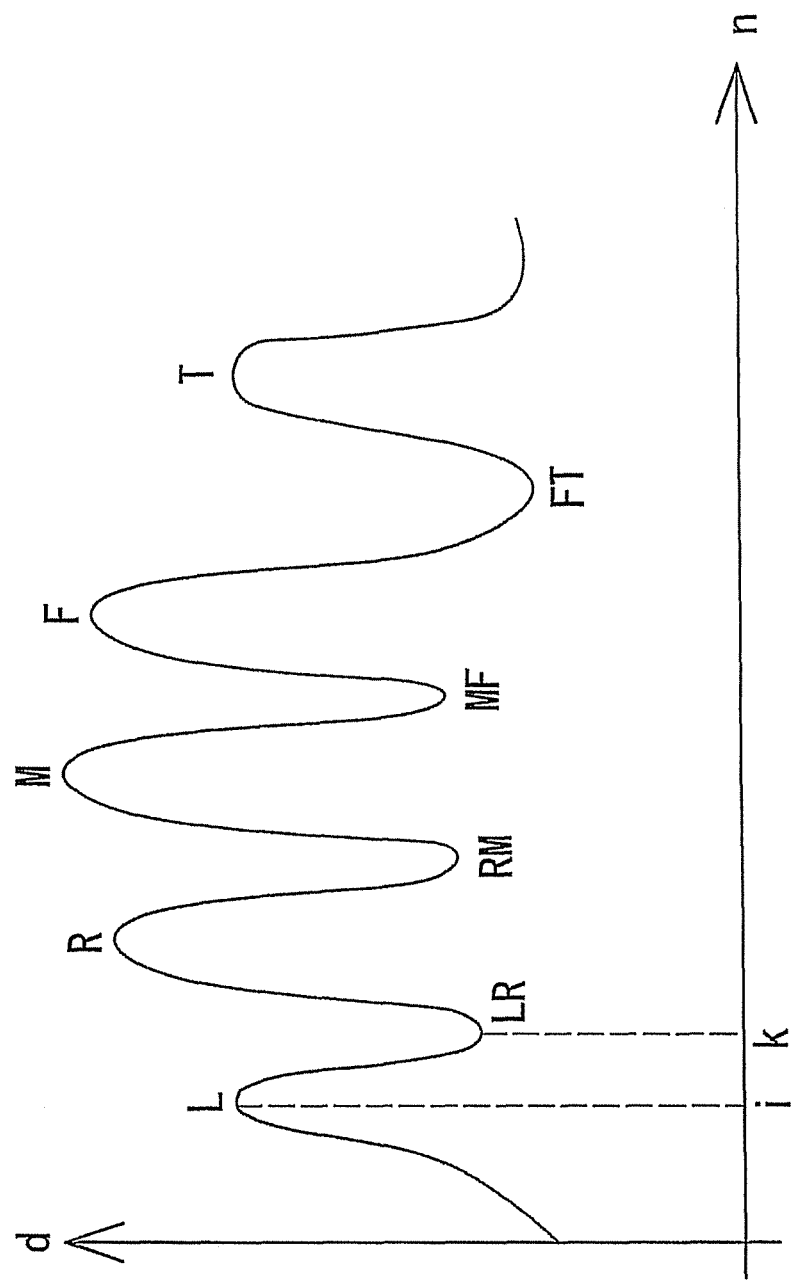
FIG. 18 is a graph illustrating an example of the process in FIG. 17.
Figure 19:
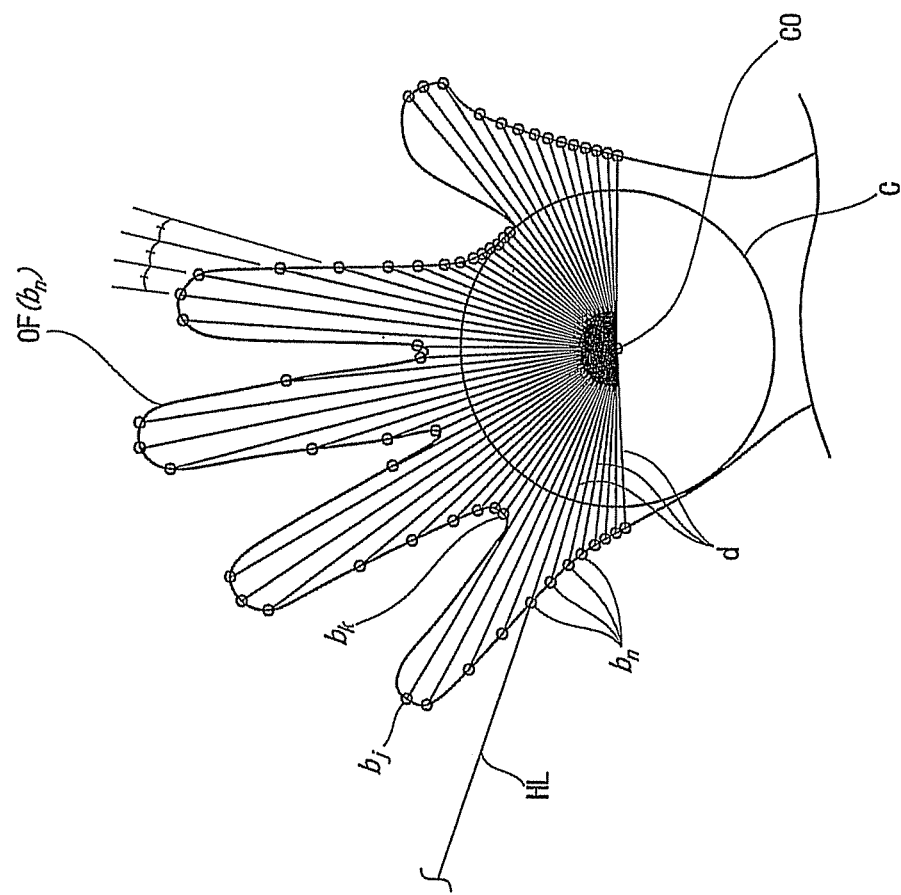
FIG. 19 is a schematic diagram illustrating still another example of the finger recognition.

FIG. 17 is a schematic diagram illustrating another example of the finger recognition, FIG. 18 is a graph illustrating an example of the process in FIG. 17, and FIG. 19 is a schematic diagram illustrating still another example of the finger recognition.

Similarly to the embodiment described with reference to FIG. 16, in the present embodiment, a polygon having about 100 vertexes is created from the image data obtained by processing the depth map obtained using the infrared ray detection camera 412 (see Step S26 in FIG. 16). Then, also in the present embodiment, a new polygon having a larger number of vertexes $a_n$ is created through a low-pass filter (LPF) process such that the vertexes become smoother, whereby an outer shape OF of the hand illustrated in FIG. 17 is extracted (see Step S27 in FIG. 16).

As illustrated in FIG. 17, a maximum inscribed circle C of the outer shape OF of the hand is extracted. As described later with reference to FIG. 20, the maximum inscribed circle C can be recognized as the position of a portion of the palm (or the dorsum). Further, in the present embodiment, a center C0 of the maximum inscribed circle C is extracted as a reference point (hereinafter, the reference point C0).

Then, a distance d between each of the vertexes $a_n$ that constitute the outer shape OF and are set at predetermined intervals and the reference point C0 is measured. In particular, in the case of the stretched fingers as illustrated in FIG. 17, the distance d between the reference point C0 and each vertex $a_n$ tends to become larger with the decreasing distance from the tip of each finger, and tends to become smaller with the decreasing distance from between the fingers. The finger tip parts and the interdigital parts can be recognized on the basis of such tendencies.

Specifically, the vertexes $a_n$ are scanned in one direction from an ulnar side (little finger side) to a radial side (thumb side) along the outer shape OF, the distance between the reference point C0 and each vertex $a_n$ is measured, and a relation between a scanning point count n and the distance d is examined. A graph showing the relation is illustrated in FIG. 18 (whose vertical axis represents the distance d and whose horizontal axis represents the scanning point count n). Note that the horizontal axis may represent the scanning distance instead of the scanning point count n. As illustrated in FIG. 18, the distance d to the scanning point count n exhibits a curved line having extrema. In this case, the vicinity of the position of the vertex $a_n$ corresponding to the scanning point count n in the case where the distance d exhibits an extremum can be determined as a finger feature part.

For example, the position of a vertex $a_i$ (see FIG. 17) corresponding to a scanning point count i in the case where the distance d exhibits L that is one of the maxima in FIG. 18 can be determined as a finger tip part. The same applies to other maxima R, M, F, and T.

The vertex $a_i$ used for the determination of the finger tip part can also be treated as a finger tip point, similarly to the common vertex $p_0$ (see (A) in FIG. 15) extracted in Step S29 in FIG. 16. Moreover, similarly to (A) in FIG. 15, the vertex $a_i$ can be calibrated to the center of an inscribed circle of the outer shape OF at the vertex $a_i$, and the center of the inscribed circle can also be treated as the tip point P0.

Moreover, the position of a vertex $a_k$ (see FIG. 17) corresponding to a scanning point count k in the case where the distance d exhibits LR that is one of the minima in FIG. 18 can be determined as an interdigital part. The same applies to other minima RM, MF, and FT.

The vertex $a_k$ used for the determination of the interdigital part can be used for, for example, determination of the ulnar side and the radial side on the basis of the fact that the distance d between the thumb and the index finger (FT in FIG. 18) is smaller than the distances d between the other fingers.

Moreover, the vertex $a_k$ used for the determination of the interdigital part may be treated similarly to a vertex $p_k$ (see (B) in FIG. 15) in Step S30 in FIG. 16 for extracting a finger base point.

The vertex $a_k$ used for the determination of the interdigital part may be treated differently from a finger base point as in the above-mentioned example, and may be calibrated as appropriate to be thereby treated as a point almost equivalent to a finger base point.

Although the mode in which all the fingers are opened and stretched is illustrated in FIG. 17, for example, in the case where only the index finger and the middle finger are opened and stretched, maxima similar to F and M appear in the graph of FIG. 18, whereas maxima similar to the other maxima do not appear therein. Moreover, a minimum similar to MF or minima similar to MF and RM appear therein, whereas minima similar to the other minima do not appear therein.

Although the mode of measuring the distance between each of the vertexes $a_n$ that constitute the outer shape OF and are set at predetermined intervals and the reference point C0 is adopted as the method of acquiring the distance d in the example of FIG. 17, the method of acquiring the distance d is not limited to this method.

For example, as illustrated in FIG. 19, a half line HL may be drawn through a rotation for each predetermined angle about the reference point C0 as the rotation center, an outer shape point $b_n$ may be obtained as an intersection point between each half line HL and the outer shape OF, and the distance d between each outer shape point $b_n$ and the reference point C0 may be acquired.

In this case, similarly to the case of FIG. 17, the distance d between the reference point C0 and each outer shape point $b_n$ tends to become larger with the decreasing distance from the tip of each finger, and tends to become smaller with the decreasing distance from between the fingers. The finger tip parts and the interdigital parts can be recognized on the basis of such tendencies. A relation between the scanning point count n and the distance d in the case where the outer shape points $b_n$ are scanned in one direction from the ulnar side (little finger side) to the radial side (thumb side) along the outer shape OF has features common to those in FIG. 18. Hence, each finger tip part can be determined on the basis of an outer shape point $b_j$ in the case of exhibiting a maximum, and each interdigital part can be determined on the basis of an outer shape point $b_k$ in the case of exhibiting a minimum.

(Palm Recognition)

Figure 20:
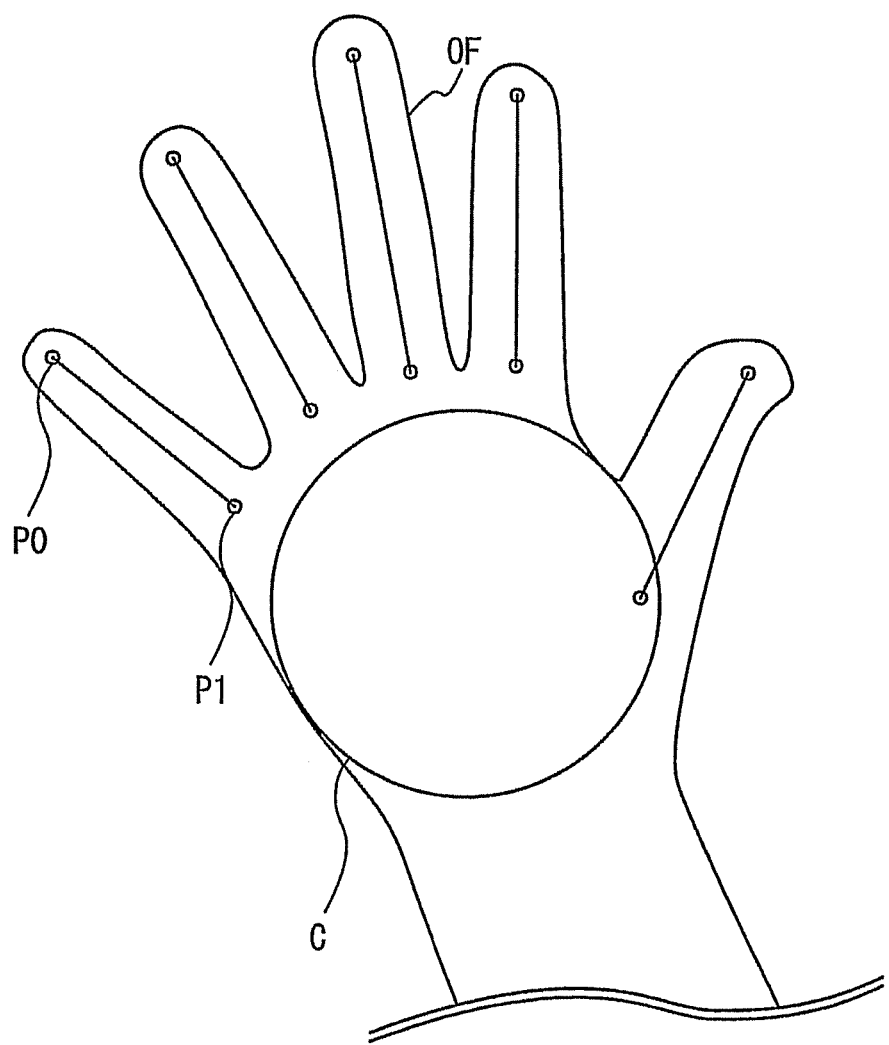
FIG. 20 is a schematic diagram illustrating an example of palm recognition.

Next, FIG. 20 is a schematic diagram illustrating an example of the palm recognition.

As illustrated in FIG. 20, after the finger recognition is carried out, a maximum inscribed circle C inscribed in the outer shape OF of the image data is extracted. The position of the maximum inscribed circle C can be recognized as the position of the palm.

Figure 21:
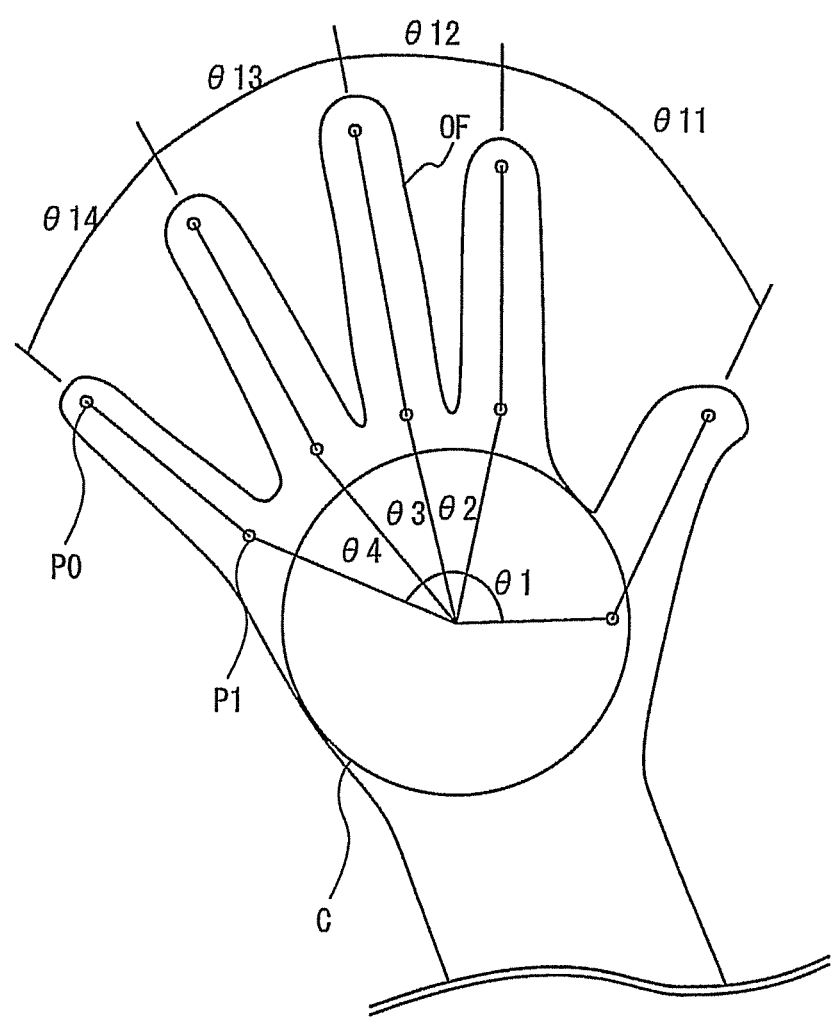
FIG. 21 is a schematic diagram illustrating an example of thumb recognition.

Next, FIG. 21 is a schematic diagram illustrating an example of thumb recognition.

As illustrated in FIG. 21, the thumb has features different from those of the other four fingers of the index finger, the middle finger, the ring finger, and the little finger. For example, among angles θ1, θ2, θ3, and θ4 mutually formed by straight lines connecting: the center of the maximum inscribed circle C indicating the position of the palm; and the respective base points P1 of the fingers, θ1 concerning the thumb tends to be the largest. Moreover, among angles θ11, θ12, θ13, and θ14 mutually formed by straight lines connecting: the respective tip points P0 of the fingers; and the respective base points P1 of the fingers, θ11 concerning the thumb tends to be the largest. The thumb is determined on the basis of such tendencies. As a result, it can be determined whether the image data is a right hand or a left hand or whether the image data is the front side or the back side of the palm.

(Arm Recognition)

Next, the arm recognition is described. In the present embodiment, the arm recognition is carried out after any of the fingers, the palm, and the thumb is recognized. Note that the arm recognition may also be carried out before any of the fingers, the palm, and the thumb is recognized or at the same time as at least any thereof is recognized.

In the present embodiment, a polygon is extracted from a region larger than the polygon of the shape of the hand of the image data. For example, the processes of Steps S21 to S27 are carried out in a length range of 5 cm or more and 100 cm or less and, more preferably, a length range of 10 cm or more and 40 cm or less, so that an outer shape is extracted.

After that, a quadrangular frame circumscribed around the extracted outer shape is selected. In the present embodiment, the shape of the quadrangular frame is a parallelogram or a rectangle.

In this case, because the parallelogram or the rectangle has longer sides opposed to each other, the extending direction of the arm can be recognized from the extending direction of the longer sides, and the direction of the arm can be determined from the direction of the longer sides. Note that, similarly to the process of Step S32, movement of the arm may be detected in comparison with image data of several frames taken immediately before.

Note that, although the fingers, the palm, the thumb, and the arm are detected from a two-dimensional image in the above description, not limited thereto, the infrared ray detection unit 410 may be further provided, or only the infrared ray detection camera 412 may be further provided, and a three-dimensional image may be recognized from two-dimensional images. As a result, the recognition accuracy can be further enhanced.

(Recognition of Palmar Side and Dorsal Side of Hand)

FIG. 22(a) is a schematic external view in the case where a hand (right hand) in the form of a first that is a recognition target is visually recognized on the palmar side (hereinafter, the hand $H1_P$), and FIG. 22(b) is a schematic external view in the case where the hand is visually recognized on the dorsal side (hereinafter, the hand $H1_D$).

Similarly to the embodiment described with reference to FIG. 16, in the present embodiment, a polygon having about 100 vertexes is created from the image data obtained by processing the depth map obtained using the infrared ray detection camera 412 (see Step S26 in FIG. 16). Then, also in the present embodiment, a new polygon having a larger number of vertexes is created through a low-pass filter (LPF) process such that the vertexes become smoother, whereby an outer shape $OF_P$ of the hand in the form of a first on the palmar side illustrated in FIG. 23(a) and an outer shape $OF_D$ of the hand in the form of a first on the dorsal side illustrated in FIG. 23(b) are extracted (see Step S27 in FIG. 16).

The outer shape OF in FIG. 23(a) and the outer shape $OF_D$ in FIG. 23(b) resemble each other, and are difficult to distinguish one from the other. Accordingly, the following process is performed, which makes it possible to distinguish whether the recognition target shows the palmar side or the dorsal side.

In order to extract a plurality of points in the outer shapes OF and $OF_D$, first, a maximum inscribed circle C of each of the outer shapes OF and $OF_D$ is extracted. Further, a center C0 of the maximum inscribed circle C is extracted as a reference point (hereinafter, the reference point C0).

Figure 23:
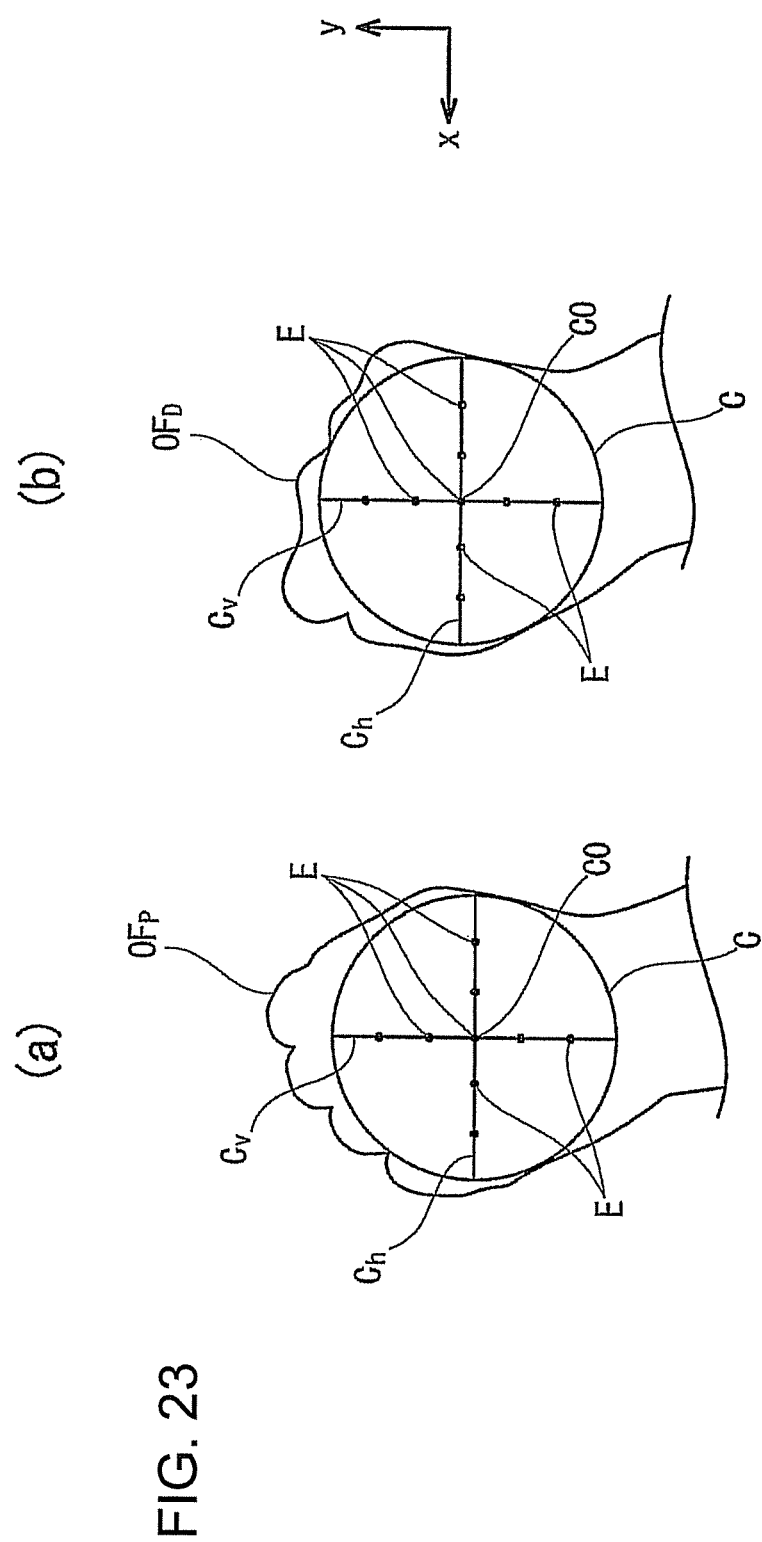
FIG. 23 are schematic diagrams of outer shapes and extraction point settings in FIG. 22(a) and FIG. 22(b), illustrating an example of a process of recognizing the palmar side in FIG. 22(a) and the dorsal side in FIG. 22(b).

Further, a chord of the maximum inscribed circle C is set so as to pass through the reference point C0. For example, as illustrated in FIG. 23(a) and FIG. 23(b), a chord $C_v$ in the vertical direction (y-axis direction) and a chord $C_h$ in the horizontal direction (x-axis direction) are defined. Extraction points E are set at predetermined intervals onto the defined chords $C_v$ and $C_h$. In this case, it is preferable that the reference point C0 be also set as the extraction point E. In FIG. 23, five extraction points E including the reference point C0 are set for each chord.

Further, points on the surfaces of the hands $H1_P$ and $H1_D$ are set as target points S, the points being obtained by respectively superimposing the outer shapes OF and $OF_D$ of the hand onto the hands $H1_P$ and $H1_D$ and projecting the extraction points E onto the surfaces of the hands $H1_P$ and $H1_D$ in the z-axis direction.

Figure 24:
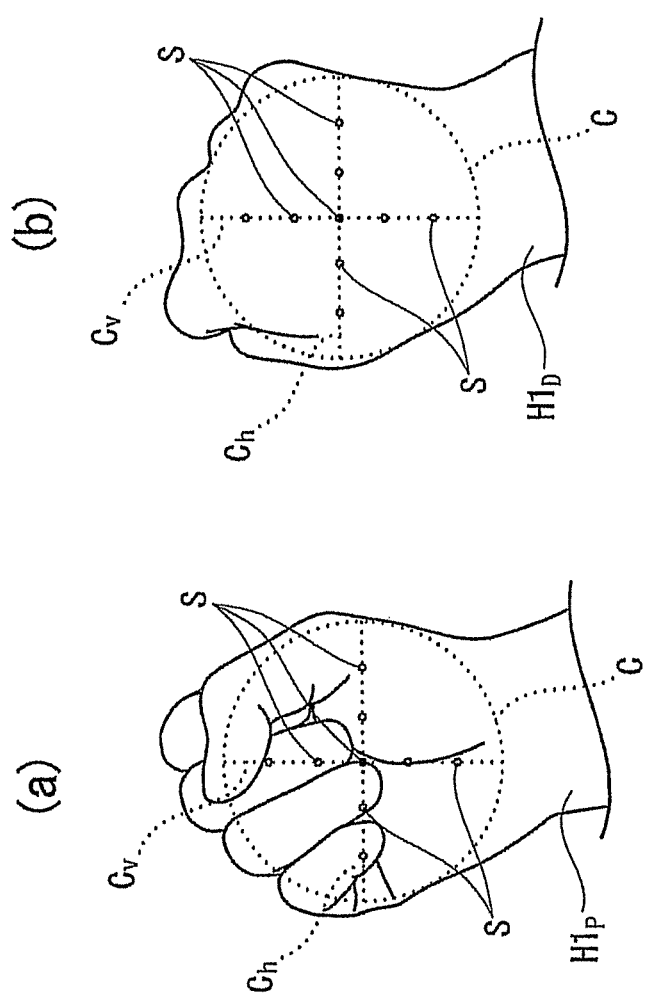

FIG. 24(a) and FIG. 24(b) are schematic diagrams in which the outer shape OF in FIG. 23(a) and the outer shape $OF_D$ in FIG. 23(b) are respectively superimposed on the hands $H1_P$ and $H1_P$.

The distance from the infrared ray detection unit 410, that is, a depth level DP is measured for each of the set target points S. The measured depth levels DP are statistically tallied. Specifically, a criterion for fluctuations in the measured depth levels is obtained. For example, at least any of standard deviation, dispersion, a range (that is, a range whose upper limit and lower limit are respectively the maximum value and the minimum value), a quartile range, mean difference, and mean absolute deviation may be used as the criterion for the fluctuations.

Figure 26:
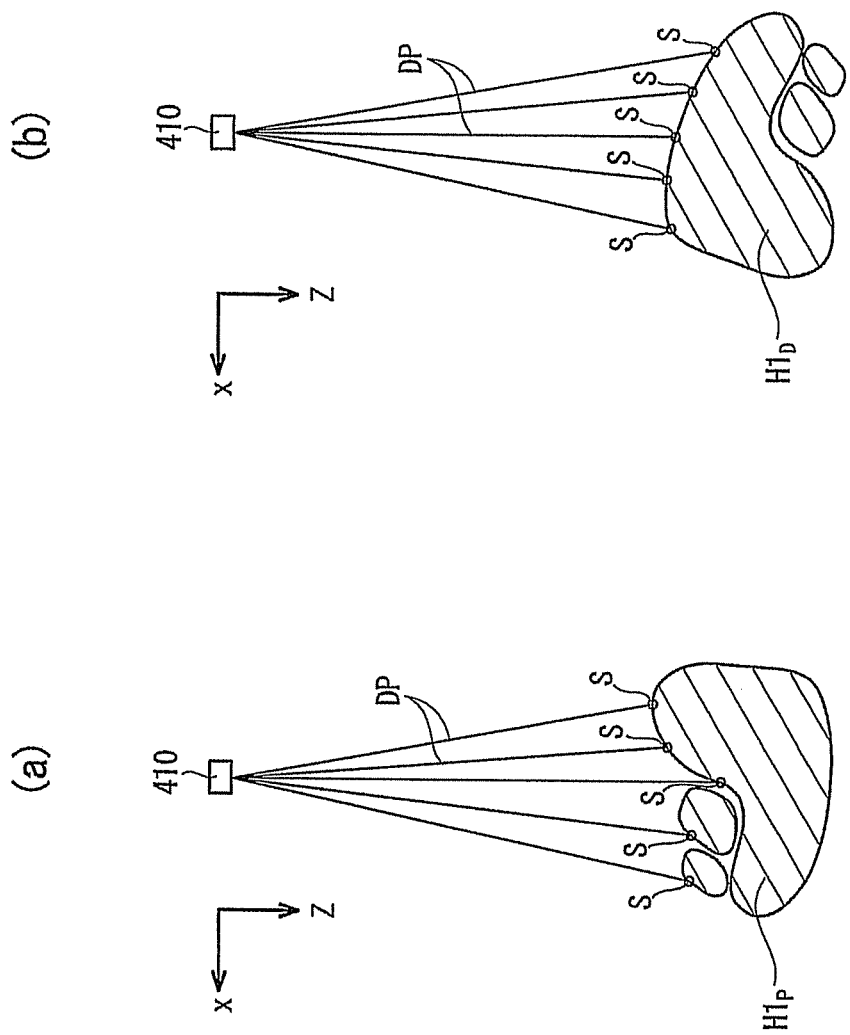
FIG. 26 are schematic diagrams respectively illustrating cross-sections of the hand $H1_P$ and the hand $H1_D$ that are taken along a plane parallel to an x-z plane including a chord $C_h$ in FIG. 24(a) and FIG. 24(b).

Here, FIG. 25(a) is a schematic diagram illustrating a cross-section of the hand $H1_P$ taken along a plane parallel to the y-z plane including the chord $C_v$ in FIG. 24(a), and FIG. 25(b) is a schematic diagram illustrating a cross-section of the hand $H1_D$ taken along a plane parallel to the y-z plane including the chord $C_v$ in FIG. 24(b). Moreover, FIG. 26(a) is a schematic diagram illustrating a cross-section of the hand $H1_P$ taken along a plane parallel to the x-z plane including the chord $C_h$ in FIG. 24(a), and FIG. 26(b) is a schematic diagram illustrating a cross-section of the hand $H1_D$ taken along a plane parallel to the x-z plane including the chord $C_h$ in FIG. 24(b).

As illustrated in FIG. 25(a) and FIG. 26(a), in the case of the hand H1 showing the palmar side, irregularities on the palmar surface are large, and hence fluctuations in the respective depth levels DP to the target points S are large. Meanwhile, as illustrated in FIG. 25(b) and FIG. 26(b), in the case of the hand $H1_D$ showing the dorsal side, there are almost no irregularities on the dorsal surface, and hence fluctuations in the respective depth levels DP to the target points S are small.

In this way, the hand $H1_P$ on the palmar side and the hand $H1_D$ on the dorsal side can be recognized from each other on the basis of the fact that the criterion for the fluctuations in the depth levels DP is relatively different from each other.

For example, in the case of using standard deviation as the criterion for the fluctuations, a reference value of the standard deviation as a determination reference is defined, and the hand can be determined to show the palmar side in the case of the reference value or more, and can be determined to show the dorsal side in the case of below the reference value.

(Another Example of Recognition of Palmar Side and Dorsal Side of Hand)

Figure 27:
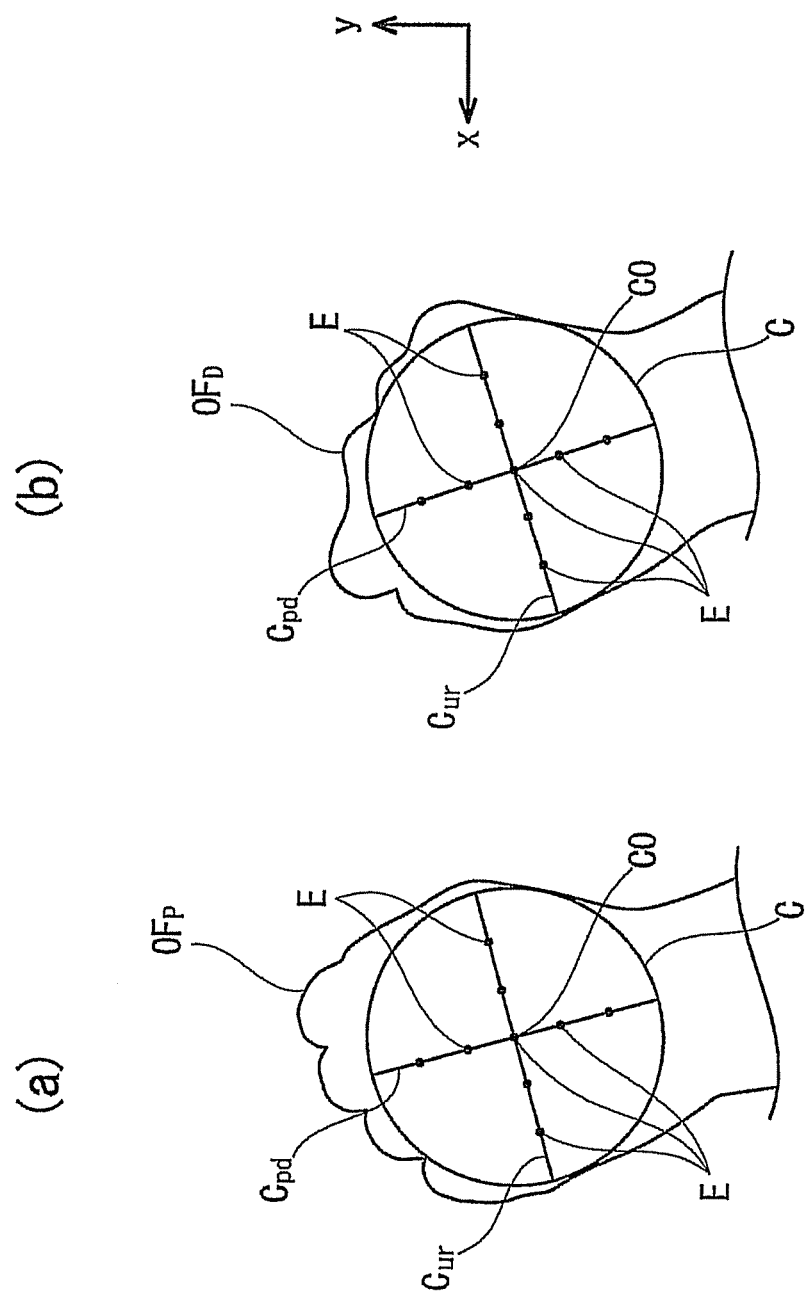
FIG. 27 are schematic diagrams of the outer shapes and the extraction point settings in FIG. 22(a) and FIG. 22(b), illustrating another example of the process of recognizing the palmar side in FIG. 22(a) and the dorsal side in FIG. 22(b).

FIG. 27 are schematic diagrams of the outer shapes and the extraction point settings in FIG. 22(a) and FIG. 22(b), illustrating another example of the process of recognizing the palmar side in FIG. 22(a) and the dorsal side in FIG. 22(b). In FIG. 27, a chord $C_{pd}$ in a direction connecting a proximal side and a distal side of each of the hands H1p and $H1_D$ and a chord $C_{ur}$ perpendicular to the chord $C_{pd}$ are set as chords that pass through the reference point C0. Note that the chord $C_{pd}$ can be set as a chord parallel to the extending direction of the arm.

Further, similarly to the above-mentioned example, the plurality of extraction points E are set at predetermined intervals onto the defined chords $C_{pd}$ and $C_{ur}$, the plurality of target point S are set by projecting the extraction points E onto the hands $H1_P$ and $H1_D$ in the z-axis direction, fluctuations in the depth levels DP are examined for the plurality of target points S, and the palmar side and the dorsal side are recognized. The recognition of the palmar side and the dorsal side can be based on the relation between the magnitude of the fluctuations in the depth levels DP and the hands $H1_P$ and $H1_D$ similar to FIG. 25 and FIG. 26.

(Still Another Example of Recognition of Palmar Side and Dorsal Side of Hand)

Although both the chord $C_v$ and the chord $C_h$ and both the chord $C_{pd}$ and the chord $C_{ur}$ are defined as chords that pass through the reference point C0 in the examples of FIG. 23 and FIG. 27, only any one (for example, only the chord $C_v$ or only the chord $C_{pd}$) thereof may be defined. Further, an arbitrary number of other arbitrary chords may be defined regardless of whether or not each chord passes through the reference point C0.

Moreover, although the chords that pass through the reference point C0 are set in order to define the extraction points E in the examples of FIG. 23 and FIG. 27, for example, a concentric circle whose center is the reference point C0 may be set inside of the maximum inscribed circle C, and the extraction points E may be defined thereon. Alternatively, a polygon whose center of gravity is the reference point C0 or other arbitrary figures may be set, and the extraction points E may be defined thereon. In any case, it is preferable to select the reference point C0 as one of the plurality of extraction points E.

Further, although the hands $H1_P$ and $H1_D$ in the form of a first in which all the fingers are bent are the recognition targets in the examples of FIG. 23 and FIG. 27, the form of the hand is not limited to this mode. It is sufficient that at least any of the fingers be bent inward (that is, toward the palmar side).

(Recognition of Right Hand and Left Hand)

Further, the tendency of the respective depth levels to the target points S in a direction (hereinafter, the direction UR)

connecting the ulnar side and the radial side of the hand is examined, whereby the right hand and the left hand can be recognized.

A preferable example of the direction UR connecting the ulnar side and the radial side of the hand is the direction of the chord $C_{ur}$ in FIG. 27. In addition, an allowable example of the direction UR connecting the ulnar side and the radial side of the hand is the direction of an arbitrary chord at an angle of −30° or more and +30° or less to the direction of the chord $C_{ur}$ (for example, the chord $C_h$ in FIG. 23).

In the recognition of the right hand and the left hand, obtained data on the respective depth levels DP to the target points S is subjected to linear regression analysis. Specifically, the tendency of the depth level DP at each position in the UR direction is analyzed. Relations between the depth levels DP illustrated in FIG. 26(a) and FIG. 26(b) and positions in the UR direction are respectively illustrated in graphs of FIG. 28(a) and FIG. 28(b). In the graphs of FIG. 28, the horizontal axis represents the relative distance (U) of each target point S from the radial side in the UR direction, and the vertical axis represents the depth level (DP) to each target point S.

As illustrated in FIG. 28(a), in the case of the hand $H1_P$ in the form of a first showing the palmar side, the depth level DP tends to become higher with the decreasing distance from the ulnar side of the hand. Examples of the case where the right hand and the left hand may be recognized on the basis of this tendency include the case where at least the thumb is bent toward the palmar side, such as the case of the form of a first as described above.

Moreover, as illustrated in FIG. 28(b), also in the case of the hand $H1_D$ in the form of a first showing the dorsal side, the depth level DP tends to become higher with the decreasing distance from the ulnar side of the hand. The case where the right hand and the left hand may be recognized on the basis of this tendency is not particularly limited.

Note that, although the mode of using the infrared ray detection unit 410 in order to detect the outer shape of the hand is adopted in all the above-mentioned embodiments, the acquisition of the outer shape is not limited to this mode. For example, the outer shape can also be acquired using an image sensor without depth level information.

(Gesture Registration)

Gesture data to be stocked in the gesture data unit 455 (see FIG. 3) is registered by the user. Moreover, the gesture data is set as a gesture command by the user, and is further rewritten as needed by the user.

(Gesture Data Registration)

Figure 29:
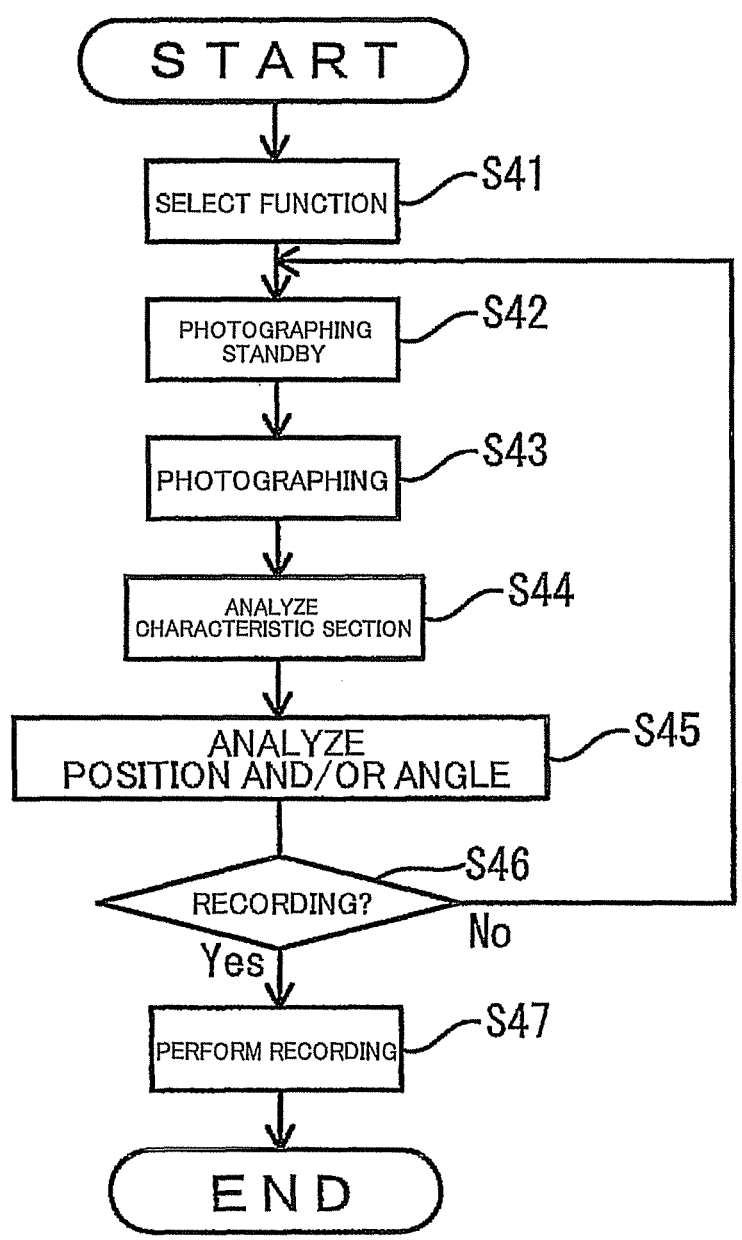
FIG. 29 is a flowchart illustrating an example of a process of registering gesture data.

FIG. 29 is a flowchart illustrating an example of a process of registering gesture data into the gesture data unit 455.

In the present embodiment, the application unit 459 activates a gesture setting application in accordance with a manipulation by the user. As illustrated in FIG. 29, a gesture data registration function is selected from functions displayed on the application screen (Step S41). Consequently, preparations for photographing are started. In the preparations for the photographing, a form whose registration as a gesture is desired by the user is represented using his/her hand and arm. The photographing is awaited until the form of the hand representing the gesture is determined by the user (Step S42). The time for awaiting the photographing can be set to, for example, five seconds.

After that, a portion including the hand and at least part of the arm representing the gesture is photographed (Step S43). Through the photographing, outer shape data is acquired as a series of detected outer shapes. In acquiring the outer shape data, a moving image is acquired by photographing the hand and the arm representing the gesture for a given time. The photographing time can be set to, for example, ten seconds.

In the case of a gesture with a motion, a state where the motion of the gesture is repeated can be photographed during the photographing time.

In the case of a gesture in which the transition of motions is not intended, a state where the user variously moves his/her hand and arm within the range not departing from a mode that the user himself/herself perceives as the gesture, while representing the sign of the gesture, can be photographed.

Note that, instead of the above-mentioned moving image photographing, the outer shape data may be acquired as a plurality of detected outer shapes by photographing still images several times. In this case, in the case of a gesture with a motion, images are continuously photographed while the gesture is represented, whereby a plurality of frames can be acquired. In the case of a gesture without a motion, the same gesture is photographed with the time and the location being changed, whereby a plurality of frames can be acquired.

The photographing is performed by, for example, the infrared ray detection unit 410. In the photographing, the infrared ray detection unit 410 detects the outer shapes of the hand and the arm representing the gesture. The outer shapes are detected through the same processes as Step S22 to Step S25 in FIG. 16. The process of detecting the outer shapes is performed for each of the plurality of frames.

On the basis of the photographing result, a feature part of the hand and the arm representing the gesture is analyzed (Step S44). The feature part is analyzed for each of the plurality of detected outer shapes. Examples of the feature part to be analyzed include a portion of a target showing an anatomic feature, such as the number of fingers in a predetermined form and the positions thereof.

Further, a value of the position and/or the angle of the feature part is analyzed (Step S45). The position of the feature part can be represented by adding coordinate information to each anatomic feature point in the target, such as points representing the finger tip and the finger base. Moreover, the angle of the feature part can be represented by adding angle information based on the extending direction of the finger, the extending direction of the arm, and the like.

In Step S44 and Step S45, the same processes as those of the above-mentioned finger recognition, palm recognition, and arm recognition are performed.

More specifically, the same processes as Step S26 to Step S31 in FIG. 16 are performed. In this manner, a similar process is performed on all the fingers, whereby the skeletons of all the fingers are obtained. Consequently, the extending direction of the finger, specifically, the angle of the finger about the joint of the finger can be recognized. Moreover, the position of a feature point indicating the finger tip, the finger base, or the like can be recognized by adding coordinate information. Further, the form of the hand can be recognized. For example, the form of each finger (specifically, which of the thumb, the index finger, the middle finger, the ring finger, and the little finger is bent and which thereof is stretched) can be recognized.

Moreover, the position of the palm can be recognized through the palm recognition similarly to FIG. 20, and it can be determined whether the image data is a right hand or a left hand or whether the image data is the front side or the back side of the palm, through the thumb recognition similarly to FIG. 21. Consequently, the position of a predetermined finger can be recognized.

Further, the extending direction of the arm, specifically, the angle of the arm about the joint of the elbow can be determined through the arm recognition.

In Step S45, further, pieces of information on the feature parts respectively extracted for the plurality of outer shapes are synthesized, whereby the movable range of the hand and the arm representing the gesture, which are the photographing target in Step S43, is derived.

Specifically, a range including the maximum value and the minimum value of the angle obtained by extracting the feature parts is obtained, whereby the movable range can be derived.

Alternatively, a range including a trace of coordinates of the feature point indicating the finger tip or the like is obtained, whereby the movable range can be derived.

In the case of a gesture with a motion, the plurality of outer shapes are compared over time on the basis of a difference among the feature parts respectively extracted for the plurality of outer shapes. Consequently, the transition of the outer shapes along with the gesture motion can also be recognized.

The user determines whether or not the analysis result is recorded as gesture data (Step S46). In this case, the form of the photographed hand and arm may be checked through reproduction of the photographed moving image and display of the analysis result. If the analysis result is recorded as the gesture data (Yes in Step S46), the analysis result is recorded into the gesture data unit 455 (Step S47). If the analysis result is not recorded as the gesture data (No in Step S46), no data is recorded into the gesture data unit 455, and photographing can be awaited (Step S42) again in order to photograph another moving image.

Note that, although the mode of acquiring a series of outer shapes or a plurality of outer shapes is adopted in the above-mentioned embodiment, the present invention is not limited to this mode. For example, one outer shape may be acquired, a feature point and a value of the position and/or the direction of the feature point may be analyzed for the acquired outer shape, and the analysis result may be recorded into the gesture data unit 455. In this case, a predetermined width can be provided to the acquired value, so that a predetermined range is acquired. The predetermined range can be recorded as an allowable range as the gesture into the gesture data unit 455.

(Gesture Command Setting)

Figure 30:
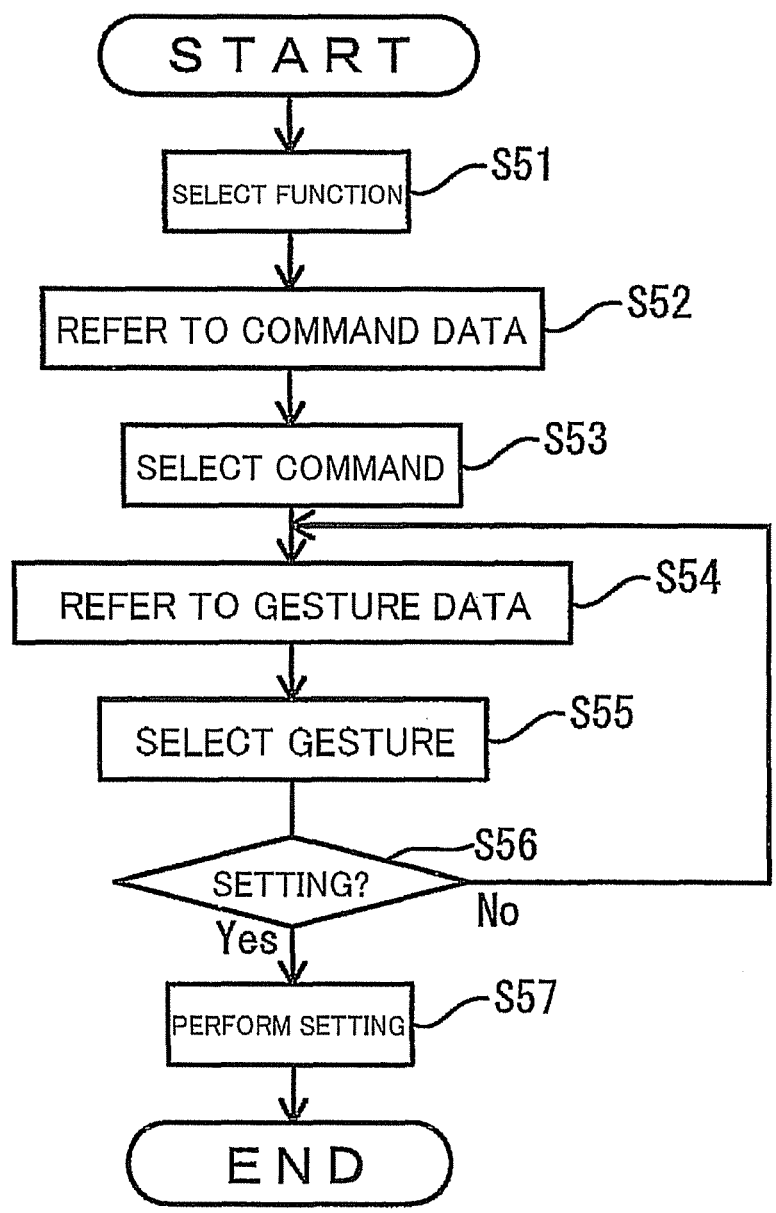
FIG. 30 is a flowchart illustrating an example of a process of setting a gesture command.

FIG. 30 is a flowchart illustrating an example of an association process of recording gesture data into the gesture data unit 455 in association with an application manipulation for which the gesture data is used as a command.

In the present embodiment, a gesture command setting function is selected from the functions displayed on the screen of the gesture setting application, in accordance with a manipulation by the user (Step S51). Then, in the application unit 459, an application manipulation command is invoked and is referred to (Step S52). The application manipulation includes every manipulation (such as activation and end of the application, selection and decision of each function in the application, and movement of the screen) to be performed for application use.

A command desired to be generated by a gesture is selected from the command data referred to (Step S53). Further, gesture data is invoked from the gesture data unit 455 and is referred to (Step S54). A gesture desired to be associated with the command selected in Step S53 is selected (Step S55). The user determines whether or not the selected gesture is set (Step S56). If the selected gesture is set (Yes in Step S56), the gesture data and an event to be generated by using the gesture data, as a command are recorded in association with each other into the gesture data unit 455 (Step S57). If the selected gesture is cancelled (No in Step S56), gesture data is selected again (Step S54), and another gesture can be selected (Step S55).

Note that, although the mode of first invoking and selecting an application manipulation command and then associating gesture data with the selected application command is adopted in the above-mentioned embodiment, the present invention is not limited to this mode. For example, gesture data may be first invoked and selected, and an application manipulation command may be then associated with the selected gesture data.

Alternatively, for example, a mode of invoking an application manipulation command, then directly recording gesture data, and associating the two with each other may be adopted.

(Gesture Command Rewriting)

Figure 31:
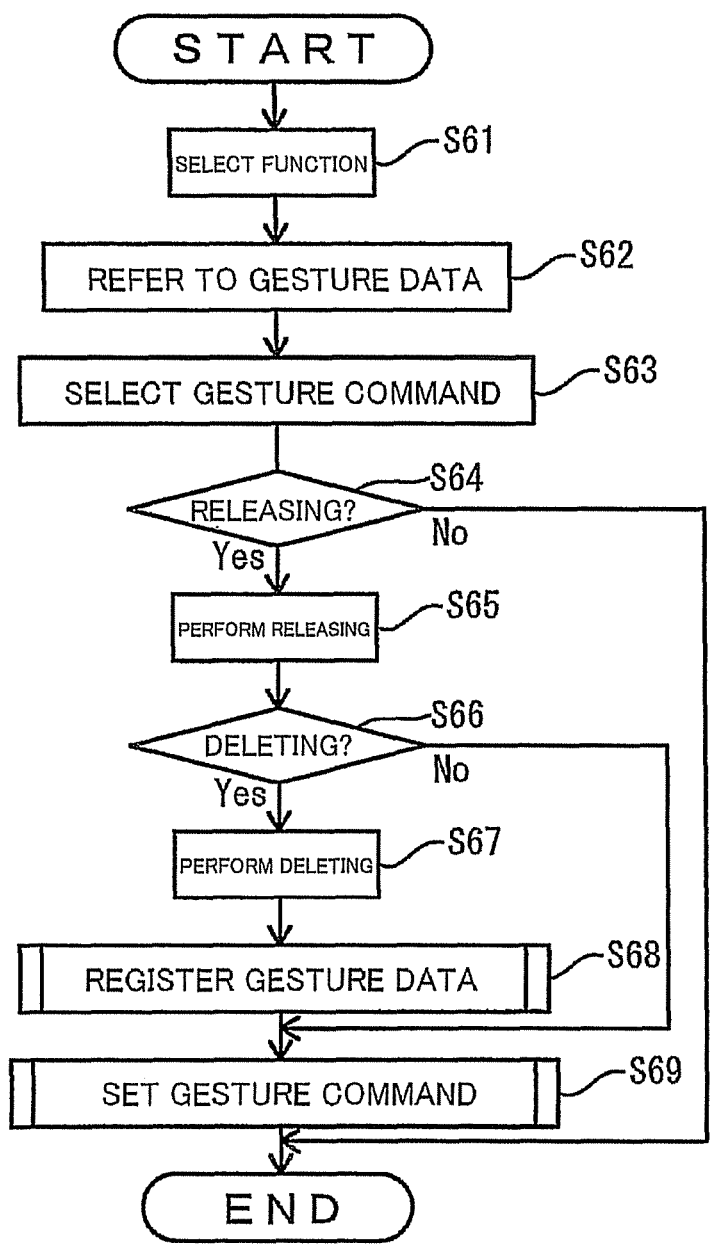
FIG. 31 is a flowchart illustrating an example of a process of rewriting the gesture command.

FIG. 31 is a flowchart illustrating an example of a process of rewriting a gesture command in the gesture data unit 455.

In the present embodiment, a gesture command rewriting function is selected from the functions displayed on the screen of the gesture setting application, in accordance with a manipulation by the user (Step S61). Then, gesture data is invoked from the gesture data unit 455 and is referred to (Step S62). A gesture command desired to be rewritten is selected (Step S63), and it is determined whether or not the association with the application manipulation with which the selected gesture command is associated is cancelled (Step S64). If the association is cancelled (Yes in Step S64), the cancellation is executed, and the gesture data constituting the gesture command is no longer associated with the application manipulation (Step S65). If the association is not cancelled (No in Step S64), this process is ended.

After the association between the gesture data and the application manipulation is cancelled in Step S65, it is further determined whether or not the gesture data itself for which the association has been cancelled is deleted (Step S66). If the gesture data itself is deleted (Yes in Step S66), the gesture data is deleted from the gesture data unit 455 (Step S67).

If the gesture data is deleted in Step S67, the gesture data registration process described with reference to FIG. 29 is performed (Step S68). After that, the gesture command setting process described with reference to FIG. 30 is performed, whereby a new gesture command is set (Step S69).

On the other hand, if the gesture data is not deleted (No in Step S66), the gesture command setting process described with reference to FIG. 30 is performed, and this gesture data is associated with another application manipulation, whereby a new gesture command is set (Step S69).

(Application Manipulation Through Recognition of Set Gesture Command)

The method of recognizing a gesture using the gesture data that is recorded as described above in the gesture data unit 455 is as described in Step S1 to Step S4 in FIG. 4. More specifically, similarly to the above-mentioned gesture data registration, a plurality of frames of outer shape image data of the target are acquired in Step S2, and information on a feature part of the outer shape and the movable range thereof is acquired for each of the plurality of frames in Step S3. Further, in Step S4, the feature part of the outer shape of the gesture data and the movable range thereof recorded in the gesture data unit 455 are compared with the feature part of the outer shape of the gesture to be recognized and the movable range thereof. Through determination of coincidence between the two pieces of data, it is determined which of the pieces of gesture data recorded in the gesture data unit 455 the gesture to be recognized corresponds to.

Subsequently, as described in Step S5, the application unit 459 performs a predetermined application manipulation with the gesture determined by the gesture recognition unit 456 being used as a command.

(View Example of Semi-Transmissive Display)

Figure 32:
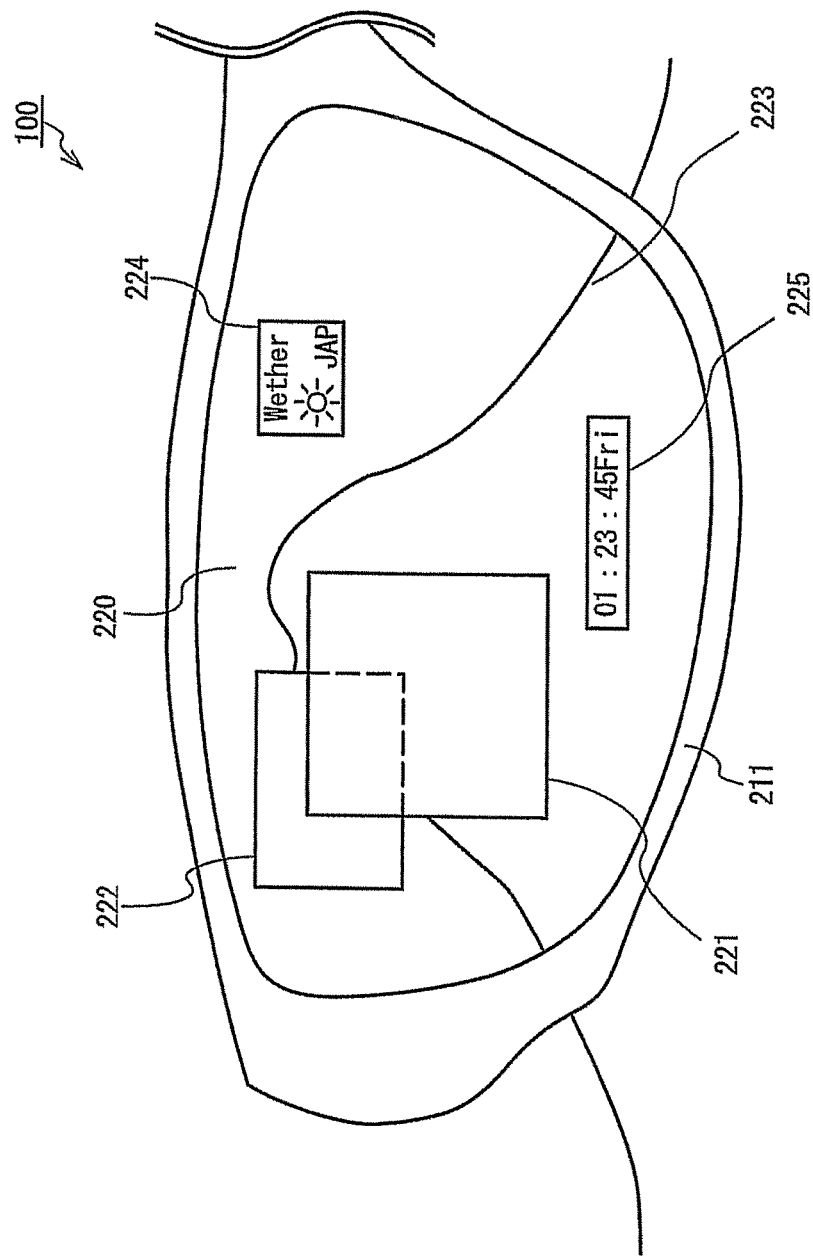
FIG. 32 is a schematic diagram illustrating an example of a view of the semi-transmissive display 220 of the glasses display device 100.

Next, FIG. 32 is a schematic diagram illustrating an example of a view of the semi-transmissive display 220 of the glasses display device 100.

As illustrated in FIG. 32, on the semi-transmissive display 220 of the glasses display device 100, an advertisement 221 is partially displayed, and a map 222 is further partially displayed. In addition, through the semi-transmissive display 220 of the glasses display device 100, scenery 223 is visually recognized. In addition, weather forecast 224 and time 225 are displayed thereon.

(Description of Field of View)

Figure 33:
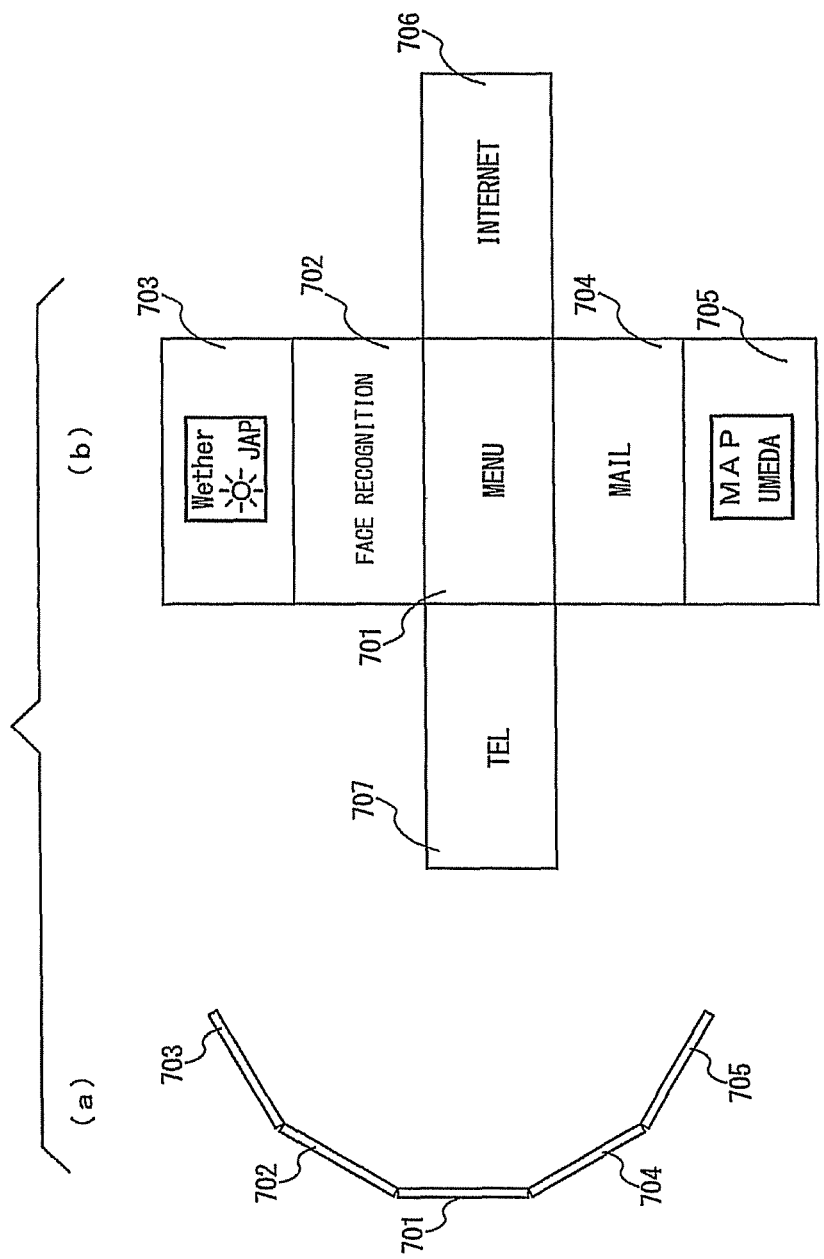
FIG. 33 is a schematic diagram illustrating an example (a) of a field of view of the semi-transmissive display 220 and an example (b) of the view of the semi-transparent display 220.

Next, an example of the view displayed on the semi-transmissive display 220 of the glasses display device 100 is described. FIG. 33(*a*) is a diagram for describing an example of the field of view of the semi-transmissive display 220, and FIG. 33(*b*) is a diagram for describing an example of the view of the semi-transparent display 220

As illustrated in FIG. 33, in the present embodiment, the view that can be visually recognized on the glasses display device 100 includes a plurality of views 701 to 707. All the plurality of views are segments each constituting part of an integrated continuous image. Through smooth transition from one visually recognized portion to another visually recognized portion in the continuous image, the plurality of views are switchingly displayed without any discontinuity.

As illustrated in FIG. 33, the views 703, 702, 701, 704, and 705 are provided in the top-bottom direction, and the views 706 and 707 are respectively provided on the right side and the left side of the view 701. Note that, as a matter of course, the views 701 to 707 can be freely deleted or changed by the user, and other views can be further added by the user.

Note that, although the views 701 to 707 are a seamless continuous image in the present embodiment, the views to be switched may be discontinuous images independent of one another.

Specifically, in the case where the posture of the glasses display device 100 is in the horizontal direction, that is, in the case where the glasses display device 100 is attached to the user and where the user faces horizontally forward, the view 701 is displayed.

Subsequently, in the case where the glasses display device 100 is attached to the user and where the user faces obliquely upward at about 30 degrees with respect to a horizontal plane (that is, a plane parallel to the horizontal direction), the view 702 is displayed. That is, on the basis of a signal from at least one of the gyroscope unit 420 and the acceleration detection unit 430 in the glasses display device 100, which direction the user faces is recognized. Note that, for example, a screen of a face recognition application may be displayed as the view 702.

Further, in the case where the user faces obliquely upward at about 45 degrees with respect to the horizontal plane, the view 703 is displayed. Weather forecast may be displayed as the view 703. Moreover, other sky information may be displayed as the view 703, and, for example, a constellation image may also be displayed thereas depending on the time zone.

Similarly, in the case where the glasses display device 100 is attached to the user and where the user faces obliquely downward at about 30 degrees with respect to the horizontal plane, the view 704 (for example, an e-mail screen) is displayed. In the case where the user faces obliquely downward at about 45 degrees with respect to the horizontal plane, the view 705 (for example, a map) is displayed. In the case where the user faces rightward at about 30 degrees with respect to a vertical plane, the view 706 (for example, an Internet browser) is displayed. In the case where the user faces leftward at about 30 degrees with respect to the vertical plane, the view 707 (for example, a phone call screen) is displayed.

Moreover, although the switching among the view 701 to the view 707 is made on the basis of the signal from at least one of the gyroscope unit 420 and the acceleration detection unit 430 in the above description, not limited thereto, the switching thereamong may be made on the basis of the above-mentioned finger, palm, or arm recognition.

Further, when the user is walking, as a condition for making at least any of switches from the view 701 to the view 702, from the view 701 to the view 704, from the view 701 to the view 707, and from the view 701 to the view 706, the level of the signal from at least one of the gyroscope unit 420 and the acceleration detection unit 430 may be set to be higher. This can prevent switching from the view 701 to another view in a short time during the walk. Moreover, such setting that switching is not particularly made when the user suddenly turns around may be provided.

Meanwhile, the view 703 of sky information and the view 705 of map information may be panoramically displayed. In this case, the views 703 and 705 may be scrolled along with rightward and leftward movements.

(Specific Example of Event Generation)

Figure 34:
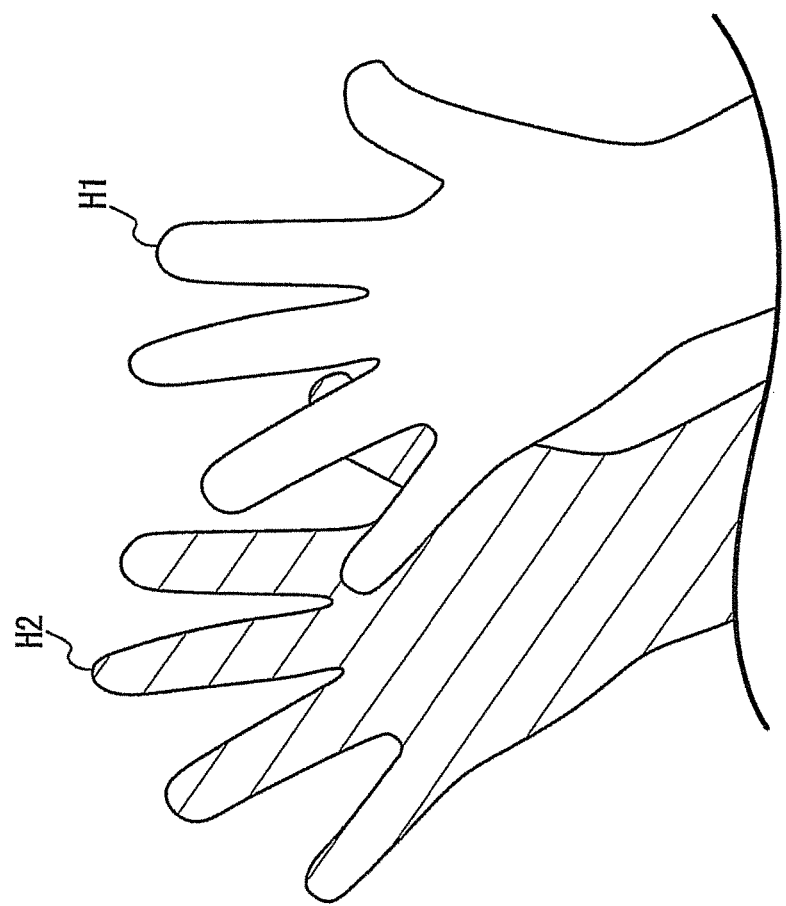
FIG. 34 is a schematic diagram illustrating an example of event generation.

Next, a predetermined event is generated in order to enable the user to easily recognize a difference between the case where the fingers, the palm, the hand, and the arm exist in the manipulation region 410*c* and the case where the fingers, the palm, the hand, and the arm exist in the gesture region 410*g*. Hereinafter, the predetermined event is described. FIG. 34 is a schematic diagram illustrating an example of the predetermined event generation, FIG. 35 is a schematic diagram illustrating another example of the event generation in FIG. 34, and FIG. 36 is a schematic diagram illustrating an example of another event generation.

First, as illustrated in FIG. 34, the shape of a hand H1 detected by the infrared ray detection unit 410 is displayed as a virtual image. Further, in the case where the user's hand is far from the manipulation region 410*c*, a shadow H2 having the shape of the hand H1 is displayed as an example of the event.

This enables the user to easily recognize that his/her hand exists in the gesture region 410*g*.

Figure 35:
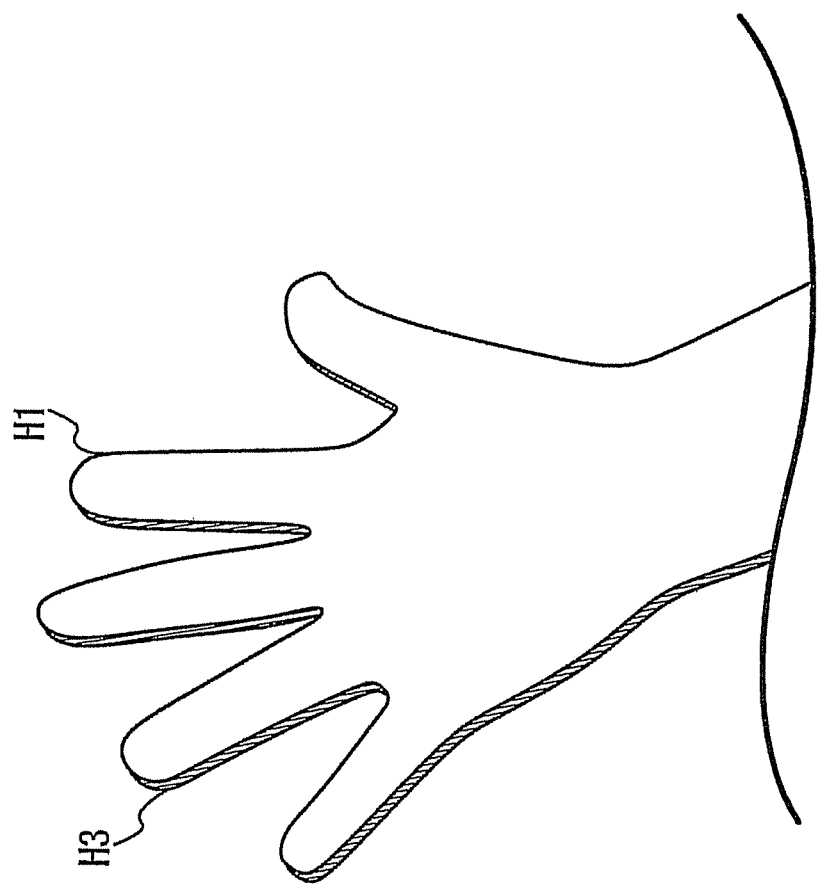
FIG. 35 is a schematic diagram illustrating another example of the event generation.
Figure 36:
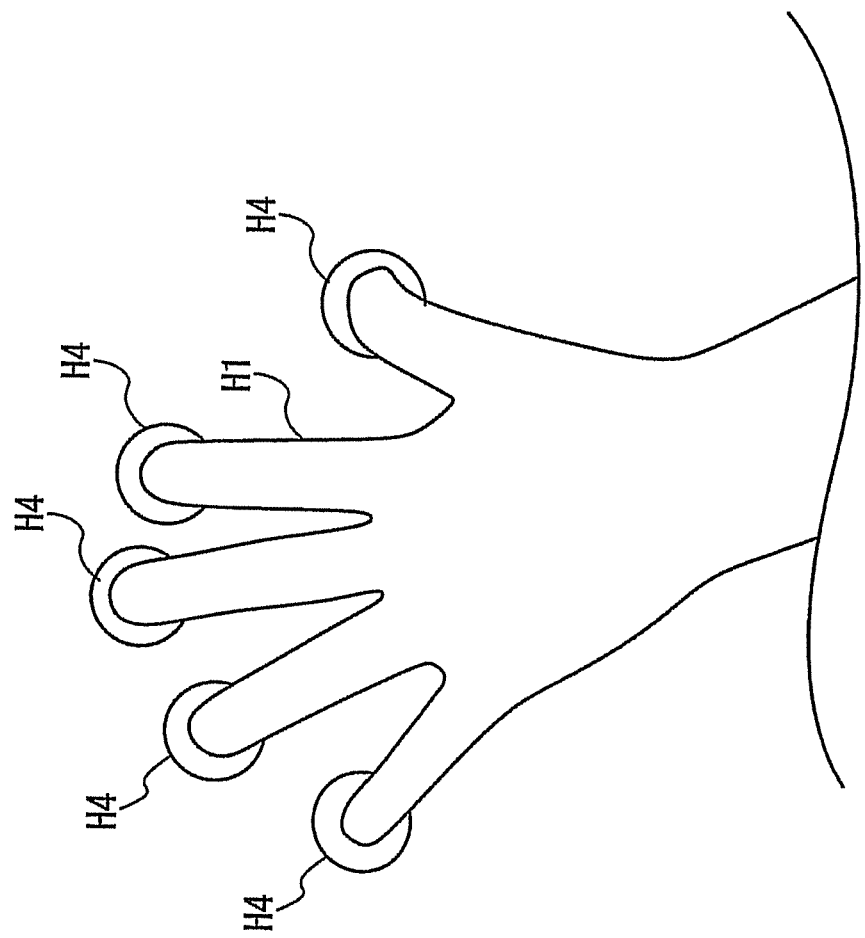
FIG. 36 is a schematic diagram illustrating another example of the event generation.

Subsequently, as illustrated in FIG. 35, the shape of the hand H1 detected by the infrared ray detection unit 410 is displayed as a virtual image, and a shadow H3 darker than the shadow H2 is displayed with a small area around the shape of the hand H1. Accordingly, the user can easily recognize that his/her hand more approaches the manipulation region 410*c* than the case of FIG. 34. Further, in the case where his/her hand exists in the manipulation region 410*c*, the shadows H2 and H3 are not displayed.

As a result, the user does not need to look for the manipulation region 410*c* through trial and error or gropingly. That is, the user can easily recognize the distance to the manipulation region 410c on the basis of the darkness of the shadow and the positional difference between the shape of the hand and the shadow.

Moreover, as illustrated in FIG. 36, in the case where the user's hand exists in the manipulation region 410c, circle views H4 may be respectively displayed on the finger tips.

Note that, although the event generation mode of displaying the shadows H2 and H3 and the circle views H4 is described above in the embodiment, not limited thereto, in the case where the user's hand exists in the manipulation region 410c, the displayed image may be rippled, the glasses display device 100 may be provided with a vibration generation device to generate vibrations, a sound may be generated, and the displayed image may be changed by at least any of blinking the displayed image and changing the lighting luminance. For example, the distance to the manipulation region 410c may be represented by the blinking interval, and the distance to the manipulation region 410c may be represented by the lighting luminance. For example, the blinking interval becomes longer with the increasing distance from the manipulation region 410c, and the blinking interval becomes shorter with the decreasing distance therefrom. Alternatively, the lighting luminance becomes lower with the increasing distance from the manipulation region 410c, and the lighting luminance becomes higher with the decreasing distance therefrom. Alternatively, the displayed image is lighted with a darker color (such as red, black, and purple) with the increasing distance from the manipulation region 410c, and the displayed image is lighted with a paler color (such as blue, yellow, and pink) with the decreasing distance therefrom. In this way, an arbitrary event that appeals to human senses (typified by a sense of sight, a sense of hearing, and a sense of touch) may be generated.

(Manipulation on Glasses Display Device)

A usage mode of the glasses display device 100 along with the above-mentioned finger, palm, and arm recognition and the above-mentioned event generation is described.

First, if the user places his/her hand in the manipulation region 410c, his/her hand is recognized, and the user can manipulate a virtual image view. For example, the user can enlarge or reduce the virtual image view, scroll the view, or select a point.

Figure 37:
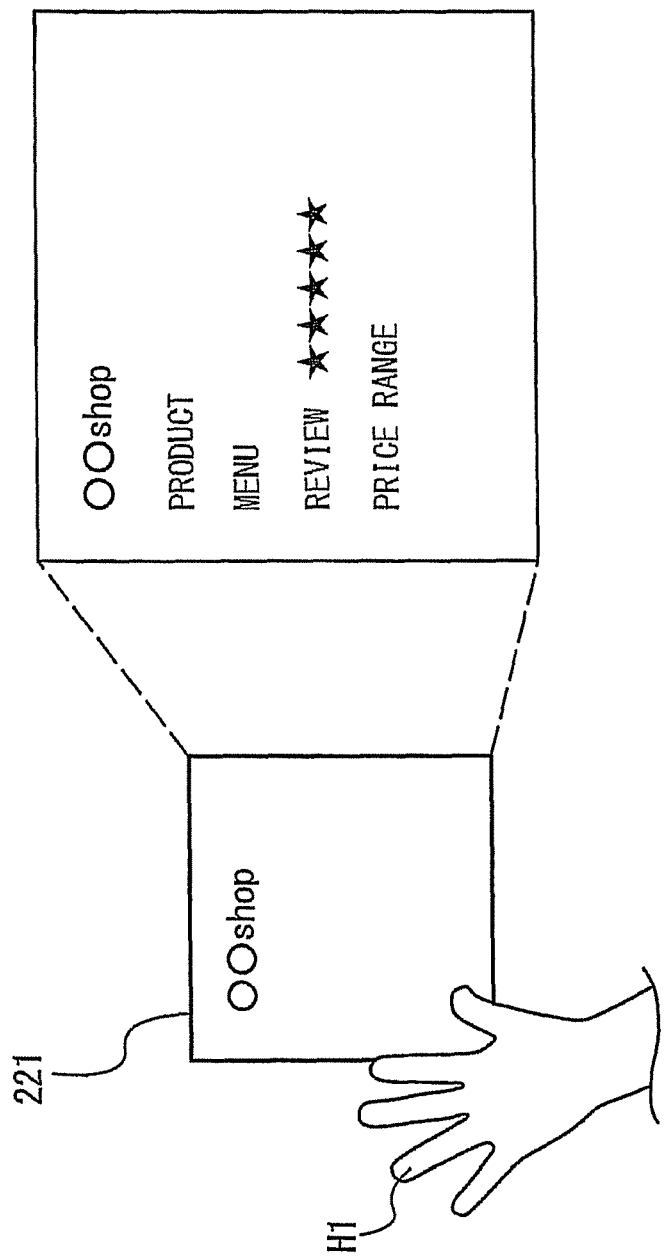
FIG. 37 is a schematic diagram illustrating an example of a manipulation on the glasses display device.

For example, as illustrated in FIG. 37, in the case where the user touches the view of the advertisement 221, an additional view may be displayed.

For example, information on products, services, and the like of a shop is displayed as the advertisement 221. In the case where the user touches the advertisement 221, further detailed information concerning the shop may be additionally displayed. For example, in the case where the shop is a restaurant, a main menu, user's reviews, a price range, and the like of the restaurant may be displayed.

Note that the advertisement 221 may be an image itself obtained by taking the shop by the camera unit 303, and may be recognition result information that is displayed on a shop recognition application screen as a result of automatically starting shop recognition on the basis of the image data of the shop taken by the camera unit 303.

(Display Based on Parody Mode)

Figure 38:
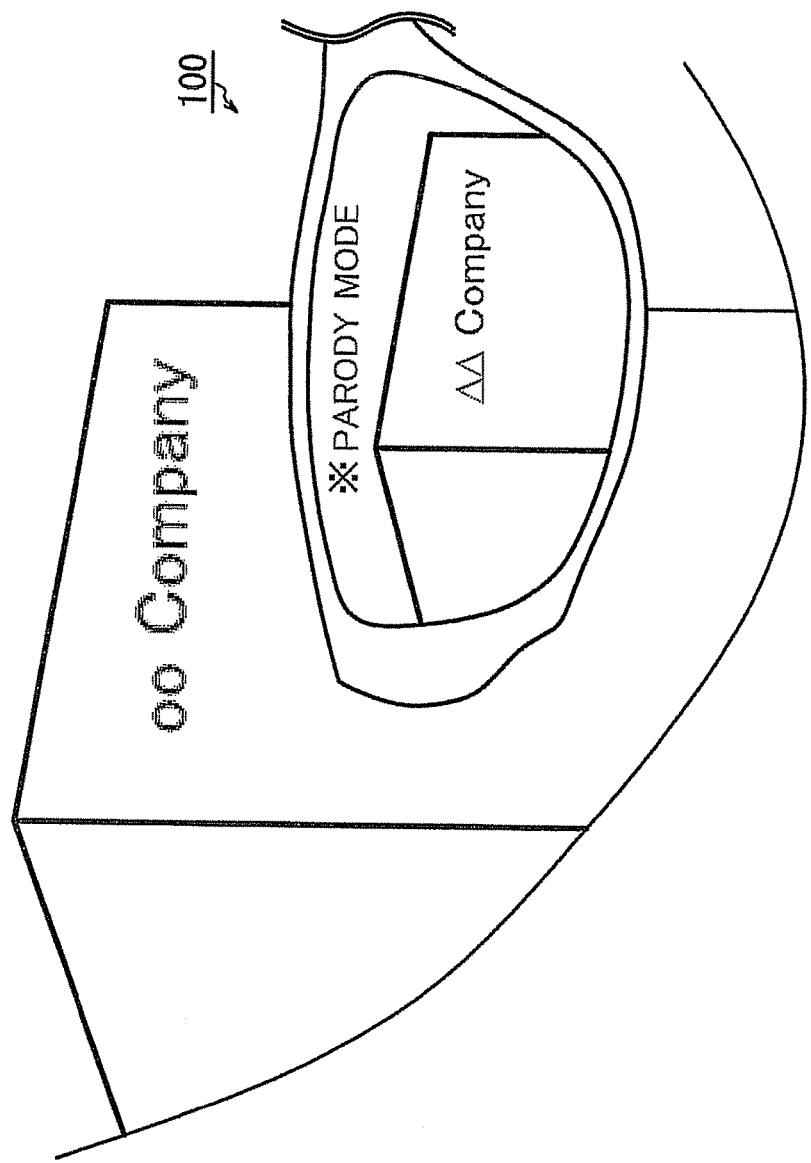
FIG. 38 is a schematic diagram illustrating another example of the manipulation on the glasses display device.

Moreover, as illustrated in FIG. 38, when a logo of one company (○○ Company) is displayed on the semi-transmissive display 220, if the user touches the logo on the screen, information concerning another competitive or non-competitive company (△△ Company) can be displayed. In this case, for example, a logo of the another company may be displayed as a parody mode.

(Display Based on Gesture Command)

Moreover, if the user makes a predetermined hand pose within the gesture region 410g, a preset operation is carried out. FIG. 39 to FIG. 46 are schematic diagrams each illustrating an example of the gesture recognition.

Figure 39:
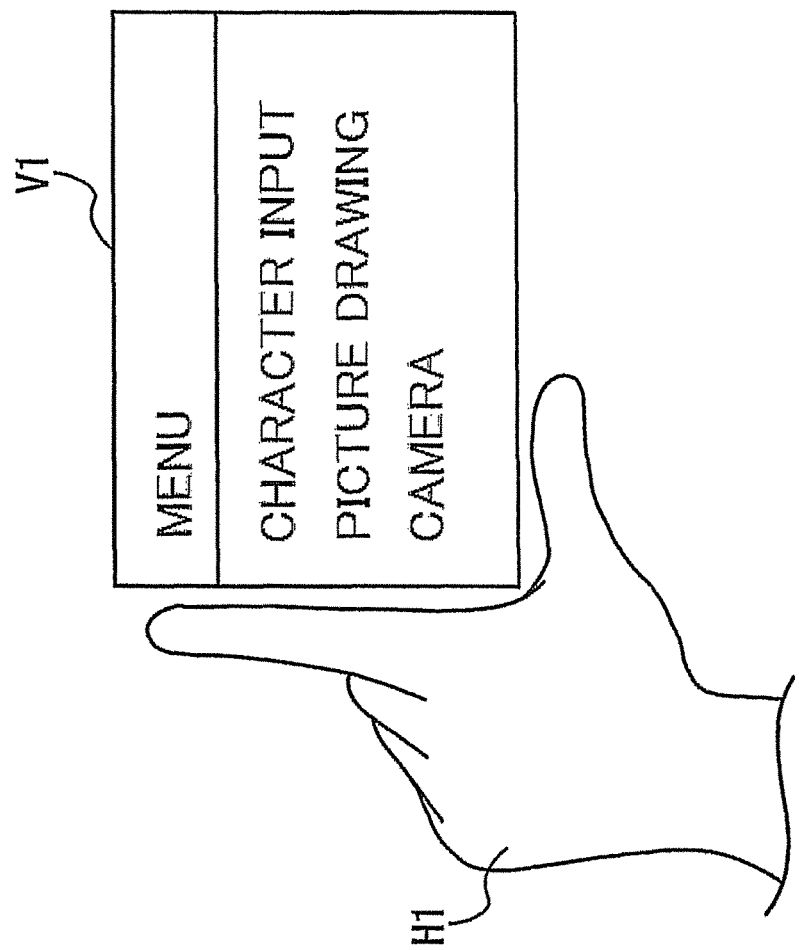
FIG. 39 is a schematic diagram illustrating an example of gesture recognition.

For example, as illustrated in FIG. 39, in the case where the user opens and stretches the thumb and the index finger of the closed hand H1 at 90 degrees to make an L-shaped sign, a menu screen V1 may be displayed between the thumb and the index finger.

Figure 40:
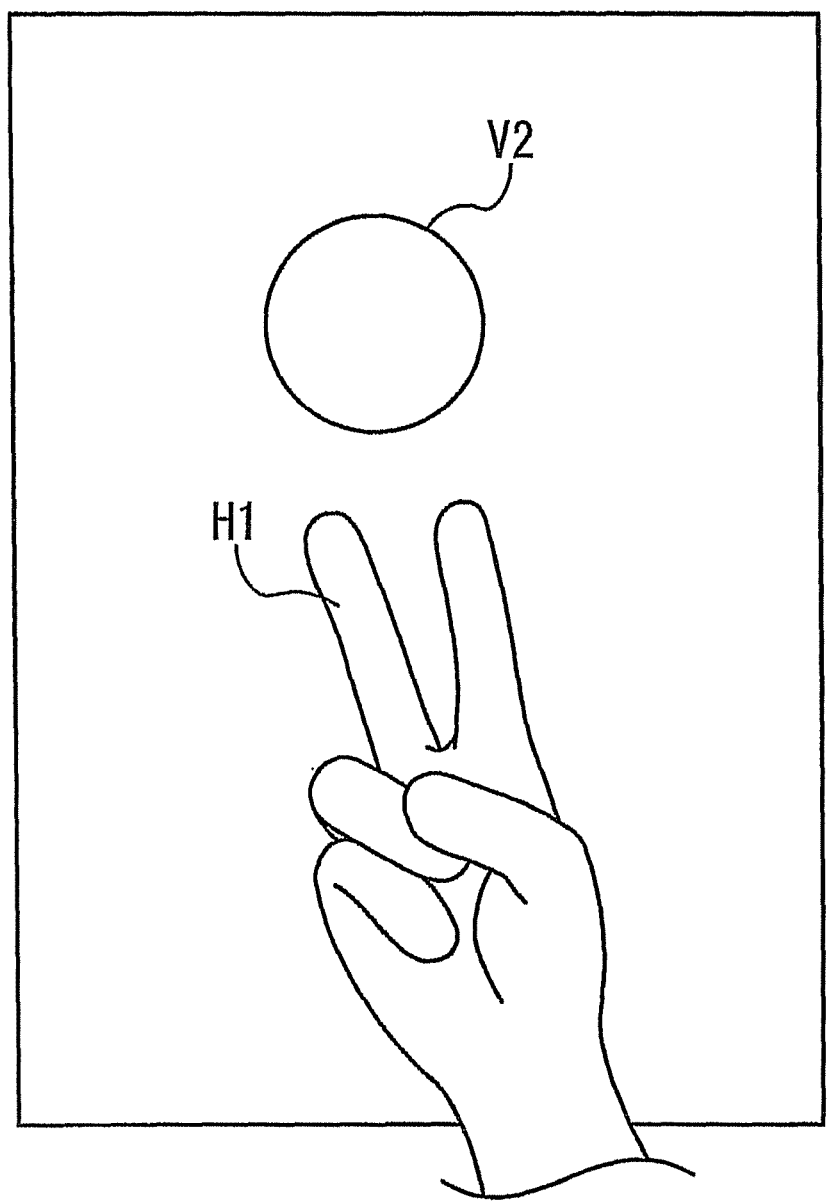
FIG. 40 is a schematic diagram illustrating another example of the gesture recognition.

Moreover, as illustrated in FIG. 40, in the case where the user opens and stretches the index finger and the middle finger of the closed hand H1 to make a so-called peace sign, a predetermined image V2 may be displayed between the index finger and the middle finger.

Figure 41:
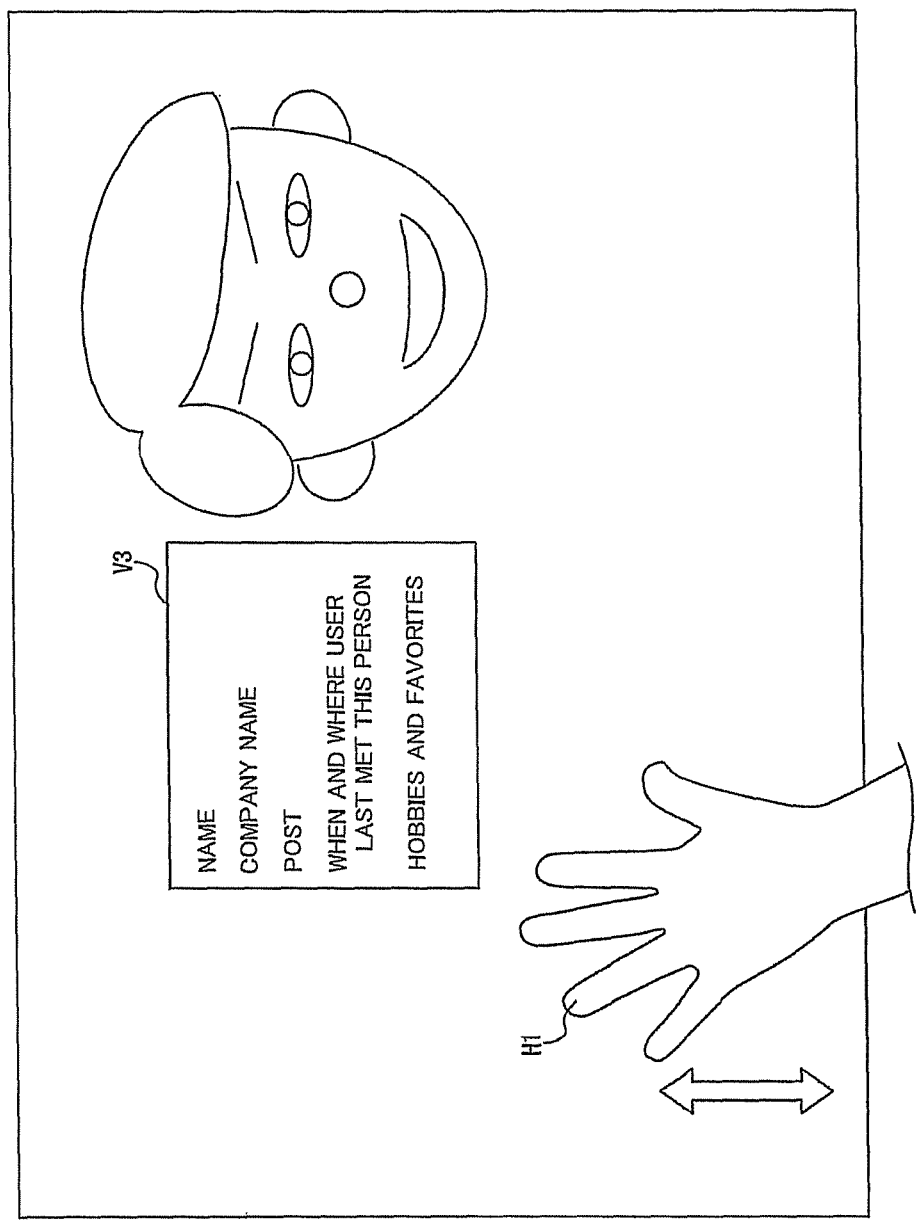
FIG. 41 is a schematic diagram illustrating another example of the gesture recognition.

Moreover, as illustrated in FIG. 41, in the case where the user makes a greeting action by moving the loosely opened hand H1 in an arrow direction, a face recognition application is automatically activated. On the basis of face data acquired by the camera unit 303, of a person whom the user gives the greeting, the face recognition is automatically started, and information on the name, the company name, the post, when and where the user last met this person, and the like is displayed on a face recognition application screen V3. Further, a flag is set each time the user meets the same person based on the recognition of the face recognition application, and the number of flags may be displayed on the face recognition application screen V3. In this case, the background, color, and the like of the face recognition application screen V3 may be changed depending on the number of flags.

Figure 42:
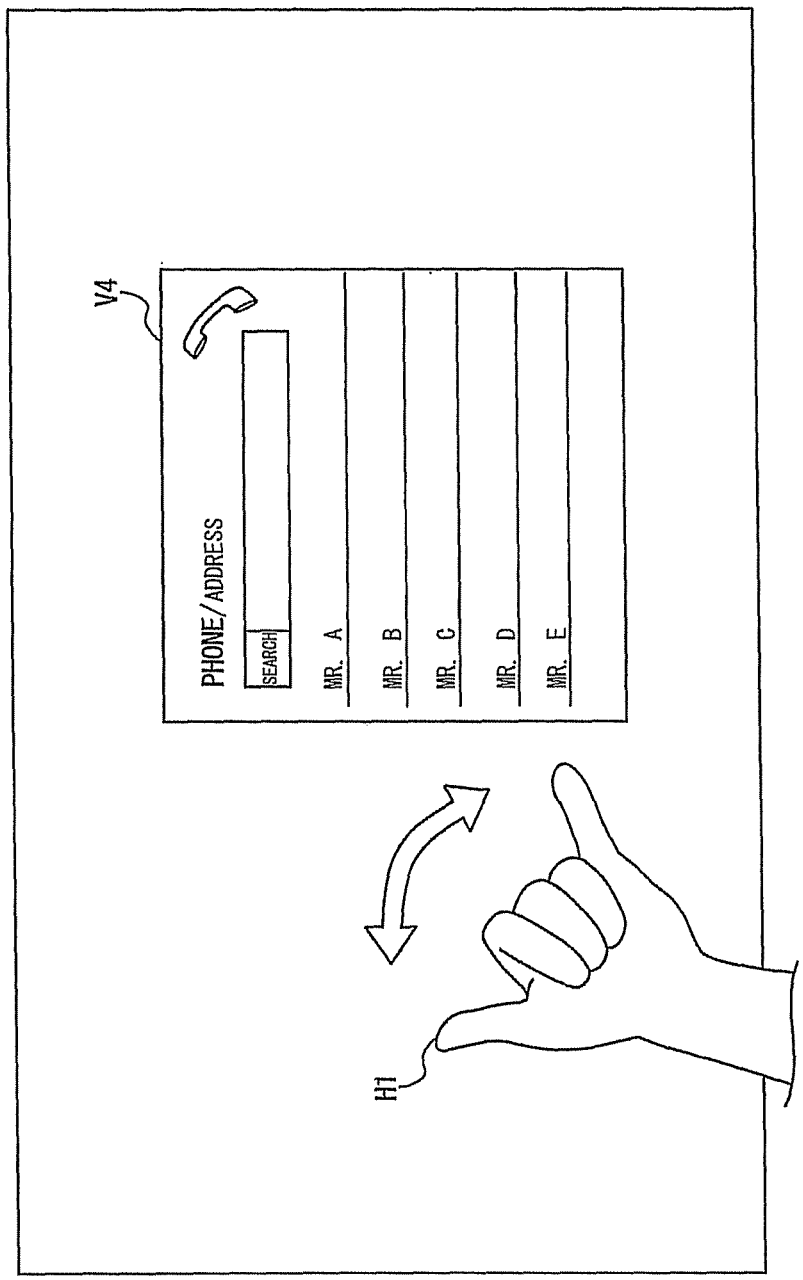
FIG. 42 is a schematic diagram illustrating another example of the gesture recognition.

Further, as illustrated in FIG. 42, in the case where the user opens the thumb and the little finger of the closed hand H1 to make a so-called aloha sign and waves the sign in the arrow directions, a phone application is automatically activated, and address book data V4 is displayed. The user can make a phone call to a predetermined person by manipulating the phone application.

Figure 43:
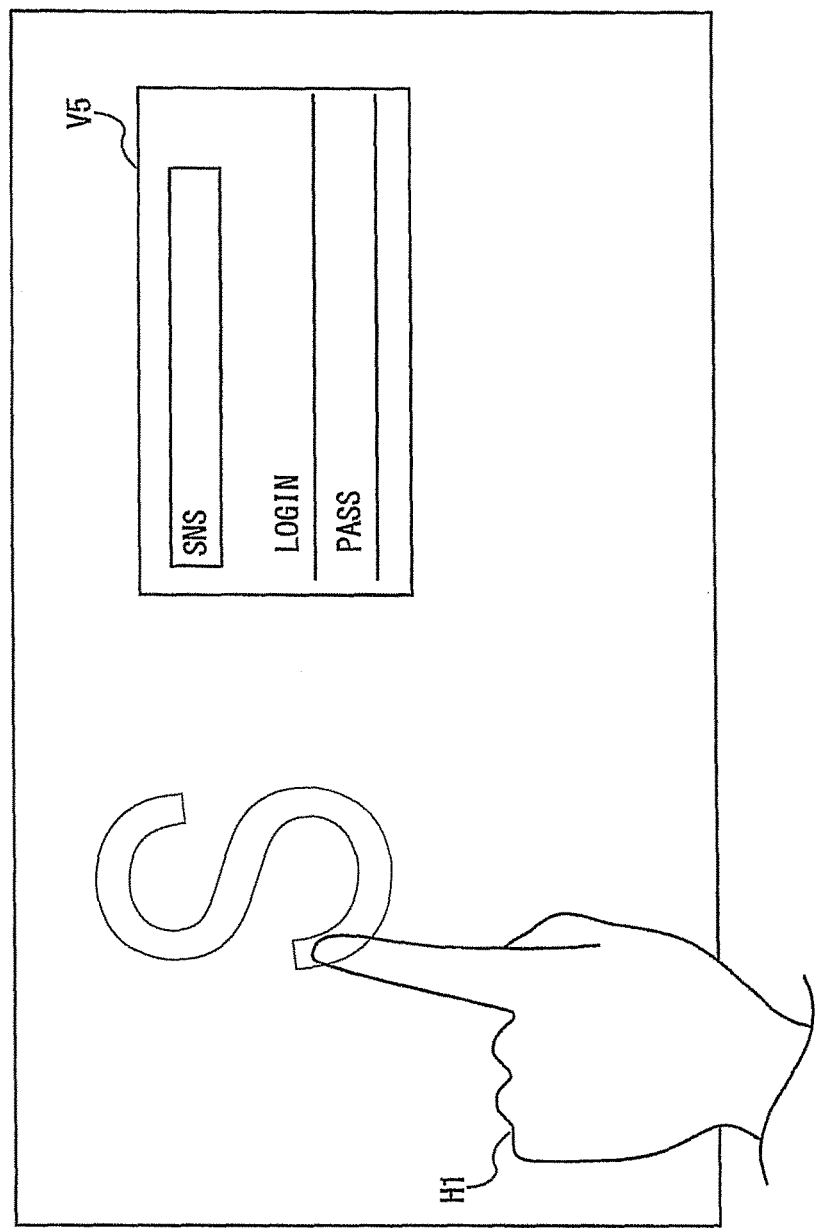
FIG. 43 is a schematic diagram illustrating another example of the gesture recognition.

Moreover, as illustrated in FIG. 43, in the case where the user draws an alphabetical letter S with a finger of the hand H1, a social networking service (SNS) application is automatically activated, and a SNS application screen V5 can be displayed.

Figure 44:
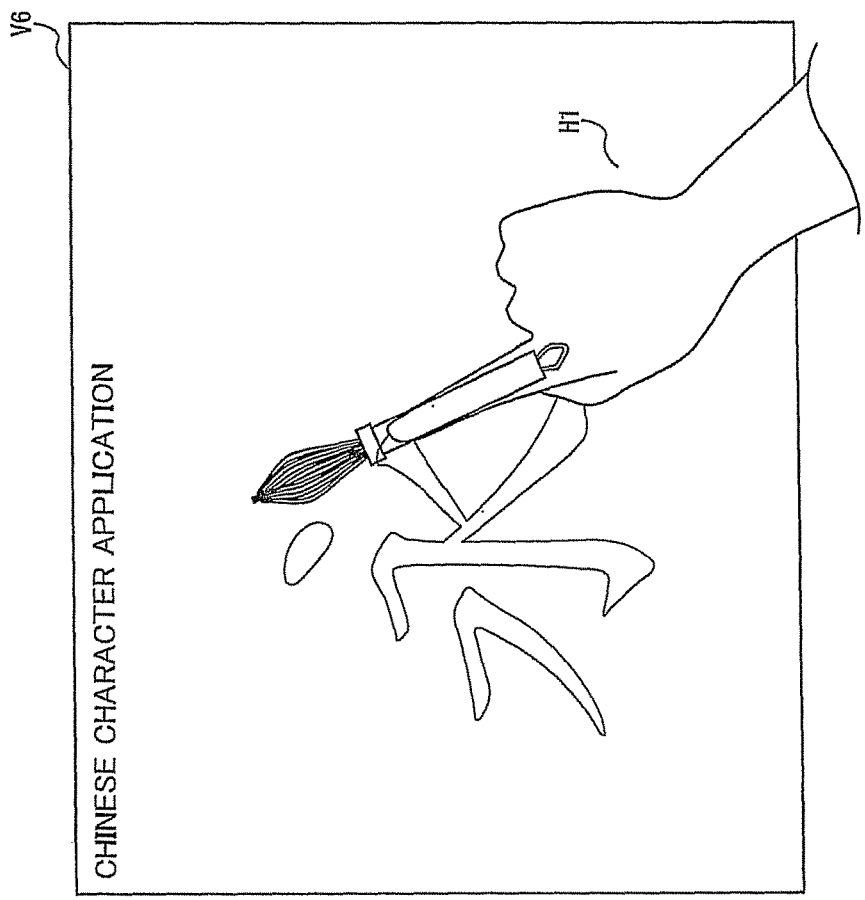
FIG. 44 is a schematic diagram illustrating another example of the gesture recognition.

Further, as illustrated in FIG. 44, in the case where the user activates a Chinese character application and causes the application to recognize the index finger of the hand H1, an image of an ink brush is further additionally displayed at the position of the index finger, and the user can practice writing Chinese characters on a Chinese character practice application screen V6.

Figure 45:
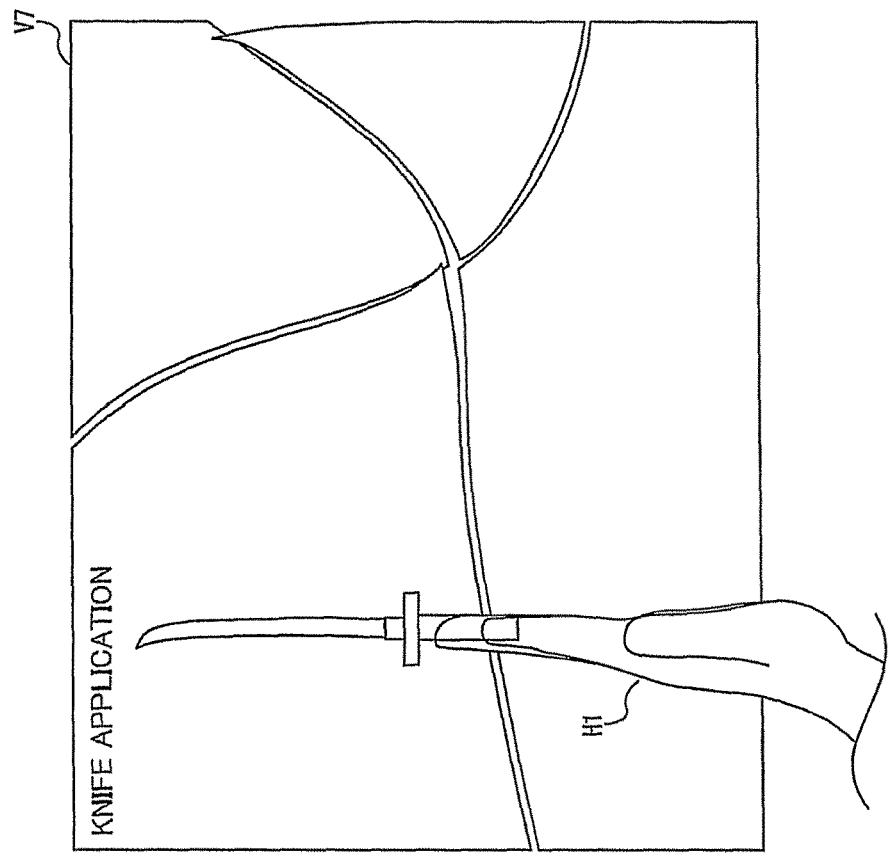
FIG. 45 is a schematic diagram illustrating another example of the gesture recognition.

Moreover, as illustrated in FIG. 45, in the case where the user makes the hand H1 into a hand-knife shape, a knife application is activated, an image of a knife is further additionally displayed at the position of the knife-shaped hand, and the user can cut a virtual image display screen V7.

Figure 46:
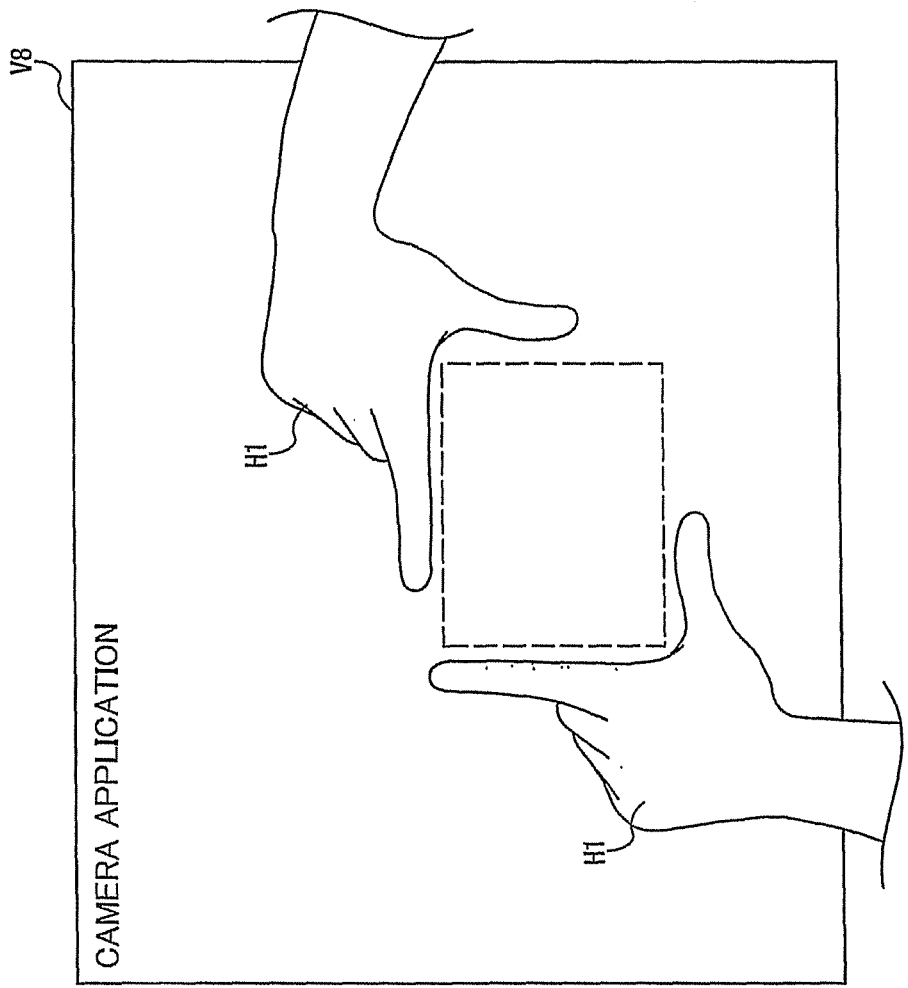
FIG. 46 is a schematic diagram illustrating another example of the gesture recognition.

Moreover, as illustrated in FIG. 46, in the case where the user forms a quadrangle with fingers of both the hands H1, a camera application is automatically activated, and an image of scenery or the like within an image taking frame extracted from the formed quadrangle may be taken on a camera application screen V8.

As described above, according to a shape recognition device of the present embodiment, the feature point $a_i$ or $b_j$ of a finger tip portion and the feature point $a_k$ or $b_k$ of an interdigital portion can be determined from the outer shape OF on the basis of the distance d between the reference point C0 and each of the plurality of vertexes $a_n$ or outer shape points $b_n$ on the outer shape OF, and the finger tip portions L, R, M, F, and T and the interdigital portions LR, RM, MF, and FT can be recognized. For example, the vertex in the case where the measured distance d exhibits any of the maxima L, R, M, F, and T (for example, in the case of the maximum L, the vertex $a_i$ or the outer shape point $b_j$) can be determined as a feature point of a finger tip portion on the outer shape OF of the hand, and the vertex in the case where the measured distance d exhibits any of the minima LR, RM, MF, and FT (for example, in the case of the minimum LR, the vertex $a_k$ or the outer shape point $b_k$) can be determined as a feature point of an interdigital portion on the outer shape OF of the hand.

Accordingly, even in the case where any of the finger tips is positioned inside of the convex hull of the outer shape of the hand, the finger positioned inside thereof can also be accurately determined.

Moreover, according to the shape recognition device of the present embodiment, the outer shape is detected by the infrared ray detection unit 410, and hence the outer shape OF of the hand can be accurately detected.

Further, according to the shape recognition device of the present embodiment, the outer shape of the hand can be detected in the common region in which a stereoscopic region (virtual image display region 2203D) of a stereoscopic image generated by the semi-transmissive displays 220 and a depth level detection region (three-dimensional space detection region 4103D) of the infrared ray detection unit 410 overlap with each other, and hence the shape recognition of the hand can be performed while the stereoscopic image is displayed.

Further, because the shape recognition device of the present embodiment is provided to the glasses display device 100, the shape recognition of the hand can be performed in the state where the user wears the glasses display device 100. Moreover, the detected outer shape of the hand is substantially the same as the outer shape of the hand visually recognizable by the user. Hence, in the case of manipulating a view object, the case of registering a gesture, and other such cases, the hand can be detected with an awareness of a mode easily detectable by the shape recognition device.

In the present invention, the control unit 450 corresponds to a "shape recognition device", the outer shape OF corresponds to a "detected outer shape", the infrared ray detection unit 410 corresponds to an "outer shape detection unit" and a "depth level sensor", the maximum inscribed circle C corresponds to a "maximum inscribed circle", the reference point C0 corresponds to a "reference point", the vertexes $a_n$, $a_i$, and $a_k$ and the outer shape points $b_n$, $b_j$, and $b_k$ correspond to "outer shape points", the distance d corresponds to a "distance", the half line HL corresponds to a "half line", the semi-transmissive displays 220 each correspond to a "display device", the virtual image display region 2203D corresponds to a "stereoscopic region", the three-dimensional space detection region 4103D corresponds to a "depth level detection region", the common region (coincident with the virtual image display region 2203D) corresponds to a "common region", and the glasses display device 100 corresponds to a "head-mounted display device".

A preferred embodiment of the present invention has been described hereinabove, but the present invention is not limited to only the embodiment. It should be understood that various other embodiments are possible without departing from the spirit and scope of the present invention. Further, operations and effects produced by the configuration of the present invention are described in the present embodiment, but these operations and effects are given as examples, and are not intended to limit the present invention.

The invention claimed is:

1. A shape recognition device comprising:
an outer shape detection unit that detects an outer shape of a hand;
a reference point extraction unit that extracts a central point of a maximum inscribed circle of the detected outer shape as a reference point;
a distance measurement unit that measures a distance between the reference point and each of a plurality of outer shape points on the outer shape; and
a feature recognition unit that determines a feature part of the outer shape from the plurality of outer shape points on the basis of the distance,
wherein the plurality of outer shape points on the outer shape are set at predetermined intervals along the outer shape,
wherein the reference point extraction unit sets a defined chord of the maximum inscribed circle that passes through the reference point, and sets the plurality of outer shape points at a predetermined interval on the defined chord,
wherein the outer shape detection unit determines a point on a surface of the hand that corresponds to a depth level of a target point with respect to a palm of the hand, or the outer shape detection unit determines a point on a surface of the hand that corresponds to a depth level of a target point with respect to a finger of the hand, and
wherein the outer shape detection unit determines a palmar side of the hand or a dorsal side of the hand based on the depth level.

2. The shape recognition device according to claim 1, wherein the plurality of outer shape points on the outer shape are each obtained as an intersection point between a half line and the outer shape, the half line being drawn through a rotation for each predetermined angle about the reference point as a rotation center.

3. The shape recognition device according to claim 1, wherein the outer shape detection unit is a depth level sensor or an image sensor.

4. The shape recognition device according to claim 1, further comprising a display device capable of displaying a stereoscopic image, wherein
the outer shape detection unit includes a depth level sensor that measures a distance to the hand, and detects the outer shape of the hand in a common region in which a stereoscopic region of the stereoscopic image generated by the display device and a depth level detection region overlap with each other.

5. A head-mounted display device comprising the shape recognition device according to claim 1.

6. A processor encoded with a shape recognition program that when executed by the processor performs the following operations comprising:
an outer shape detection process of detecting an outer shape of a hand;
a reference point extraction process of extracting a central point of a maximum inscribed circle of the detected outer shape as a reference point;
a distance measurement process of measuring a distance between the reference point and each of a plurality of outer shape points on the outer shape; and a feature recognition process of determining, using a processor, a feature part of the outer shape from the plurality of outer shape points on the basis of the distance, wherein the plurality of outer shape points on the outer shape are set at predetermined intervals along the outer shape, wherein the reference point extraction process sets a defined chord of the maximum inscribed circle that passes through the reference point, and sets the plurality of outer shape points at a predetermined interval on the defined chord, wherein the outer shape detection process determines a point on a surface of the hand that corresponds to a depth level of a target point with respect to a palm of the hand, or the outer shape detection process determines a point on a surface of the hand that corresponds to a depth level of a target point with respect to a finger of the hand, and wherein the outer shape detection process determines a palmar side of the hand or a dorsal side of the hand based on the depth level.

7. The processor encoded with a shape recognition program according to claim 6, wherein the plurality of outer shape points on the outer shape are each obtained as an intersection point between a half line and the outer shape, the half line being drawn through a rotation for each predetermined angle about the reference point as a rotation center.

8. A shape recognition method comprising:
an outer shape detection step of detecting an outer shape of a hand;
a reference point extraction step of extracting a central point of a maximum inscribed circle of the detected outer shape as a reference point;
a distance measurement step of measuring a distance between the reference point and each of a plurality of outer shape points on the outer shape; and
a feature recognition step of determining, using a processor, a feature part of the outer shape from the plurality of outer shape points on the basis of the distance, wherein the plurality of outer shape points on the outer shape are set at predetermined intervals along the outer shape, wherein the reference point extraction step sets a defined chord of the maximum inscribed circle that passes through the reference point, and sets the plurality of outer shape points at a predetermined interval on the defined chord, wherein the outer shape detection step determines a point on a surface of the hand that corresponds to a depth level of a target point with respect to a palm of the hand, or the outer shape detection step determines a point on a surface of the hand that corresponds to a depth level of a target point with respect to a finger of the hand, and wherein the outer shape detection step determines a palmar side of the hand or a dorsal side of the hand based on the depth level.

9. The shape recognition method according to claim 8, wherein the plurality of outer shape points on the outer shape are each obtained as an intersection point between a half line and the outer shape, the half line being drawn through a rotation for each predetermined angle about the reference point as a rotation center.

* * * * *